US009159076B2

(12) United States Patent
Ueno

(10) Patent No.: US 9,159,076 B2
(45) Date of Patent: Oct. 13, 2015

(54) USER ANSWER COLLECTION SERVER, USER ANSWER COLLECTION SYSTEM, BROADCAST RECEPTION APPARATUS AND CONTROL METHOD

(75) Inventor: Masahiro Ueno, Tokyo (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 21 days.

(21) Appl. No.: 13/511,912

(22) PCT Filed: Nov. 25, 2010

(86) PCT No.: PCT/JP2010/071057
§ 371 (c)(1),
(2), (4) Date: May 24, 2012

(87) PCT Pub. No.: WO2011/065443
PCT Pub. Date: Jun. 3, 2011

(65) Prior Publication Data
US 2012/0276515 A1 Nov. 1, 2012

(30) Foreign Application Priority Data

Nov. 25, 2009 (JP) ................................ P2009-267977
Dec. 28, 2009 (JP) ................................ P2009-298023

(51) Int. Cl.
*H04H 60/33* (2008.01)
*G06Q 30/02* (2012.01)
*H04H 60/72* (2008.01)

(52) U.S. Cl.
CPC .............. *G06Q 30/02* (2013.01); *H04H 60/33* (2013.01); *H04H 60/72* (2013.01)

(58) Field of Classification Search
CPC .......... H04N 21/4758; H04N 21/4756; H04N 21/4532; H04N 21/252; H04N 21/44222; H04N 21/4755; H04N 21/4667
See application file for complete search history.

(56) References Cited

U.S. PATENT DOCUMENTS

| 5,223,924 | A  | * | 6/1993  | Strubbe ........................... 725/46 |
| 5,945,988 | A  | * | 8/1999  | Williams et al. ............... 715/747 |
| 6,134,531 | A  | * | 10/2000 | Trewitt et al. ................. 705/7.32 |
| 6,289,346 | B1 | * | 9/2001  | Milewski et al. ..................... 1/1 |
| 6,317,881 | B1 | * | 11/2001 | Shah-Nazaroff et al. ....... 725/24 |
| 2002/0053077 | A1 | * | 5/2002 | Shah-Nazaroff et al. ....... 725/13 |

(Continued)

FOREIGN PATENT DOCUMENTS

JP 9-46653 A 2/1997
JP 9-46654 A 2/1997

(Continued)

*Primary Examiner* — Nathan Flynn
*Assistant Examiner* — William J Kim
(74) *Attorney, Agent, or Firm* — Nath, Goldberg & Meyer; Jerlad L. Meyer; Stanley N. Protigal

(57) ABSTRACT

A server (113) receives broadcast schedule from a broadcast station (12) and stores it (S170). A reception terminal (114) receives a broadcast program through a broadcast wave and outputs it (S171). An answer input by a user on a survey target broadcast program is included in answer information, together with an input time and information on the broadcast station (12), and is sent to a server (113) (S172 and S173). The server (113) references a program schedule based on the input time and the information on the broadcast station (12) of the answer information, specifies the survey target broadcast program and collects answers from the reception terminals (114) on the survey target broadcast program.

14 Claims, 36 Drawing Sheets

(56) References Cited

U.S. PATENT DOCUMENTS

| | | |
|---|---|---|
| 2007/0186267 A1* | 8/2007 | Ohde et al. .................... 725/135 |
| 2008/0060035 A1* | 3/2008 | Tsang et al. .................... 725/109 |
| 2008/0086742 A1* | 4/2008 | Aldrey et al. .................... 725/24 |

FOREIGN PATENT DOCUMENTS

| | | |
|---|---|---|
| JP | 11-103452 A | 4/1999 |
| JP | 2001-188771 A | 7/2001 |
| JP | 2001-357191 A | 12/2001 |
| JP | 2002-109139 A | 4/2002 |
| JP | 2002-140487 A | 5/2002 |
| JP | 2003-087827 A | 3/2003 |
| JP | 2005-92561 A | 4/2005 |
| JP | 2006-48658 A | 2/2006 |
| JP | 2008-005232 A | 1/2008 |
| JP | 2009-224819 A | 10/2009 |

* cited by examiner

FIG. 4
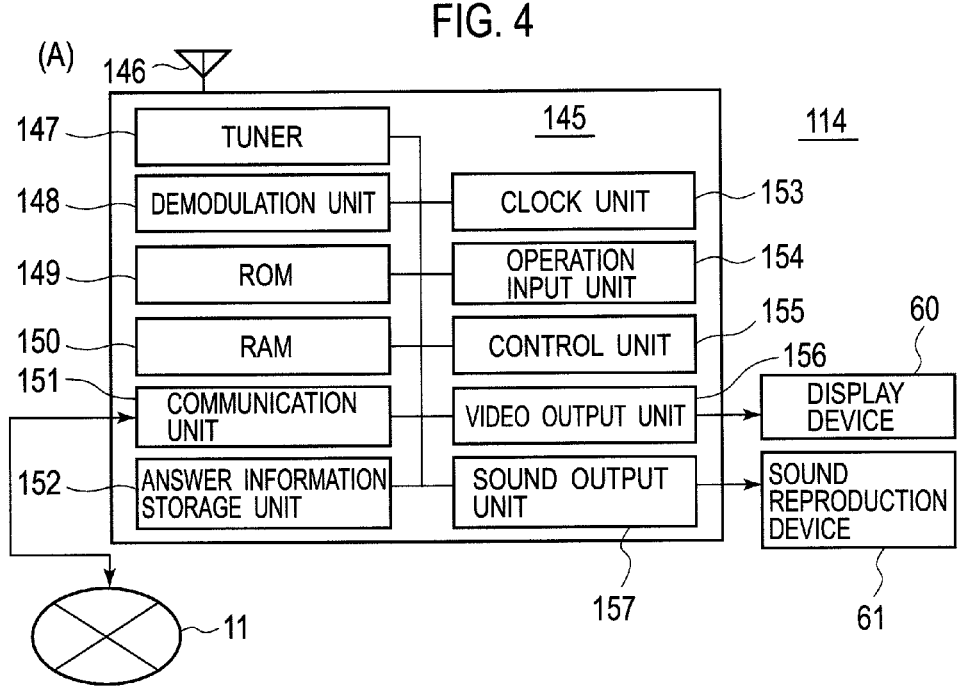
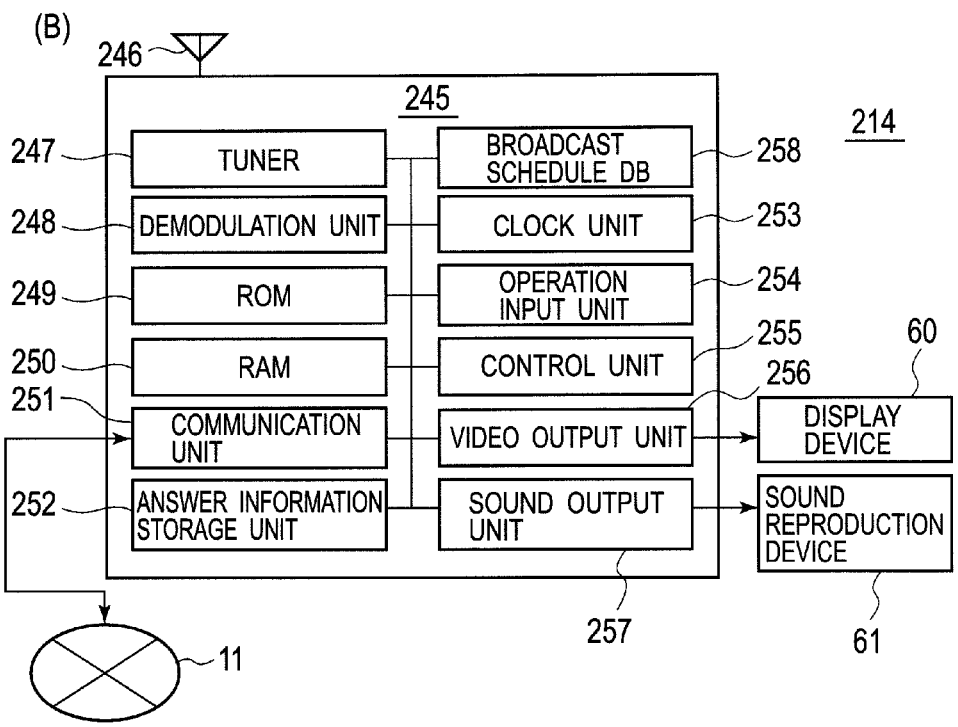

| 1= HEART MARK (LIKE) |
| 2= SMILE MARK (ACCEPTABLE) |
| 3= ×MARK (DISLIKE) |

| TYPE OF BROADCAST | NAME OF BROADCAST STATION | FREQUENCY | INPUT DATE AND TIME | INPUT CONTENT |
|---|---|---|---|---|
| TERRESTRIAL DIGITAL | MOUNTAIN TELEVISION | ***** | 2009/10/20 10:21:45 | 3 |
| FM | RIVER FM | . | 2009/10/20 12:11:23 | 1 |

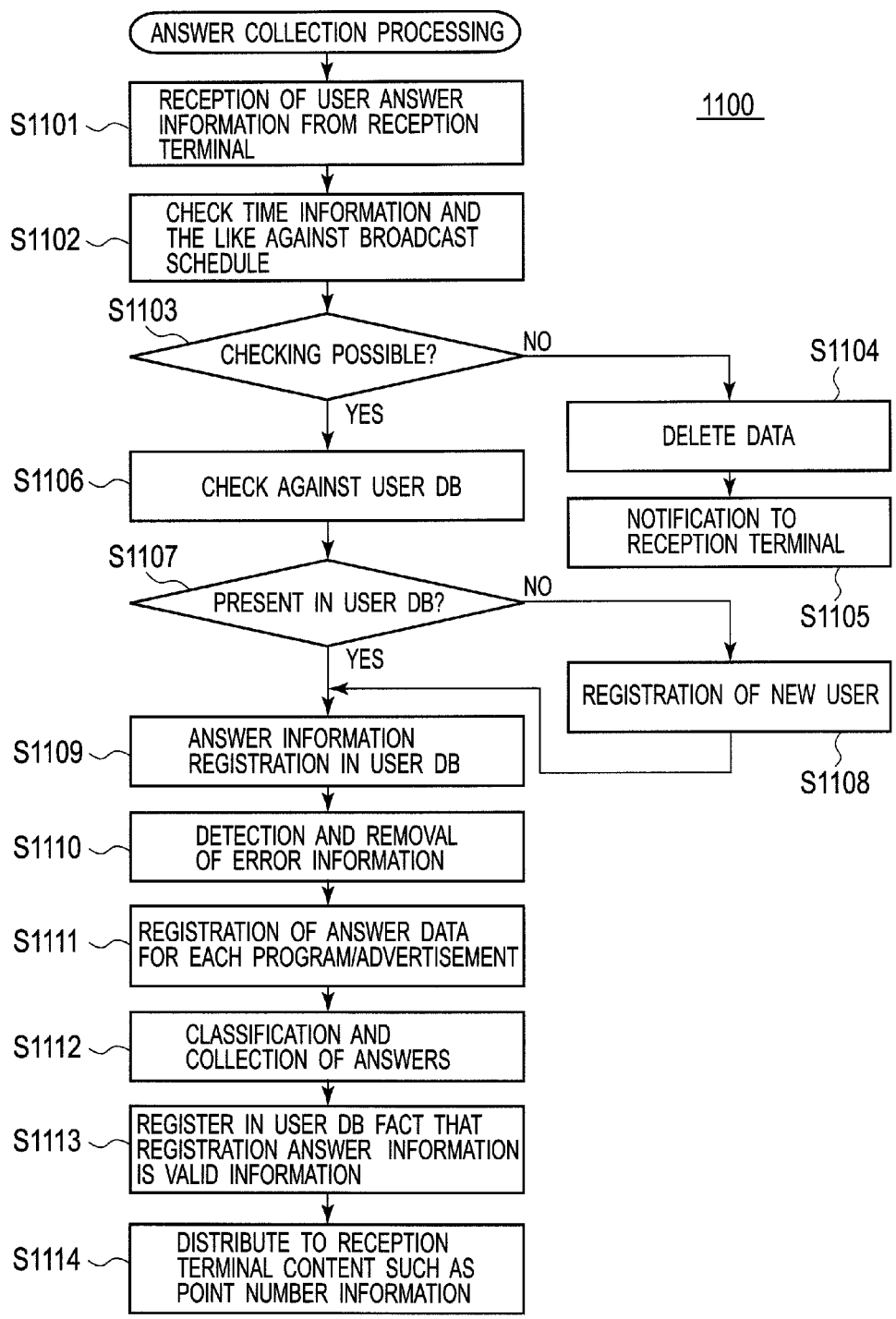

FIG. 10

| ID | SEX | AGE GROUP | OCCUPATION | ANSWER POINT |
|---|---|---|---|---|
| ***** | MALE | FORTIES | OFFICE WORKER | **** |
| ****1 | FEMALE | TWENTIES | HOUSE WIFE | ***5 |
| 2 | MALE | TEENS | STUDENT | **24 |

FIG. 11

| TYPE OF BROADCAST | NAME OF BROADCAST STATION | FREQUENCY | INPUT DATE AND TIME | INPUT CONTENT |
|---|---|---|---|---|
| TERRESTRIAL DIGITAL | MOUNTAIN TELEVISION | ***** | 2009/10/20 10:21:45 | 3 |
| FM | RIVER FM | . | 2009/10/20 12:11:23 | 1 |

FIG. 12

| TYPE OF BROADCAST | NAME OF BROADCAST STATION | NAME OF PROGRAM | EVALUATION (LIKE) | EVALUATION (DISLIKE) | EVALUATION (ACCEPTABLE) |
|---|---|---|---|---|---|
| TERRESTRIAL DIGITAL | MOUNTAIN TELEVISION | MOUNTAIN ETTY (OCTOBER 20) | *24 | *01 | *1 |
| TERRESTRIAL DIGITAL | MOUNTAIN TELEVISION | MOUNTAIN DRAMA THIRD ROUND | *1 | **5 | *2 |

FIG. 13

| TYPE OF BROADCAST | NAME OF BROADCAST STATION | NAME OF PROGRAM | SEX | EVALUATION (LIKE) | EVALUATION (DISLIKE) | EVALUATION (ACCEPTABLE) |
|---|---|---|---|---|---|---|
| TERRESTRIAL DIGITAL | MOUNTAIN TELEVISION | MOUNTAIN ETTY (OCTOBER 20) | MALE | *2 | *0 | *4 |
| TERRESTRIAL DIGITAL | MOUNTAIN TELEVISION | MOUNTAIN ETTY (OCTOBER 20) | FEMALE | *1 | 5* | *3 |

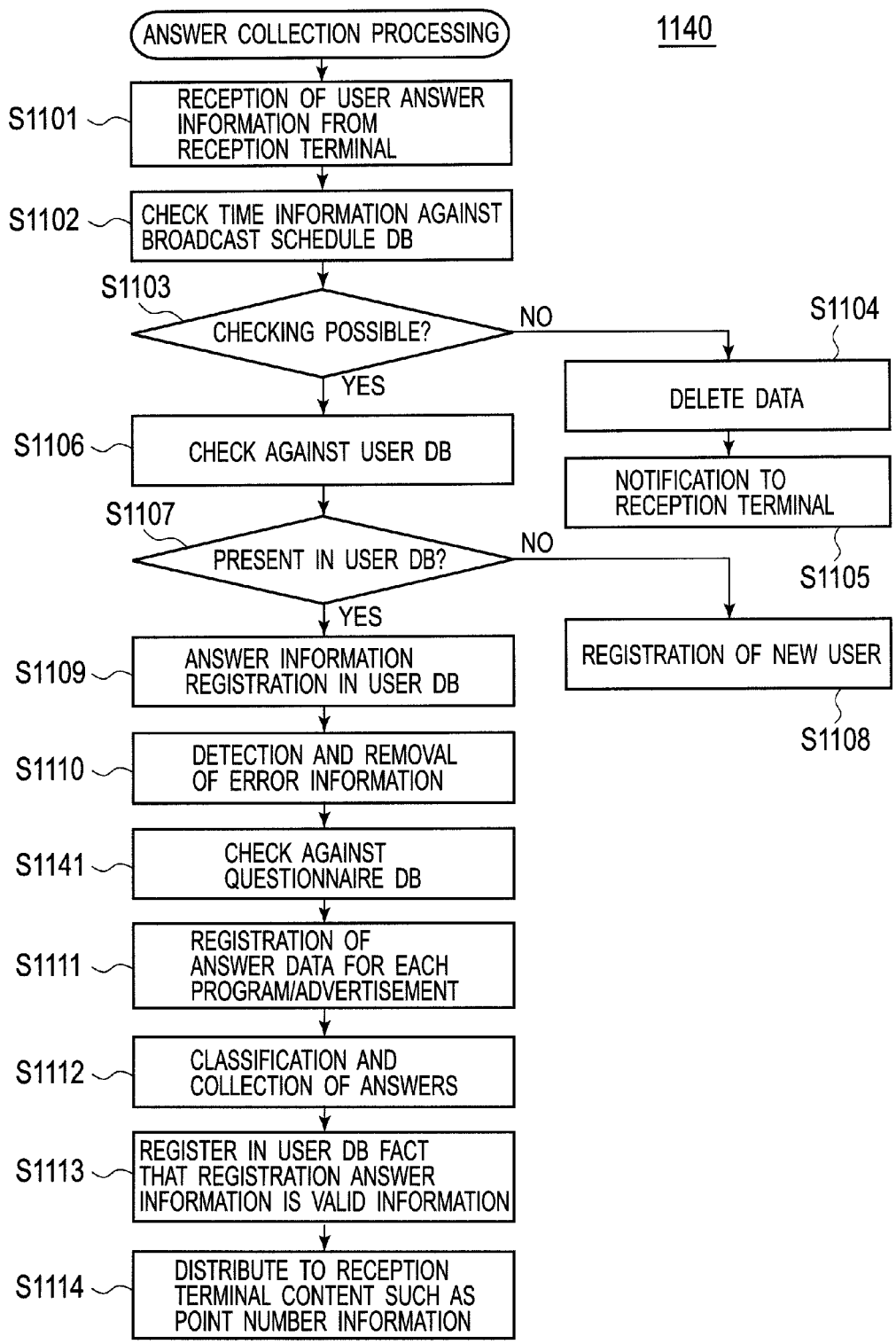

FIG. 17

| TYPE OF BROADCAST | NAME OF BROADCAST STATION | NAME OF BROADCAST PROGRAM | BROADCAST START TIME | BROADCAST COMPLETION TIME |
|---|---|---|---|---|
| TERRESTRIAL DIGITAL | MOUNTAIN TELEVISION | MOUNTAIN ETTY | 2009/10/20 10:00 | 2009/10/20 10:24 |
| FM | RIVER FM | MU TIME | 2009/10/20 10:00 | 2009/10/20 11:00 |

| ALLOCATION KEY 1 | KEY INFORMATION | ALLOCATION KEY 2 | KEY INFORMATION | ... |
|---|---|---|---|---|
| COLOR RED | LIKE | COLOR BLUE | DISLIKE | |
| NUMERICAL KEY 1 | INTERESTING | NUMERICAL KEY 2 | BORING | |

FIG. 18

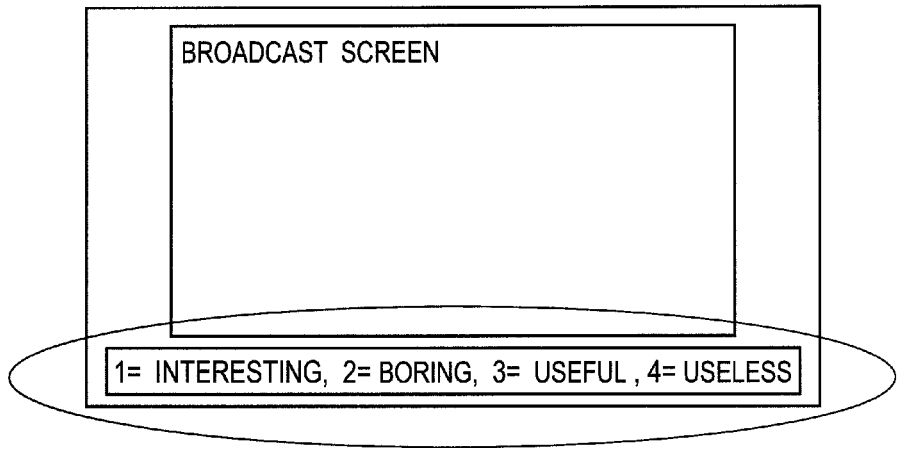

60

BROADCAST SCREEN

1= INTERESTING, 2= BORING, 3= USEFUL, 4= USELESS

FIG. 19

| TYPE OF BROADCAST | NAME OF BROADCAST STATION | FREQUENCY | INPUT DATE AND TIME | INPUT CONTENT |
|---|---|---|---|---|
| TERRESTRIAL DIGITAL | MOUNTAIN TELEVISION | ***** | /10/20 10: | **1 |
| FM | RIVER FM | . | /10/20 12: | 1** |

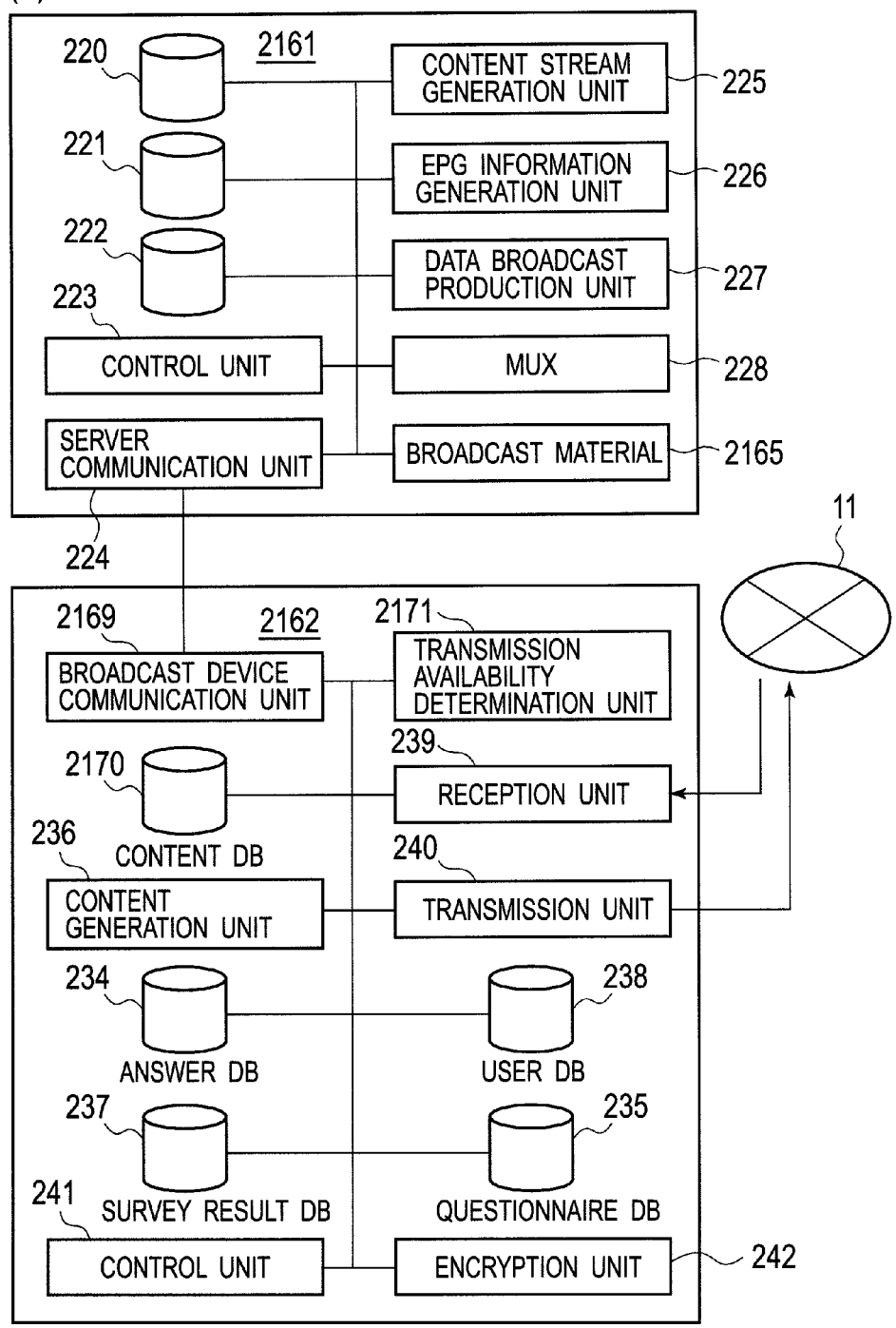

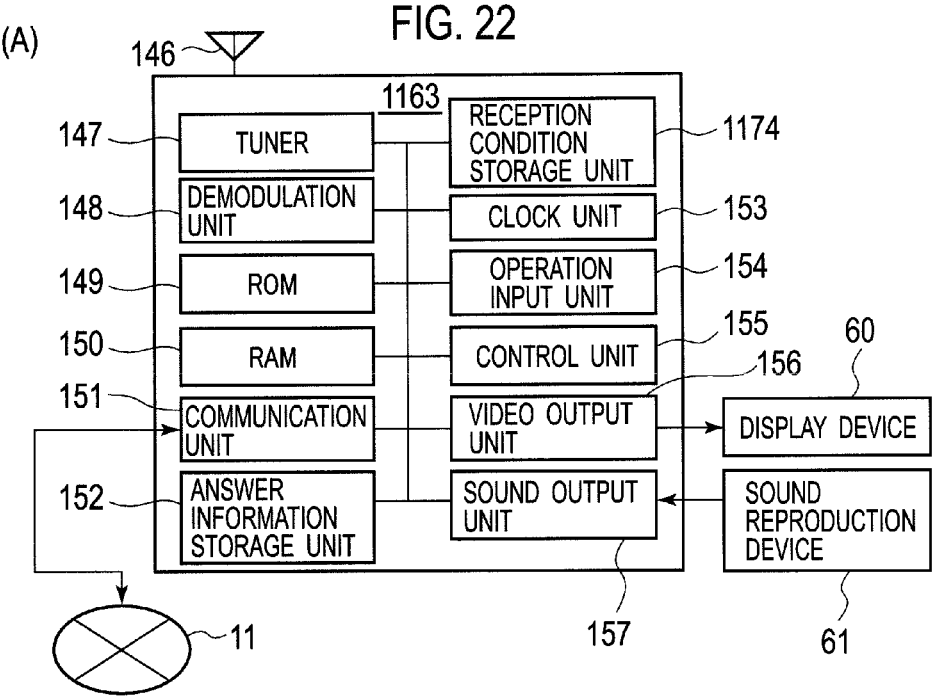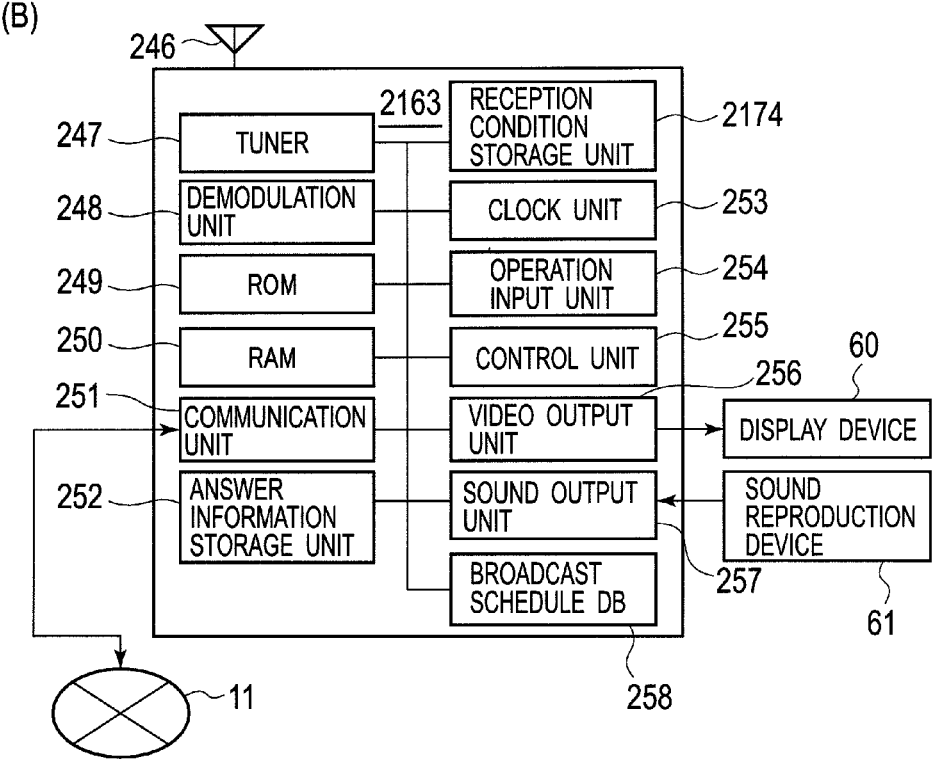
FIG. 22

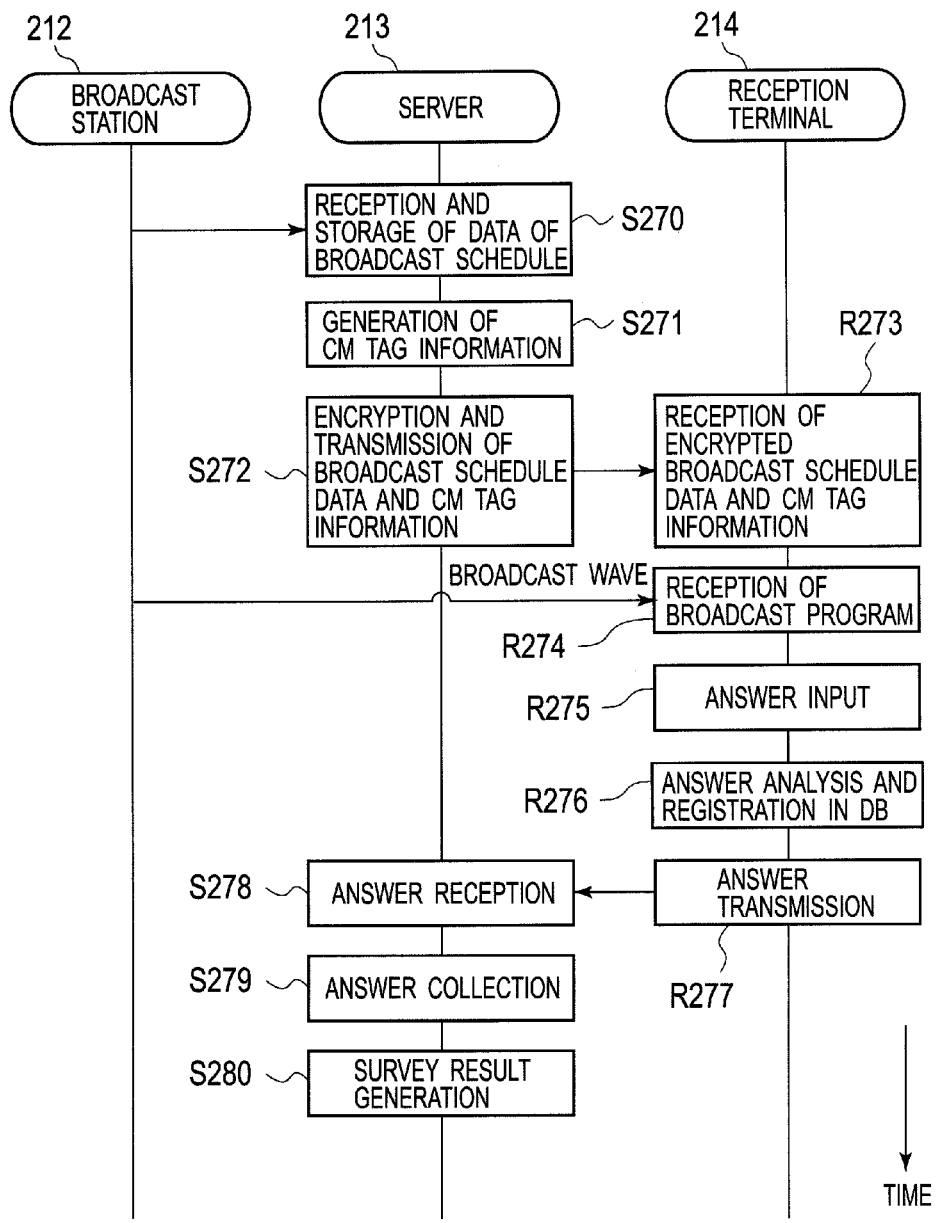

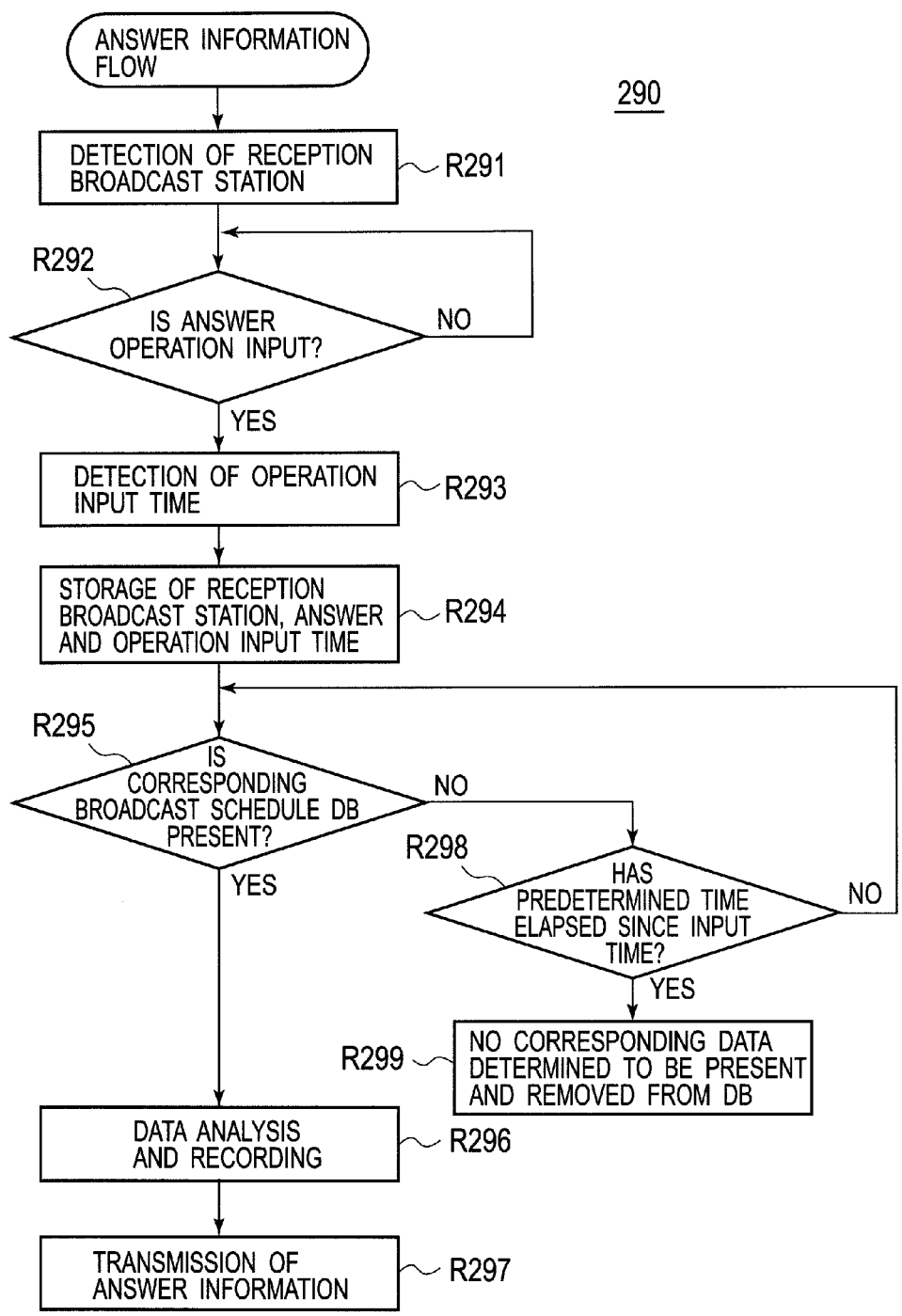

FIG. 30

| ADVERTISEMENT ID | TYPE OF BROADCAST | NAME OF BROADCAST STATION | CM (ADVERTISEMENT) NAME | ADVERTISER |
|---|---|---|---|---|
| CTC090901 | TERRESTRIAL DIGITAL | MOUNTAIN TELEVISION | ECO#1 | NIPPON AUTOMOBILE |
| CRB091101 | FM | RIVER FM | RADIO BEER (SKI VERSION) | KING BEER |

| ADVERTISEMENT BRAND | TYPE OF ADVERTISEMENT | BROADCAST START TIME 1 | BROADCAST COMPLETION TIME 1 |
|---|---|---|---|
| SASUKE | AUTOMOBILE | 2009/10/20 10:00:00 | 2009/10/20 10:01:00 |
| GoodLuck | BEVERAGE | 2009/10/20 12:11:20 | 2009/10/20 12:11:40 |

| BROADCAST START TIME 2 | BROADCAST COMPLETION TIME 2 | BROADCAST START TIME 3 | |
|---|---|---|---|
| 2009/10/20 10:20:00 | 2009/10/20 10:21:00 | 2009/10/21 10:00:00 | ... |
| 2009/10/20 13:11:20 | 2009/10/20 13:11:40 | 2009/10/21 12:11:20 | |

| TYPE OF BROADCAST | NAME OF BROADCAST STATION | NAME OF PROGRAM | INPUT CONTENT |
|---|---|---|---|
| TERRESTRIAL DIGITAL | MOUNTAIN TELEVISION | MOUNTAIN ETTY | 3 |

(B)

| ADVERTISEMENT ID | TYPE OF BROADCAST | CM (ADVERTISEMENT) NAME | INPUT CONTENT |
|---|---|---|---|
| CRB091102 | FM | RADIO BEER (SKI VERSION) | 1 |

FIG. 33

| TYPE OF BROADCAST | NAME OF BROADCAST STATION | NAME OF PROGRAM | INPUT CONTENT |
|---|---|---|---|
| TERRESTRIAL DIGITAL | MOUNTAIN TELEVISION | MOUNTAIN ETTY (OCTOBER 20) | 3 |

| TYPE OF BROADCAST | NAME OF BROADCAST STATION | NAME OF PROGRAM | EVALUATION (LIKE) | EVALUATION (DISLIKE) | EVALUATION (ACCEPTABLE) |
|---|---|---|---|---|---|
| TERRESTRIAL DIGITAL | MOUNTAIN TELEVISION | MOUNTAIN ETTY (OCTOBER 20) | *24 | *01 | *1 |
| TERRESTRIAL DIGITAL | MOUNTAIN TELEVISION | MOUNTAIN DRAMA THIRD ROUND | *1 | **5 | *2 |

(B)

| NAME OF CM | EVALUATION (LIKE) | EVALUATION (DISLIKE) | EVALUATION (ACCEPTABLE) |
|---|---|---|---|
| RADIO BEER (SKI VERSION) | *22 | *01 | *1 |

| TYPE OF BROADCAST | NAME OF BROADCAST STATION | NAME OF PROGRAM | SEX | EVALUATION (LIKE) | EVALUATION (DISLIKE) | EVALUATION (ACCEPTABLE) |
|---|---|---|---|---|---|---|
| TERRESTRIAL DIGITAL | MOUNTAIN TELEVISION | MOUNTAIN ETTY (OCTOBER 20) | MALE | *2 | *0 | *4 |
| TERRESTRIAL DIGITAL | MOUNTAIN TELEVISION | MOUNTAIN ETTY (OCTOBER 20) | FEMALE | *1 | 5* | *3 |

(B)

| NAME OF CM | | EVALUATION (LIKE) | EVALUATION (DISLIKE) | EVALUATION (ACCEPTABLE) |
|---|---|---|---|---|
| RADIO BEER (SKI VERSION) | MALE | *2 | *0 | *4 |
| RADIO BEER (SKI VERSION) | FEMALE | *1 | 5* | *3 |

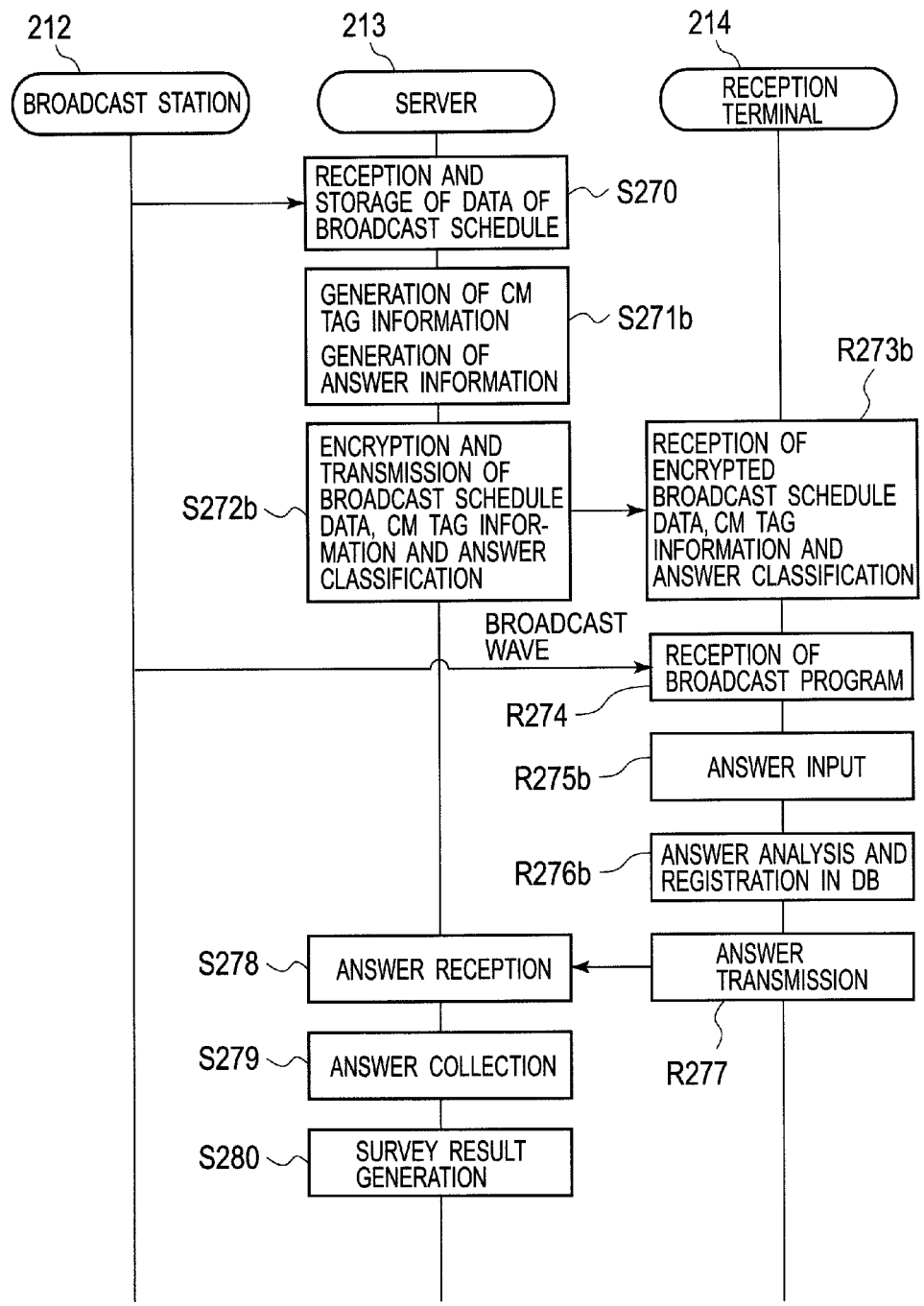

| TYPE OF BROADCAST | NAME OF BROADCAST STATION | NAME OF BROADCAST PROGRAM | BROADCAST START TIME | BROADCAST COMPLETION TIME |
|---|---|---|---|---|
| TERRESTRIAL DIGITAL | MOUNTAIN TELEVISION | MOUNTAIN ETTY | 2009/10/20 10:00 | 2009/10/20 10:24 |
| FM | RIVER FM | MU TIME | 2009/10/20 10:00 | 2009/10/20 11:00 |

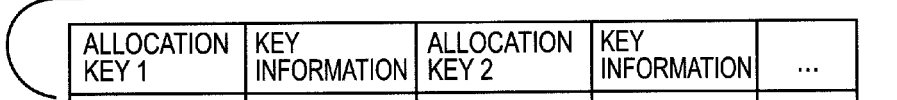

| ALLOCATION KEY 1 | KEY INFORMATION | ALLOCATION KEY 2 | KEY INFORMATION | ... |
|---|---|---|---|---|
| COLOR RED | LIKE | COLOR BLUE | DISLIKE | |
| NUMERICAL KEY 1 | INTERESTING | NUMERICAL KEY 2 | BORING | |

(B)

| TYPE OF BROADCAST | NAME OF CM | ALLOCATION KEY 1 | KEY INFORMATION |
|---|---|---|---|
| FM | RADIO BEER (SKI VERSION) | NUMERICAL KEY 1 | REFRESHING IMAGE |

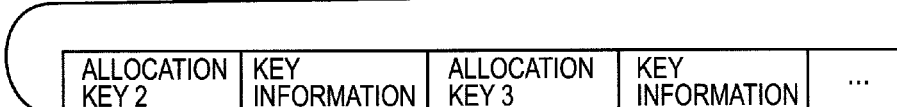

| ALLOCATION KEY 2 | KEY INFORMATION | ALLOCATION KEY 3 | KEY INFORMATION | ... |
|---|---|---|---|---|
| NUMERICAL KEY 2 | HIGH-CLASS IMAGE | NUMERICAL KEY 2 | HESITATE TO GET | |

| TYPE OF BROADCAST | NAME OF BROADCAST STATION | NAME OF BROADCAST PROGRAM | INPUT CONTENT |
|---|---|---|---|
| TERRESTRIAL DIGITAL | MOUNTAIN TELEVISION | MOUNTAIN ETTY | LIKE |
| FM | RIVER FM | MU TIME | INTERESTING |

(B)

| TYPE OF BROADCAST | NAME OF CM | INPUT CONTENT |
|---|---|---|
| FM | RADIO BEER (SKI VERSION) | REFRESHING IMAGE |

USER ANSWER COLLECTION SERVER, USER ANSWER COLLECTION SYSTEM, BROADCAST RECEPTION APPARATUS AND CONTROL METHOD

This is a National Phase Application filed under 35 U.S.C. §371 as a national stage of International Application No. PCT/JP2010/071057, filed Nov. 25, 2010, claiming the benefit from Japanese Patent Application No. P2009-267977, filed Nov. 25, 2009, claiming the benefit from Japanese Patent Application No. P2009-298023, filed Dec. 28, 2009, the content of each of which is hereby incorporated by reference in its entirety.

TECHNICAL FIELD

The present invention relates to a user answer collection server, a user answer collection system, a broadcast reception apparatus and a control method which collect user answers on broadcast content such as the CM (commercial message) or the AD (advertisement) and the program of television, radio or the like.

BACKGROUND ART

Patent Document 1 discloses a survey system that surveys information on the reaction of users to the CMs of television (FIG. 1 of Patent Document 1). In the survey system of Patent Document 1, a server company sends content for CM reaction survey (questions) to a broadcast station, and the broadcast station multiplexes and then broadcasts data broadcast of the content for CM reaction survey and main broadcast. A viewer makes a household receiver display a screen for CM reaction survey and inputs an answer (FIG. 6 of Patent Document 1), the answer is transmitted through a network as CM reaction information to a server of the server company and the server company performs collection processing (FIG. 4 of Patent Document 1).

PRIOR ART DOCUMENT

Patent Document

Patent Document 1: Japanese Unexamined Patent Application Publication No. 2001-357191

DISCLOSURE OF THE INVENTION

Problems to be Solved

In the CM survey system of Patent Document 1, since survey questionnaires are transmitted from the broadcast station as data broadcast, when the survey company or a sponsor attempts to know a viewing rating or evaluation on a CM, it is necessary to receive cooperation from the broadcast station on the data broadcast of survey items, processing for formatting the data broadcast of the survey items and the like. In a period of time where there is no spare time for data broadcast, it is impossible to broadcast the survey items through data broadcast, and it is difficult to perform viewing survey on a CM during the period of time.

An object of the present invention is to provide a user answer collection server, a user answer collection system, a broadcast reception terminal, a user answer collection system and a control method which can adequately collect user answers from users on broadcast contents without asking a broadcast station for cooperation of data broadcast to perform survey.

Solutions to the Problems

According to the present invention, a reception terminal includes a user answer made by the user on the broadcast content of a survey target in answer information, together with a broadcast source and a broadcast time of the broadcast content, and transmits the answer information to a user answer collection server through a network. The user answer collection server has content broadcast time information, and references the content broadcast time information on the received answer information based on broadcast source information and broadcast time information of the answer information so as to specify the broadcast content associated with the answer information. Then, the user answer collection server associates the user answer of the answer information with the specified broadcast content, and collects user answers from the reception terminals on the broadcast content.

The user answer collection system of the present invention includes a broadcast station, a reception terminal receiving broadcast content with the broadcast station as a broadcaster and a user answer collection server.

The user answer collection server includes: a reception unit that receives user answer information on broadcast content through a network; a broadcast content specification unit that references, based on a broadcast source and a broadcast time information of the broadcast content extracted from the received user answer information, content broadcast time information of its own server so as to specify the broadcast content of a survey target of the user answer information; and a user answer collection unit that uses the user answer extracted from the received user answer information as a user answer about the specified broadcast content and collects user answers from a plurality of users on each of the broadcast contents.

According to the present invention, a broadcast reception terminal has content broadcast time information, and, for user answers received from users, specifies broadcast content on which the user answer is based by referencing the content broadcast time information based on a broadcast source of the broadcast content and an input time of the user answer. Then, the user answer information including the user answer and the broadcast content specified for the user answer are transmitted to the user answer collection server through the network.

A broadcast reception terminal according to the present invention includes: a broadcast content output unit that outputs received broadcast content; a user answer reception unit that receives a user answer about the broadcast content; a content broadcast time information acquisition unit that acquires content broadcast time information having program time information and advertisement time information on the broadcast content; a broadcast content specification unit that references the content broadcast time information based on a broadcast source of the broadcast content on which the user answer is based and an input time of the user answer so as to specify the broadcast content; and a transmission unit that transmits, to a user answer collection server, through a network, user answer information including the user answer and the broadcast content specified for the user answer.

A broadcast reception terminal control method according to the present invention includes the steps of: outputting received broadcast content; receiving a user answer about the broadcast content; acquiring content broadcast time information related to program time information and advertisement time information on the broadcast content; referencing the content broadcast time information based on a broadcast source of the broadcast content on which the user answer is based and an input time of the user answer so as to specify the broadcast content; and transmitting, to a user answer collection server, through a network, user answer information including the user answer and the broadcast content specified for the user answer.

Effects of the Invention

According to the present invention, without asking a broadcast station for cooperation on data broadcast to perform user answer, a user answer collection server can uniquely collect user answers on broadcast contents.

BRIEF DESCRIPTION OF THE DRAWINGS

FIGS. 4(A) and 4(B) are diagrams showing the configuration of a reception terminal;

FIG. 9 is a flow chart of an answer collection processing method in the server;

FIG. 10 shows a specific example of user information in a user DB;

FIG. 11 shows a specific example of the user answer information recorded in an answer DB;

FIG. 12 shows a specific example of collection results for each program;

FIG. 13 shows a specific example of collection results in which the user information is added to the collection results of FIG. 12;

FIG. 16 is a flow chart of an answer collection processing method;

FIG. 17 shows an example of information content in a questionnaire DB;

FIG. 18 is a diagram showing an example of a screen displayed on a display device of the reception terminal, based on the questionnaire information of FIG. 17;

FIG. 19 shows an example of data that is temporarily stored in an answer information storage unit of the server based on the user answer for the answer screen of FIG. 18 in the reception terminal;

FIG. 21B is a detailed diagram showing the configuration of the broadcast device and the server of FIG. 20;

FIGS. 22(A) and 22(B) are detailed diagrams showing the configuration of the reception terminal of FIG. 20;

FIG. 28 is a ladder chart on processing between the individual elements of a fixed questionnaire broadcast system;

FIG. 29 is a flow chart of an answer information processing method in the reception terminal;

FIG. 30 is a diagram showing an example of CM tags information based on the processing in the reception terminal;

FIGS. 31(A) and 31(B) are diagrams showing a specific example of the user answer information in the reception terminal;

FIG. 33 is a diagram showing a specific example of the user answer information recorded in the answer DB of the server;

FIGS. 34(A) and 34(B) are diagrams showing a specific example of the collection results for each piece of broadcast content in the server;

FIGS. 35(A) and 35(B) are diagrams showing specific examples of collection results in which user information is added to the collection results of FIGS. 34(A) and 34(B);

FIG. 36 is a ladder chart on processing between the individual elements of a variable questionnaire broadcast system;

FIGS. 38(A) and 38(B) are diagrams showing an example of information content of a server questionnaire DB;

FIGS. 39(A) and 39(B) are diagrams showing an example of user answer information stored in an answer information storage unit of the reception terminal based on the user answer for the answer screen of FIG. 18 in the reception terminal;

EMBODIMENTS OF THE INVENTION

[1 Broadcast Wave Type Broadcast System: Broadcast System 10]

Figure 1:
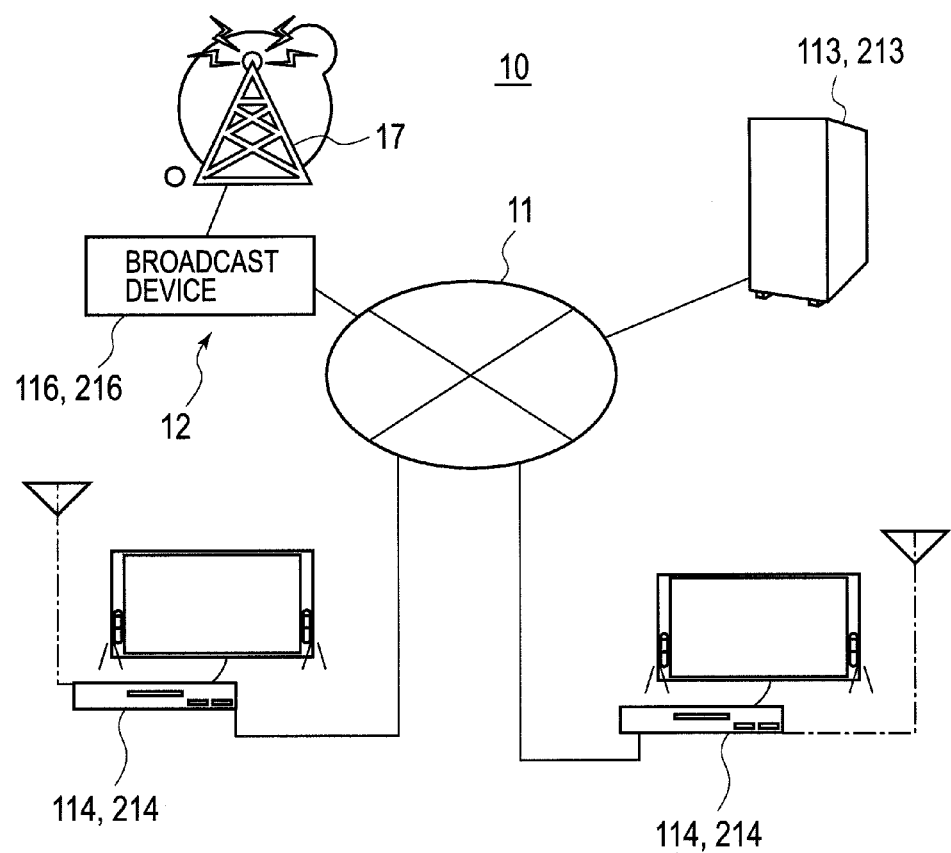
FIG. 1 is a schematic diagram showing the configuration of a broadcast system.
Figure 2:
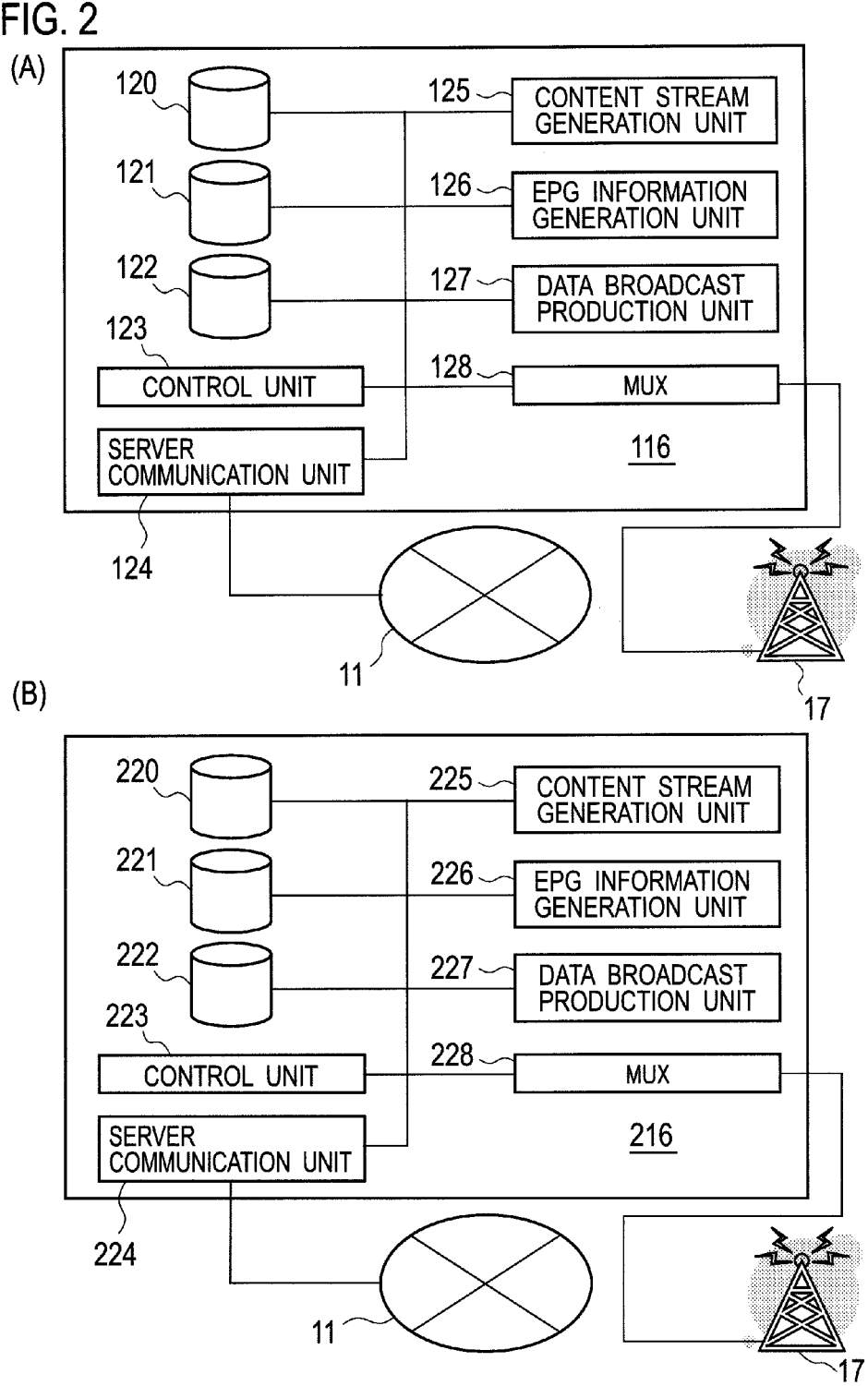
FIGS. 2(A) and 2(B) are diagrams showing the configuration of a broadcast device.
Figure 3:
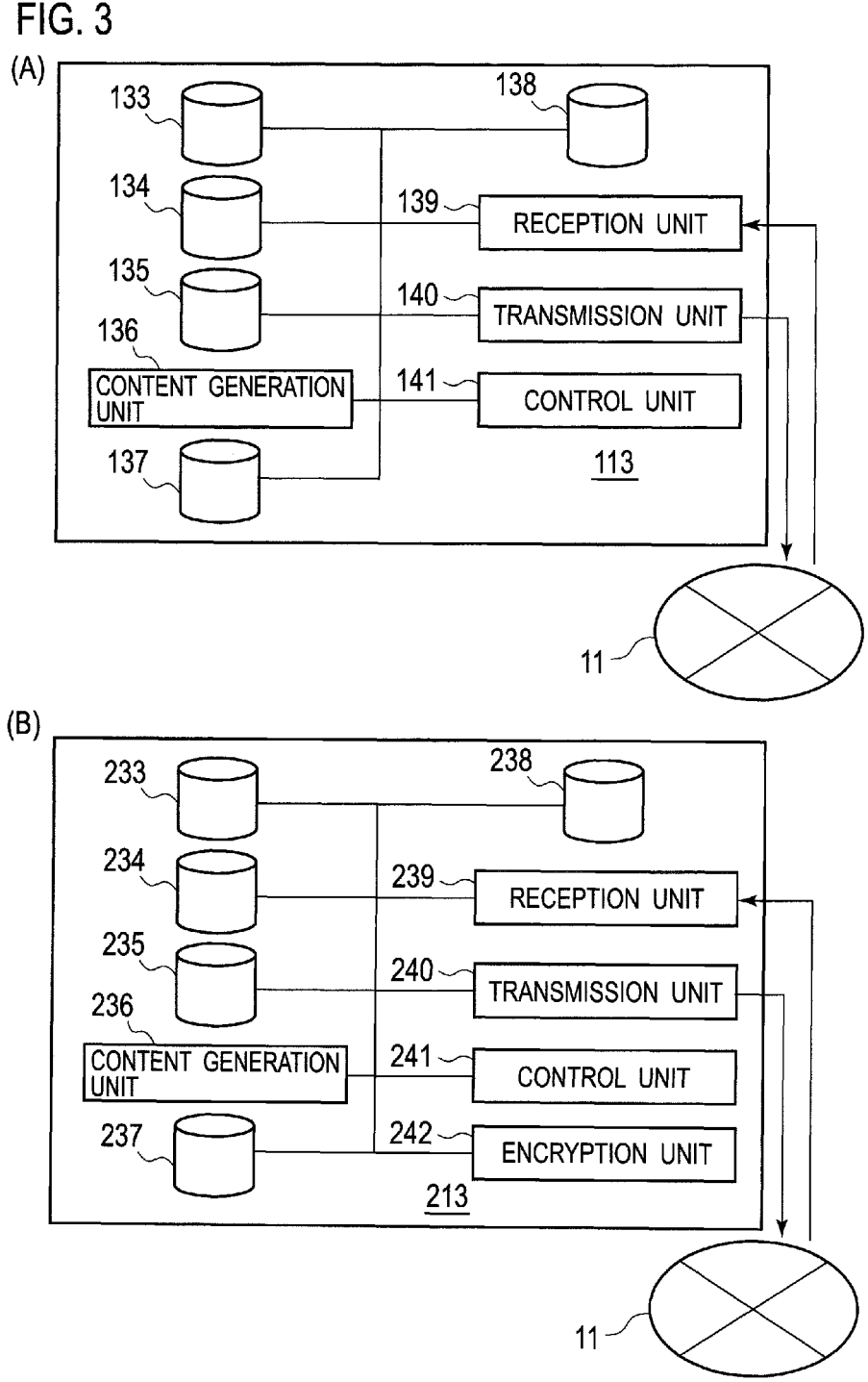
FIGS. 3(A) and 3(B) are diagrams showing the configuration of a server.

FIGS. 1 to 19 relate to a broadcast wave type broadcast system 10. FIG. 1 is a schematic diagram showing the configuration of the broadcast system 10. In the broadcast system 10, each of the reception terminals 114 receives broadcast content (including the programs of main broadcast, the programs of data broadcast and the commercial messages (CMs) or advertisements (ADs) of main broadcast) from the Internet 11 through a broadcast wave via a radio tower 17 of a broadcast station 12.

The broadcast system 10 includes the Internet 11, the broadcast station 12, a server 113 and a plurality of the reception terminals 114. Although, for ease of illustration, in FIG. 1, only each one of the broadcast stations 12 and the servers 113 are shown, the broadcast system 10 can include one or more broadcast stations 12 and one or more servers 113. The broadcast station 12 is typically a terrestrial television broadcast station; the broadcast station 12 may be an analogue radio broadcast station such as an FM radio broadcast station. One server 113 may be provided for each broadcast target area (for example, each of the prefectures) prescribed by the law, or one server 113 in common may be provided for a plurality of broadcast target areas. The server 113 may be dedicated to a specific broadcast station 12, or may be commonly used for a plurality of the broadcast stations 12.

The broadcast station 12 includes a broadcast device 116. The broadcast device 116 sends out broadcast programs, data broadcast and furthermore EPG information and the like within its storage device according to a broadcast schedule through a broadcast wave via the radio tower 17. The broadcast device 116 also provides the server 113 with a detailed time table of programs such as programs through the broadcast wave, data broadcast, EPG (electronic program guide) information and advertisements through a dedicated line or the Internet 11. The "time table", the "program schedule" and the "broadcast schedule" are used to be synonymous with each other; they are all defined as a subordinate concept of "content broadcast time information."

The server 113 records, in a DB (database), registrations and answers by users on favorability rating surveys of programs/advertisements (the subordinate concept of broadcast content), and acquires the timetable described above from the broadcast station 12. The server 113 also performs collection based on answers from users for each of programs/advertisements. Furthermore, the server 113 provides the users with questionnaire information on a favorability rating survey.

The reception terminal 114 is typically intended to be placed in a house; the reception terminal 114 may be portable or vehicle-mounted. The reception terminal 114 receives, through an antenna, a program transmitted by the broadcast station 12 via the broadcast wave. The reception terminal 114 sends registration information and answer information from the users to the server 113 though the Internet 11.

[1-1 Fixed Questionnaire for Broadcast Wave Type Broadcast System (a First Embodiment of the Broadcast System 10]

FIGS. 2(A) to 13 relate to a fixed questionnaire broadcast system 10. Specifically, in the fixed questionnaire broadcast system 10, questionnaires for the users viewing broadcast content are fixed regardless of broadcast content, broadcast station, broadcast time or the like. In this example, questionnaires for the users are questionnaires for asking a favorability rating on the broadcast content viewed by the users; as described later, each time, the user answers by selecting one of three options on the favorability rating, namely, "like", "dislike" and "acceptable" on the answer key unit 92 of an operation input unit 54 shown in FIG. 7.

FIG. 2(A) is a diagram showing the configuration of the broadcast device 116. The broadcast device 116 includes a main broadcast content DB 120, a broadcast schedule DB 121, a data broadcast content DB 122, a control unit 123, a server communication unit 124, a content stream generation unit 125, an EPG information generation unit 126, a data broadcast production unit 127 and a MUX (multiplexer) 128. The content stream generation unit 125 reads data on the main broadcast content (the programs/advertisements of the main broadcast), according to an instruction from the control unit 123, from the main broadcast content DB 120, along the broadcast schedule of the broadcast schedule DB 121, generates stream data on the main broadcast content and sends it to the MUX 128. As to main broadcast content of live broadcast, the control unit 123 sends, to the MUX 128, stream data input into an unillustrated input unit of the broadcast device 116, as it is.

The EPG information generation unit 126 references the broadcast schedule of the broadcast schedule DB 121, generates the EPG information and outputs it to the MUX 128. The data broadcast production unit 127 reads data on the corresponding data broadcast according to the broadcast schedule of the broadcast schedule DB 121 from the data broadcast content DB 122, generates, based on this data, content on data broadcast such as, for example, weather forecast or information related to a program and sends it to the MUX 128. The MUX 128 multiplexes the data stream on the main broadcast content, the EPG information and the data broadcast content, and sends it to the radio tower 17; the multiplexed content is sent from the radio tower 17 through the broadcast wave.

The server communication unit 124 sends the schedule table of the broadcast station 12 to the server 113. The schedule table may be either data on the broadcast schedule DB 121 itself or a more detailed table. Although the schedule table is generally created before the start of broadcast of broadcast contents and is transmitted to the server 113, even the schedule table including the broadcast content after the start of the broadcast can be generated after the start of the broadcast of the broadcast content and transmitted to the server 113 as long as processing in which the server 113 receives, from the reception terminal 114, user answers on the broadcast content and the broadcast content of the user answers is specified by referencing the schedule table has not been performed.

FIG. 3(A) is a diagram showing the configuration of the server 113. The server 113 includes a broadcast schedule DB 133, an answer DB 134, a questionnaire DB 135, a content generation unit 136, a survey result DB 137, a user DB 138, a reception unit 139, a transmission unit 140 and a control unit 141 that controls these components. The broadcast schedule DB 133 stores the broadcast schedule of each broadcast station 12 transmitted from the broadcast device 116 of each broadcast station 12 either before broadcast or after broadcast. The broadcast schedule specifically stores not only broadcast times of advertisements halfway through a program and between programs but also details of broadcast times of segments and advertisements within a program. In the user DB 138 are recorded the attribute information of the users (for example, sex, age, address, occupation and the like) on which the favorability rating survey is performed, user IDs or the IDs of the reception terminals 114 of the users and the like as to the broadcast content of the broadcast system 10 (the broadcast content includes not only the content of the main broadcast but also the content of the data broadcast; the content of the main broadcast includes not only programs but also advertisements).

The answer DB 134 stores answer information including answer content and an answer time on the answer from the user, for which questionnaire the answer is made and the like in association with the attribution information of the user who made the answer. The questionnaire DB 135 records information such as the content of the questionnaires to the user and a time period during which the questionnaire is received. The survey result DB 137 stores results obtained by performing collection based on the questionnaire DB 135 and the answer DB 134. The content generation unit 136 generates content related to the content of the questionnaires to the user and programs and the like. The transmission unit 140 sends, to the Internet 11, the questionnaire to the user and information to a company or the like to which the results of the answer DB 134 are notified. The reception unit 139 receives, through the Internet 11, the broadcast schedule information from the broadcast station 12 and the answers from the users.

FIG. 4(A) is a diagram showing the configuration of the reception terminal 114. The reception terminal 114 includes a main unit 145, a display device 60 and a sound reproduction device 61. The terminal body 145 includes an antenna 146, a tuner 147, a demodulation unit 148, a ROM 149, a RAM 150, a communication unit 151, an answer information storage unit 152, a clock unit 153, an operation input unit 154, a control unit 155, a video output unit 156 and a sound output unit 157. The tuner 147 receives a radio wave from the broadcast station 12 through the antenna 146. The demodulation unit 148 demodulates, based on information received from the tuner 147, the received signals, and decodes each of the signals. Computer programs and fixed data are recorded in the ROM 149; the control unit 155 reads the data as appropriate. The RAM 150 is used for the control unit 155 to temporarily store data during computation processing. The communication unit 151 exchanges, through the Internet 11, the questionnaire information, the answer information and the like with the server 113.

As will be described in FIG. 7 later, the operation input unit 154 is of a remote controller type, and is used to perform various operations on the reception terminal 114 by the users and to input user answers on viewing content. The operation input unit 154 may be of a touch panel type instead of the remote controller type or may be of a sound input type. The clock unit 153 times the date and time when the user provides an answer. In general, the answer time agrees with the broadcast time of the broadcast content of the answer target. The answer information storage unit 152 temporarily stores the answers from the users, the date and time, the questionnaire information from the server 113 and the like, which are sent to the communication unit 151 at appropriate times. The video output unit 156 converts display information sent from the control unit 155 into a display signal, and displays it on the display device 60. The sound output unit converts sound data from the control unit 155 into a sound signal, which is reproduced by the sound reproduction device 61. The display device 60 is generally a display or a television set. The sound reproduction device 61 is generally a speaker. The display device 60 and the sound reproduction device 61 can be equipped within the terminal body 145.

Figure 5:
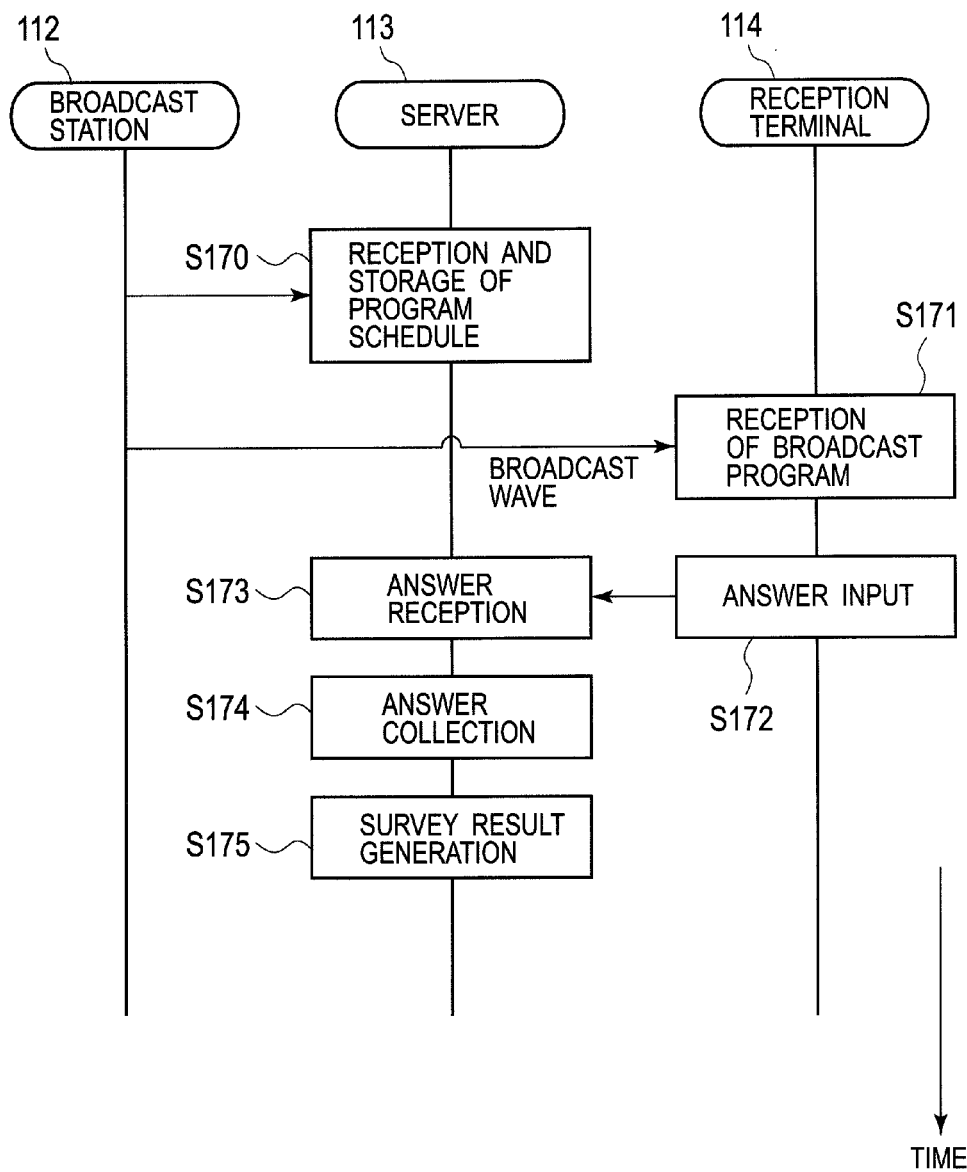
FIG. 5 is a ladder chart on processing between individual elements of a fixed questionnaire broadcast system.

FIG. 5 is a ladder chart on processing between the individual elements of the fixed questionnaire broadcast system 10. The individual steps will be described sequentially.

S170: The broadcast station 12 provides the server 113 with the broadcast schedule on the broadcast content before or after the broadcast of the broadcast content, and the server 113 stores the broadcast schedule in the broadcast schedule DB 133 (FIG. 3(A)).

S171: The reception terminal 114 receives the broadcast program.

S172: The reception terminal 114 receives the input of a survey answer about the broadcast program by the operation from the user (FIG. 8, which will be described later). The reception terminal 114 stores the content of the input answer together with the time information and information on the broadcast station 12 broadcasting the broadcast program.

S173: The server 113 receives, from the reception terminal 114, the answer information generated by the processing in S172 and stored in the answer information storage unit 152 (FIG. 11, which will be described later).

S174: The server 113 collects the answer information from a plurality of users (FIG. 12, which will be described later). The collection is performed by referencing the time schedule of the broadcast schedule DB 133 and associating each piece of the answer information with the corresponding broadcast content. Furthermore, the server 113 finds out a user by referencing the user information of the user DB 138 for each answer, and performs collection in which each answer is associated with the attribute (for example: sex, age group, occupation or the like) of the user (FIG. 13, which will be described later).

S175: The results of the collection are generated as survey information. The generated survey information is provided to the broadcast station 12, the advertiser or the like.

Figure 6:
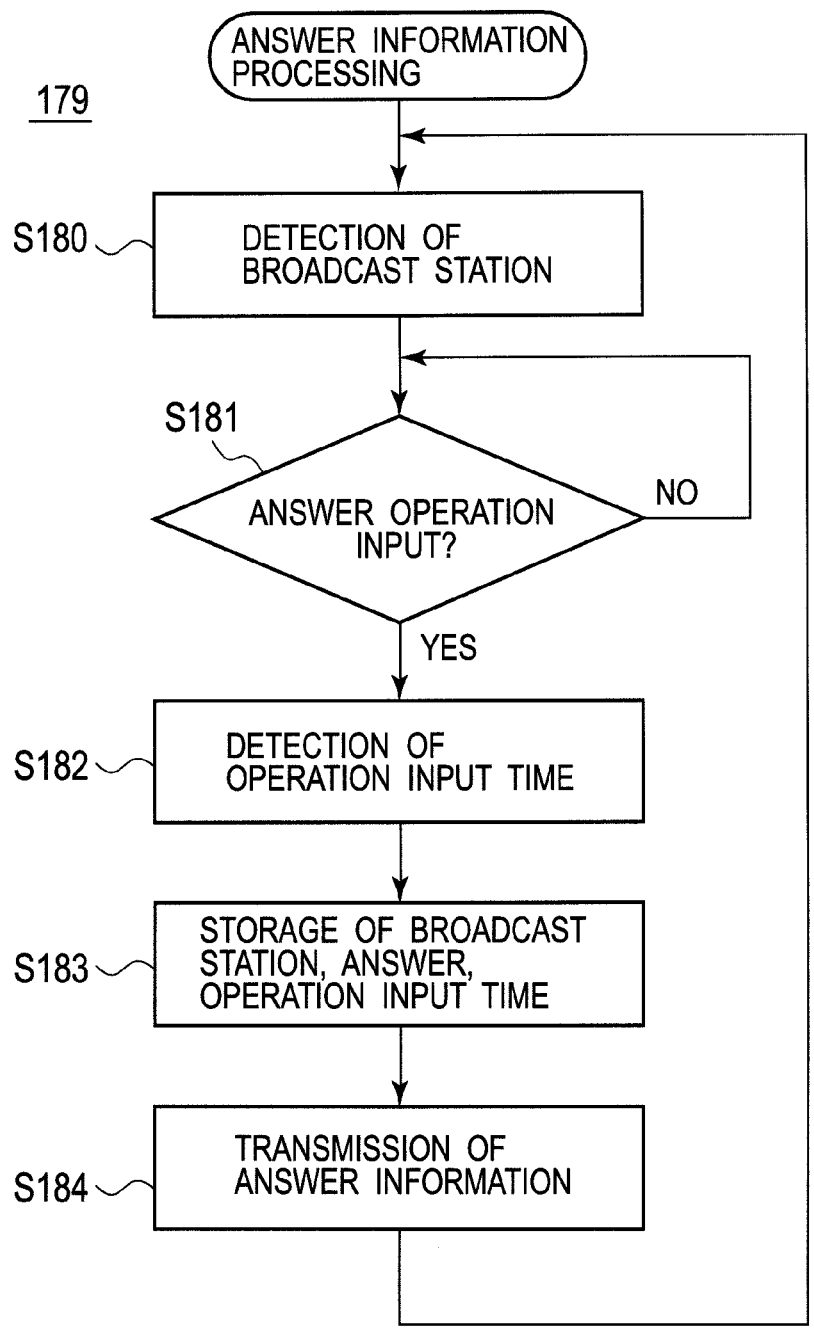
FIG. 6 is a flow chart of an answer information processing method in the reception terminal.

FIG. 6 is a flow chart of an answer information processing method 179 in the reception terminal 114. The answer information processing method 179 is the processing performed in S172 of FIG. 5. The individual steps of the answer information processing method 179 will be described.

S180: Information on the broadcast station 12 of the broadcast content that is currently viewed by the user is detected by the control unit 155.

S181: Whether or not an answer operation by the operation input from the user is performed is determined, and, as soon as the determination becomes true, the process proceeds to step S182.

Figures 7, 8:
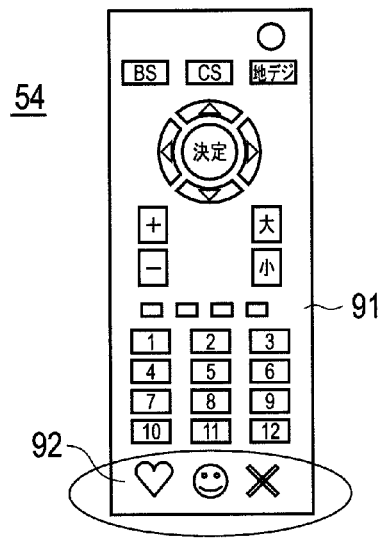
FIG. 7 shows an example of an operation input unit of the reception terminal.
FIG. 8 shows an example of user answer information at the reception terminal.

FIG. 7 shows an example of the operation input unit 154 of the reception terminal 114. The user performs the answer operation in S181 on the operation input unit 154. The operation input unit 154 includes a general operation key unit 91 and an answer key unit 92. The general operation key unit 91 is used in various operations other than the answer input of the reception terminal 114. The answer operation by the user is performed by pressing down any one of three buttons (heart mark, smile mark and x mark) on the answer key unit 92. In the example of FIG. 7, in case that the user "likes" the program or the advertisement during broadcast, the user presses the "heart mark"; in case of "acceptable", the "smile mark"; and in case of "dislike", the "x mark."

The shapes of the buttons are not limited to the shapes described above and the buttons may be formed in any shapes as long as the user can recognize which button corresponds to the user's answer. Hence, words such as "like", "dislike" and "normal" can be printed on the top surfaces of or around the buttons. Instead of the evaluations of "like" and "dislike," the buttons of "interesting" and "useful" in terms of different evaluations may be prepared to perform evaluations. Furthermore, buttons in terms of a plurality of evaluations (for example: tastes, interests and usefulness) may be prepared.

Reference is returned to FIG. 6.

S182: The time when the operation in S181 is performed is recorded.

S183: Information as to what is the broadcast station 12 broadcasting the program or the content of the answer target, the answer content and the answer time are stored in the answer information storage unit 152. FIG. 8 shows an example of the user answer information at the reception terminal 114. "FM" in the type of broadcast of FIG. 8 means analogue FM radio broadcast; in addition to the television broadcast, the broadcast system 10 can also collect user answers on the programs/advertisements of radio broadcast.

Each piece of the answer information can include the type of broadcast (for example: terrestrial digital TV and FM) on the broadcast content on which the user answer is based, the name of the broadcast station, the frequency of the broadcast wave, and the input date and time and content of the answer. The input date and time of the answer is detected by the clock unit 153 (FIG. 4(A)). The input content is input through the operation of the answer key unit 92 (FIG. 7) of the operation input unit 154 by the user, and is detected by the operation input unit 154 (FIG. 4(A)).

The type of broadcast, the frequency of the broadcast wave and the name of the broadcast station are detected by the tuner 147 (FIG. 4(A)). When the broadcast wave is an analogue broadcast wave, since the broadcast wave does not contain information on the name of the broadcast station, the reception terminal 114 references a DB that indicates a correspondence between the frequency and the name of the broadcast station, and thus can detect the name of the broadcast station. Since, on a national level, there is a case that a plurality of broadcast stations is present for the same frequency, regional information is included in the DB, and a broadcast station that has a broadcast target area the address of which is registered by the user for the reception terminal 114 and that has the frequency which agrees with the current reception frequency of the reception terminal 14 is searched for, and thus it is possible to find the name of the broadcast station. From the reception terminal 114 to the server 113, the type of broadcast and the frequency of the broadcast wave are transmitted excluding the name of the broadcast station, and the name of the broadcast station may be found by using a DB placed in the server 113 based on the type of broadcast and the frequency of the broadcast wave in the server 113.

S184: The answer information is transmitted to the server 113. Thereafter, the process returns to S181. The transmission of the answer information to the server 113 may be performed every predetermined time (for example: once every hour or once every day).

FIG. 9 is a flow chart of an answer collection processing method 1100 in the server 113. The answer collection processing method 1100 is the processing performed in S174 shown in FIG. 5.

S1101: The user answer information is received from the reception terminal 114.

S1102: The time information and the broadcast station information extracted from the answer information are checked against the time information and the broadcast station information in the broadcast schedule DB 133 (FIG. 3(A)).

S1103: As a result of the checking, whether or not a program or an advertisement that corresponds to the time information and the broadcast station information is present is determined. If the determination is true, the process proceeds to S1106 whereas, if not, the process proceeds to S1104.

S1104: The answer information is removed. This is because the program/advertisement corresponding to the answer information is not present.

S1105: Notify the reception terminal 114 of the fact that since the answer information is not included in the broadcast schedule, the answer information is not valid.

S1106: The user information in the user DB 138 (FIG. 3(A)) is checked based on the user ID or the reception terminal ID extracted from the answer information. A specific example of the user information and the answer information will be described later with reference to FIGS. 10 and 11.

S1107: As a result of the checking, whether or not the corresponding user information is present in the user DB 138 is determined. If the determination is true, the process proceeds to S1109 whereas, if not, the process proceeds to S1108.

S1108: The user information is newly registered in the user DB 138. In the user registration in the server 113, the user information received from the reception terminal 114 is registered. The process proceeds from S1108 to S1109. Alternatively, user registration screen content generated by the server 113 is transmitted from the server 113 to the reception terminal 114, a user registration screen is displayed on the reception terminal 114, the user is made to register the user information and the user information retuned from the reception terminal 114 to the server 113 can be registered in the reception terminal 114.

S1109: The answer information is registered in the user DB 138.

S1110: The answer information is compared with the past answer information by the same user in the user DB 138, and thereby, whether or not error information is present is detected. Specifically, whether or not the answer information from the same reception terminal 114 has been registered a plurality of times for a short period of time (for example, 10 seconds) is checked. If the registration has been performed, data of the answer information this time is removed. For example, if it is thought that the valid answer information cannot be obtained because the answer key is held pressed in the operation input unit 154 for some reason or other, the data is removed.

S1111: The answer information from the user is registered in the answer DB 134 for each program/advertisement. The first registration in the answer DB 134 is utilized for recollection processing on the answer information, which will be described later.

S1112: With respect to the answer information from the user, the user attributes such as age group, sex, occupation and the like of the user are determined with reference to the user DB 138, the answer information is classified according to the user attributes and recollection is performed on the answer information.

S1113: The results of the recollection is stored in the answer DB 134, and the information that the answer information recorded in the user DB 138 in association with the user is recorded as valid information is registered in the user DB 138. The valid information is utilized in processing for giving points or the like to the user of the answer information recorded as the valid information.

S1114: Contents such as the number of points of the valid information, conditions of an application for various prizes for utilization of the points and information on winning of the prizes are distributed to the reception terminal 114 of the user of the answer information this time.

FIG. 10 shows a specific example of the user information in the user DB 138. For each user, the attribute information on the ID (the reception terminal ID), age group and occupation is registered, and information on point given for the answer is associated with each user. The point given to each user may be a fixed point for one answer regardless of content or may be an extra point for an answer to predetermined content or for an answer made for a campaign period.

FIG. 11 shows a specific example of the user answer information recorded in the answer DB 134. The user answer information of FIG. 11 corresponds to the user answer information temporarily stored in the answer information storage unit 152 of FIG. 8. Specifically, the user answer information of FIG. 8 is the one before being transmitted to the server 113 in the reception terminal 114; the user answer information of FIG. 11 means the one that has been received by the server 113 from the reception terminal 114 and stored in the answer DB 134.

FIG. 12 shows a specific example of the collection result for each program. The collection result is generated in S1112 of the answer collection processing method 1100 (FIG. 9). The evaluations "like", "dislike" and "acceptable" shown in FIG. 12 correspond to the "heart mark", "x mark" and "smile mark" on the operation input unit 154 (FIG. 7), and the numbers of users who have answered "like", "dislike" and "acceptable" for the individual programs are collected. Although FIG. 12 shows the collection of the user answers on the programs of the main broadcast, the broadcast system 10 can also collect the answers such as "like" of the users on the advertisement of the main broadcast and the content of the data broadcast.

FIG. 13 shows a specific example of the collection result in which the user information is added to the collection result of FIG. 12. In the collection result of FIG. 12, the user answers "like", "dislike" and "acceptable" are simply collected whereas, in the collection result of FIG. 13, the user answers "like", "dislike" and "acceptable" are collected based on sexes. Since, as described with reference to FIG. 10, in the user information, not only the sexes of the users but also the age groups and occupations are registered, the favorability rating survey can be performed for the attributes thereof or the combinations of a plurality of attributes.

[1-2 Variable Questionnaire for Broadcast Wave Type Broadcast System: a Second Embodiment of the Broadcast System 10]

FIGS. 14 to 19 relate to a variable questionnaire broadcast system 10. Specifically, in the variable questionnaire broadcast system 10, the options for the user as the user answers on the broadcast content are changed by parameters such as the broadcast content, advertiser, answer time, broadcast station or area.

Figure 14:
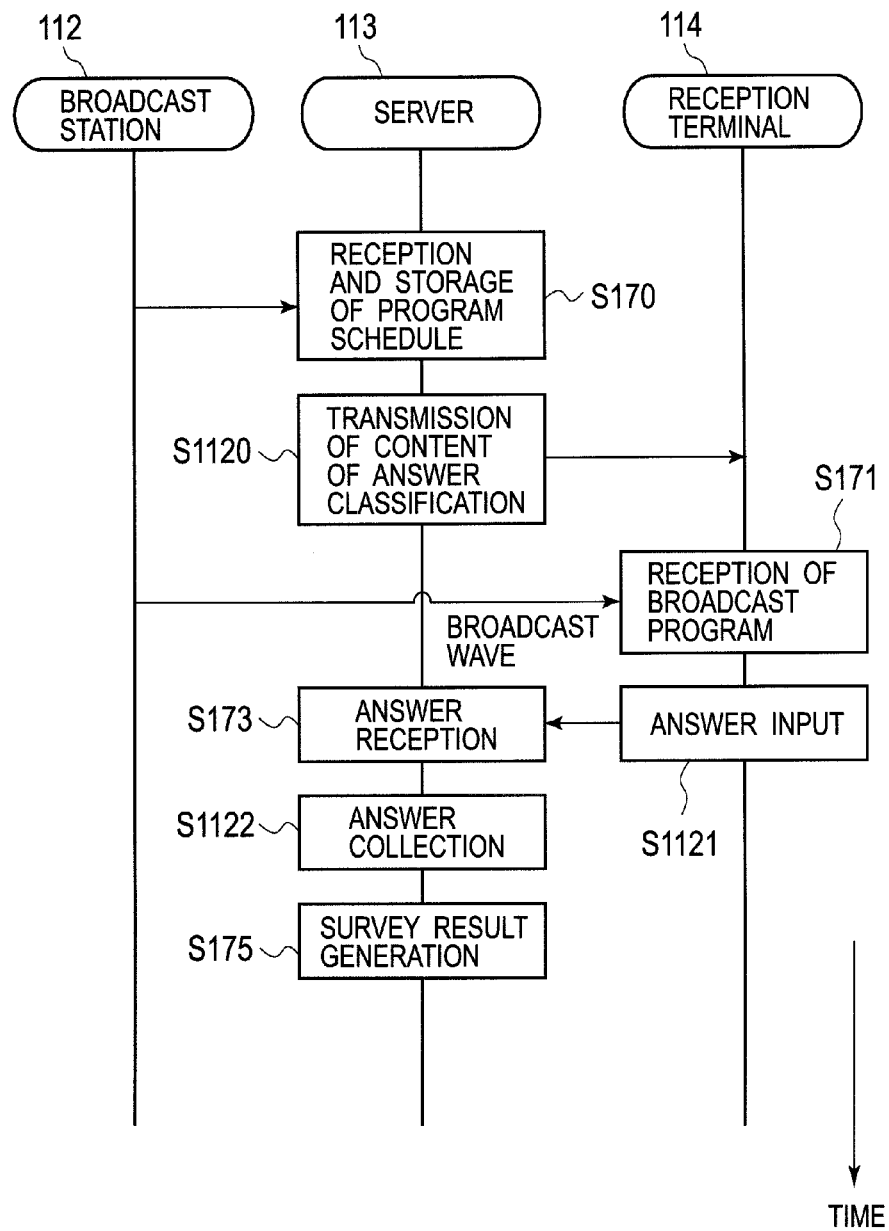
FIG. 14 is a ladder chart on processing between the individual elements in a variable questionnaire broadcast system.

FIG. 14 is a ladder chart on processing between the individual elements of the variable questionnaire broadcast system 10. The same processing as in the ladder chart of FIG. 5 is identified with the same symbol, the description thereof will not be repeated and only the differences therebetween will be described. In the ladder chart of FIG. 14, as compared with the ladder chart of FIG. 5, S1120 is added between S170 and S171, and S1121 and S1122 are replaced with S172 and S174.

S1120: Along the program schedule (broadcast schedule), the content of the questionnaire made at the time/broadcast station is transmitted to the reception terminal 114. Specifically, information on the questionnaire information of each broadcast station is read from the questionnaire DB 135 (FIG. 3(A)) according to the current time information, and is transmitted to the reception terminal 114.

S1121: The reception terminal 114 displays the content of the questionnaire received in S1120 according to a user request. The content of the questionnaire is related to the current time/broadcast station. After the display of the content of the questionnaire, the user input of the survey answer about the broadcast program is received. The reception terminal 114 stores, along with the time information and the broadcast information being received, the input of the answer in the answer information storage unit 152 (FIG. 4(A)), and transmits them to the server 113 through the Internet 11 at an appropriate time.

S1122: A description will be given later with reference to FIG. 16.

Figure 15:
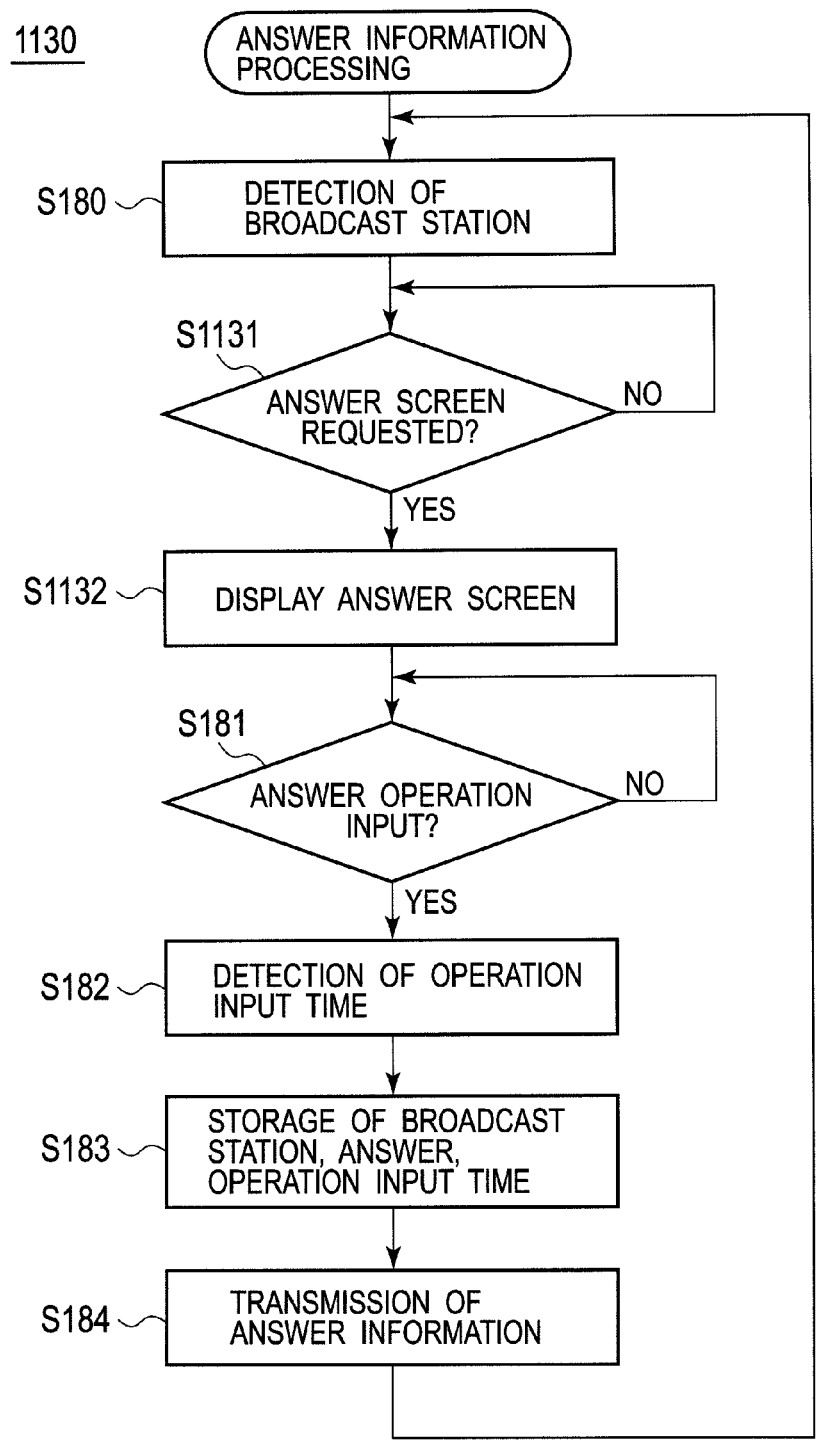
FIG. 15 is a flow chart of an answer information processing method in the reception terminal.

FIG. 15 is a flow chart of an answer information processing method 1130 in the reception terminal 114. The answer information processing method 1130 is the processing performed in S1121 of FIG. 14. In the answer information processing method 1130, the same steps as in the answer information processing method 179 of FIG. 6 are identified with the same numbers as in the answer information processing method 179, the description thereof will not be repeated and only the differences therebetween will be described. In the answer information processing method 1130, S1131 and S1132 are added between S180 and S181 in the answer information processing method 179.

S1131: Whether or not the answer screen for the program is requested by the user is determined. As soon as the determination becomes true, the process proceeds to S1132.

S1132: Based on the transmission content of the answer classification (survey items) received by the server 13 in S1120 (FIG. 14), the answer screen associated with the current broadcast station/time is generated and displayed.

FIG. 16 is a flow chart of an answer collection processing method 1140. The answer collection processing method 1140 is the processing performed in S1122 of FIG. 14. In the answer collection processing method 1140, the same steps as in the answer collection processing method 1100 of FIG. 9 are identified with the same numbers as in the answer collection processing method 1100, the description thereof will not be repeated and only the differences therebetween will be described. In the answer collection processing method 1140, S1141 is added between S1110 and S1111 in the answer collection processing method 1100.

S1141: The questionnaire DB 135 (FIG. 3(A)) is referenced, and to which questionnaire the content (answer information) of the user input corresponds is checked. FIG. 17 shows an example of the information content in the questionnaire DB 135. For each piece of the questionnaire information (corresponding to each line of FIG. 17), together with the broadcast schedule information (the type of broadcast, name of the broadcast station, broadcast program, broadcast start time and broadcast end time), the color keys and numerical keys of the general operation key unit 91 of the operation input unit 154 (FIG. 7) and the content of the answer options allocated to them are registered as allocated keys and key information. In FIG. 17, all broadcast contents are related to the programs of the main broadcast; with respect to the advertisements and the content of the data broadcast, the allocated keys and the key information can also be defined for each piece of contents.

FIG. 18 shows an example of the screen displayed, based on the questionnaire information of FIG. 17, on the display device 60 of the reception terminal 114. This screen is displayed when the processing in S1121 (FIG. 14) is performed. In the lower part of the screen of the display device 60, information that is used to show the user to which numerical keys of the general operation key unit 91 of the operation input unit 154 (FIG. 7) what types of answer options are allocated is displayed. On the body of the screen of the display device 60, the broadcast content of the answer target may be displayed or the questionnaire screen for the broadcast content of the answer target may be displayed only during the answer period of the user either temporarily or only for a predetermined period of time. On the questionnaire screen, for example, the questionnaire "What do you think about the program? Please select from the following options" is displayed.

FIG. 19 shows an example of data that is temporarily stored in the answer information storage unit 152 (FIG. 4(A)) of the server 113 based on the user answer to the answer screen of FIG. 18 in the reception terminal 114.

Since, in the variable questionnaire user answer broadcast system 10, the server 113 can allocate the options for the answer to the questionnaire to the keys of the operation input unit 154, it is possible to freely set the options for the answer to the questionnaire on various programs.

[2 IP Type Broadcast System: Broadcast System 1160]

FIGS. 20(A) to 26 relate to an IP type broadcast system 1160. In the broadcast system 1160, each of reception terminals 1163 can receive broadcast content from the broadcast station 12 both through the broadcast wave and through the Internet 11; in principle, the reception terminal 1163 receives it through the Internet 11. In the broadcast of the broadcast content through the Internet 11, IP (Internet protocol) is utilized. When the broadcast station selected by the user in the reception terminal 1163 does not perform the corresponding IP broadcast (which is defined as a broadcast system that broadcasts the broadcast content through a network, utilizing the IP), the reception terminal 1163, since it has difficulty in receiving the broadcast content by the IP broadcast, outputs the broadcast content received through the broadcast wave from the selected broadcast station.

Figure 20:
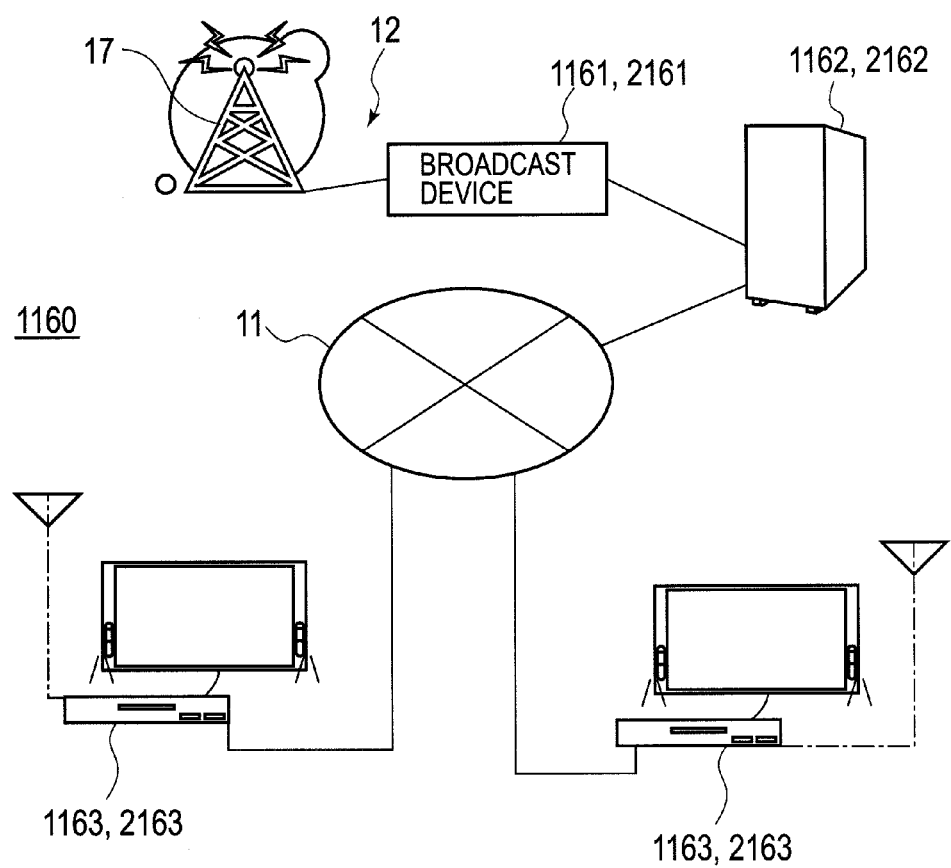
FIG. 20 is a schematic diagram of a broadcast system of an IP type broadcast system.

FIG. 20 is a schematic diagram of the broadcast system 1160. In the broadcast system 1160, the same elements as in the broadcast system 10 are identified with the same symbols as in the broadcast system 10, the description thereof will not be repeated and only the differences will be described.

The broadcast station 12 broadcasts the broadcast content from the radio tower 17 through the broadcast wave, and sends data of the broadcast content to a server 1162 through a dedicated line or the Internet 11. The broadcast station 12 can have the server 1162 dedicated for its own station. Only when each of the reception terminals 1163 is present within a broadcast target area prescribed by the law of the broadcast wave of the broadcast station 12, the reception terminal 1163 can receive the broadcast content from the server 1162 through the Internet 11 and output it. The permission and prohibition of the output of the broadcast content from each of the reception terminals 1163 through the Internet 11 may be determined and controlled by the reception terminal 1163 itself on the broadcast content received from the server 1162 or may be controlled by determining whether or not the broadcast content is transmitted when the server 1162 transmits the broadcast content to the reception terminal 1163.

Figure 21A:
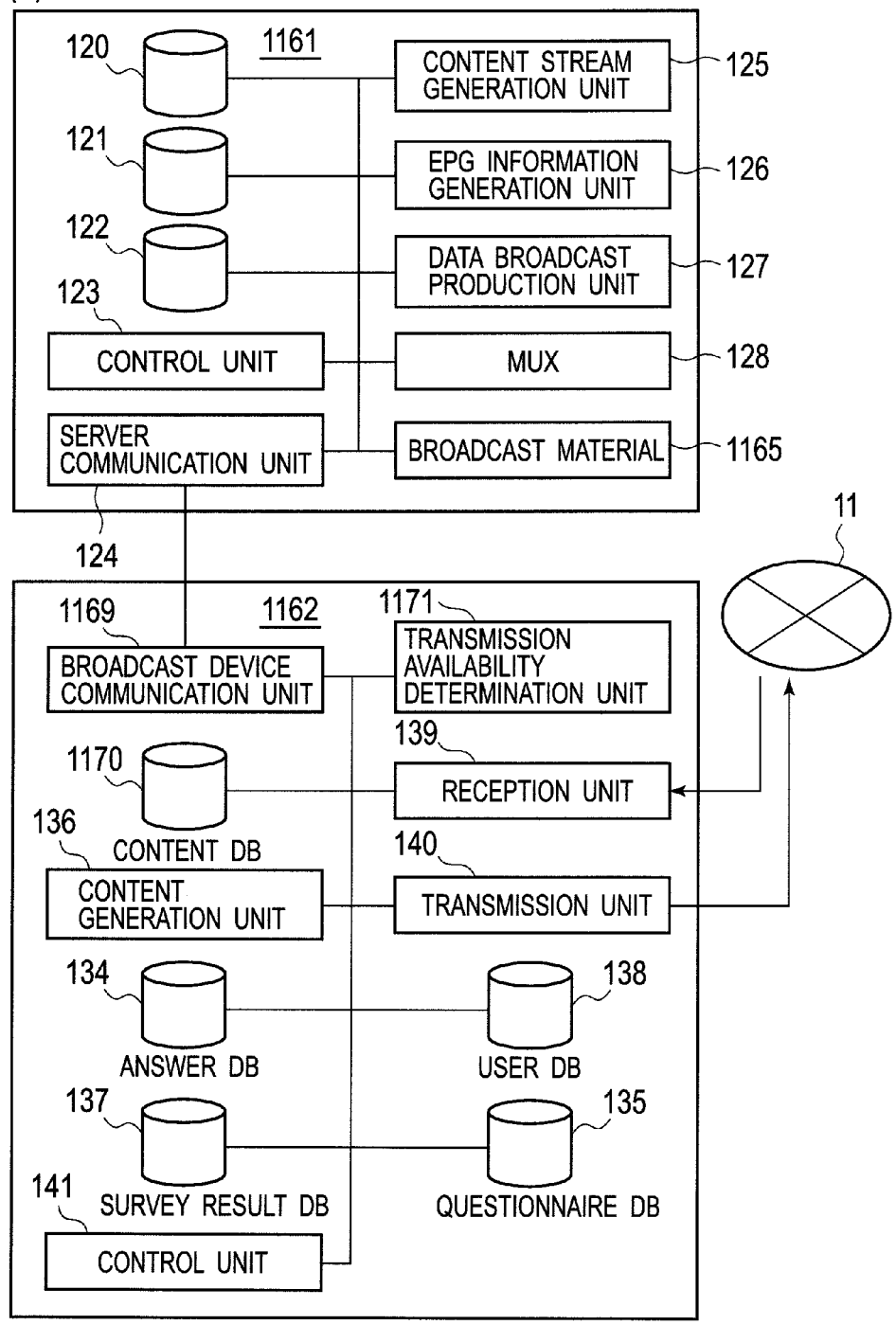
FIG. 21A is a detailed diagram showing the configuration of a broadcast device and a server of FIG. 20.

FIG. 21A is a detailed diagram showing the configuration of a broadcast device 1161 and the server 1162 of FIG. 20. In the broadcast device 1161 and the server 1162, the same elements as in the broadcast device 116 (FIG. 2(A)) and the server 113 (FIG. 3(A)) of the broadcast system 10 are identified with the same elements as in the broadcast device 116 and the server 113, the description thereof will not be repeated and only the differences will be described.

In the broadcast device 1161, a broadcast material 1165 is added to the broadcast device 116. In the server 1162, a broadcast device communication unit 1169, a content database 1170 and a transmission availability determination unit 1171 are added to the server 113. Although the broadcast material 1165 is basically the same as data corresponding to a broadcast signal from the MUX 128 to the radio tower 17, the broadcast material 1165 may be the corresponding data with the data broadcast part removed therefrom or may be non-multiplexed data. In addition to the function of the broadcast device 116 of the broadcast system 10, the broadcast device 1161 has the function of transmitting the broadcast material 1165 from the server communication unit 124 to the server 1162 through a dedicated line or the Internet 11.

The server 1162 receives, in the broadcast device communication unit 1169, the broadcast content from the broadcast device 1161 through the dedicated line or the Internet 11, and records it in the transmission availability determination unit 1171. The content generation unit 136 generates the content of questionnaires. In the transmission availability determination unit 1171, not only the broadcast content received from the broadcast device 1161 but also content related to the broadcast and content generated by the content generation unit 136 are recorded. The broadcast content received from the broadcast device 1161 may be distributed, as it is, to the reception terminal 1163 without being stored in the transmission availability determination unit 1171.

The transmission availability determination unit 1171 determines, based on the user information, whether or not the content can be transmitted to the reception terminal 1163. Specifically, whether or not the reception terminal 1163 is present in an area where the broadcast is being performed is determined; if the determination is true, the reception of the content is allowed. Whether or not it is the area where the broadcast is being performed is determined by the reception condition of the broadcast in the reception terminal 1163. If the reception condition is poor, the position of the reception terminal 1163 may be found by another way such as the IP address of the reception terminal 1163 or a GPS (global positioning system). Since the IP address corresponding to the area where the reception terminal 1163 is present is given by an ISP (internet service provider), it is possible to find, from the IP address, the area where the reception terminal 1163 is present. With respect to the reception condition, when there is a first distribution request on the broadcast content of each broadcast station from the reception terminal 1163, the reception condition of the broadcast station in the reception terminal 1163 is registered in the user DB 138, and thereafter, when the broadcast station distributes the broadcast content, the detection of the reception condition and the determination of whether or not the distribution can be performed from the reception condition may be omitted.

FIG. 22(A) is a detailed diagram showing the configuration of the reception terminal 1163 of FIG. 20. In the reception terminal 1163, the same elements as in the reception terminal 114 (FIG. 4(A)) of the broadcast system 10 are identified with the same symbols as in the reception terminal 114, the description thereof will not be repeated and only the differences will be described. In the reception terminal 1163, a reception condition storage unit 1174 is added to the reception terminal 114. In the reception terminal 1163, the broadcast content of the broadcast wave is received by the tuner 147, and the reception condition (a received field strength and a bit-error rate) is measured and stored in the reception condition storage unit 1174, and is sent from the communication unit 151 through the Internet 11 to the server 1162. The communication unit 151 also sends the answer information to the server 1162 through the Internet 11. Since, depending on the broadcast station 12, there is a case where only the broadcast wave broadcast is performed and the IP network broadcast is not performed, when the user of the reception terminal 1163 selects the broadcast station 12 that does not perform the IP network broadcast, the reception terminal 1163 outputs, from the display device 60 and the sound reproduction device 61, the broadcast content output from the tuner 147.

[2-1 Fixed Questionnaire for IP Type Broadcast System: a Third Embodiment of the Broadcast System 1160]

Figure 23:
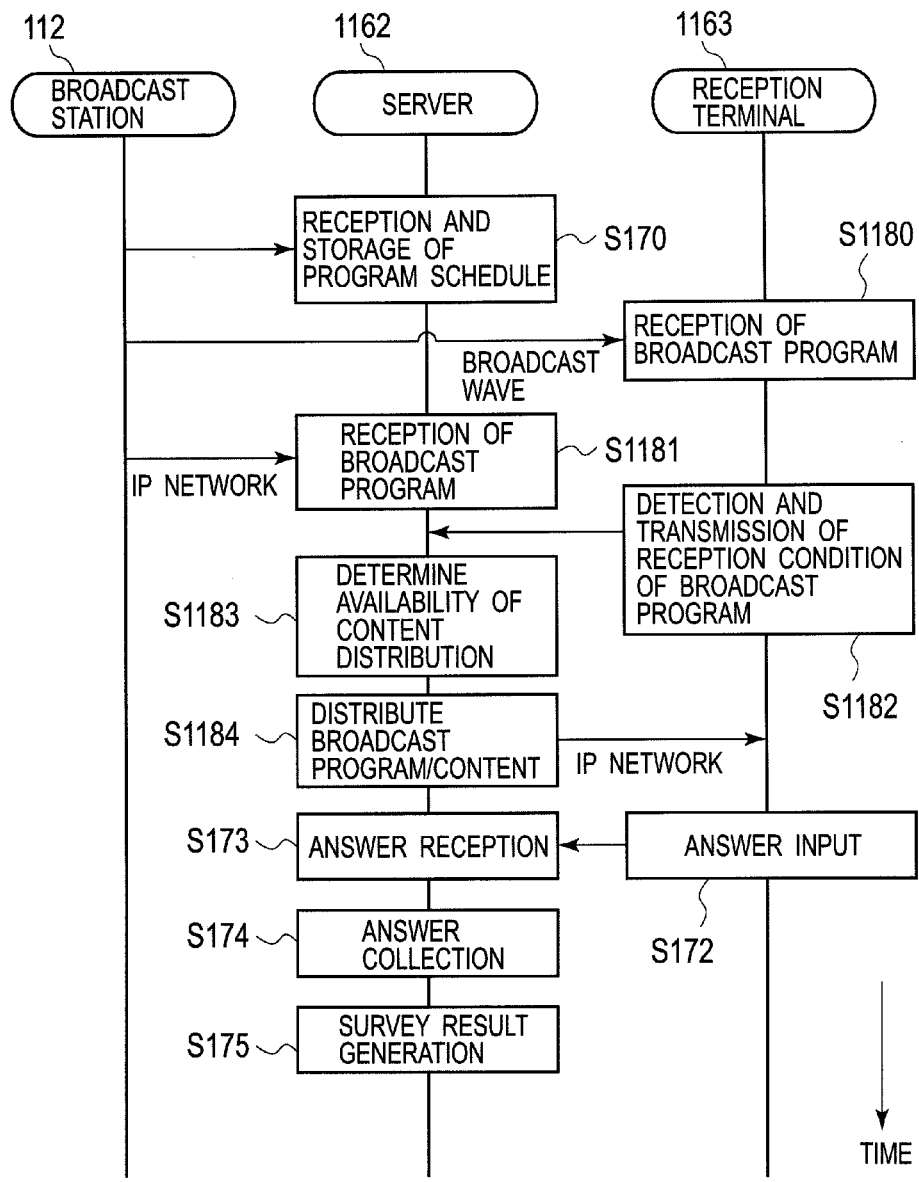
FIG. 23 is a ladder chart on processing between the individual elements of a fixed questionnaire user answer broadcast system.
Figure 24:
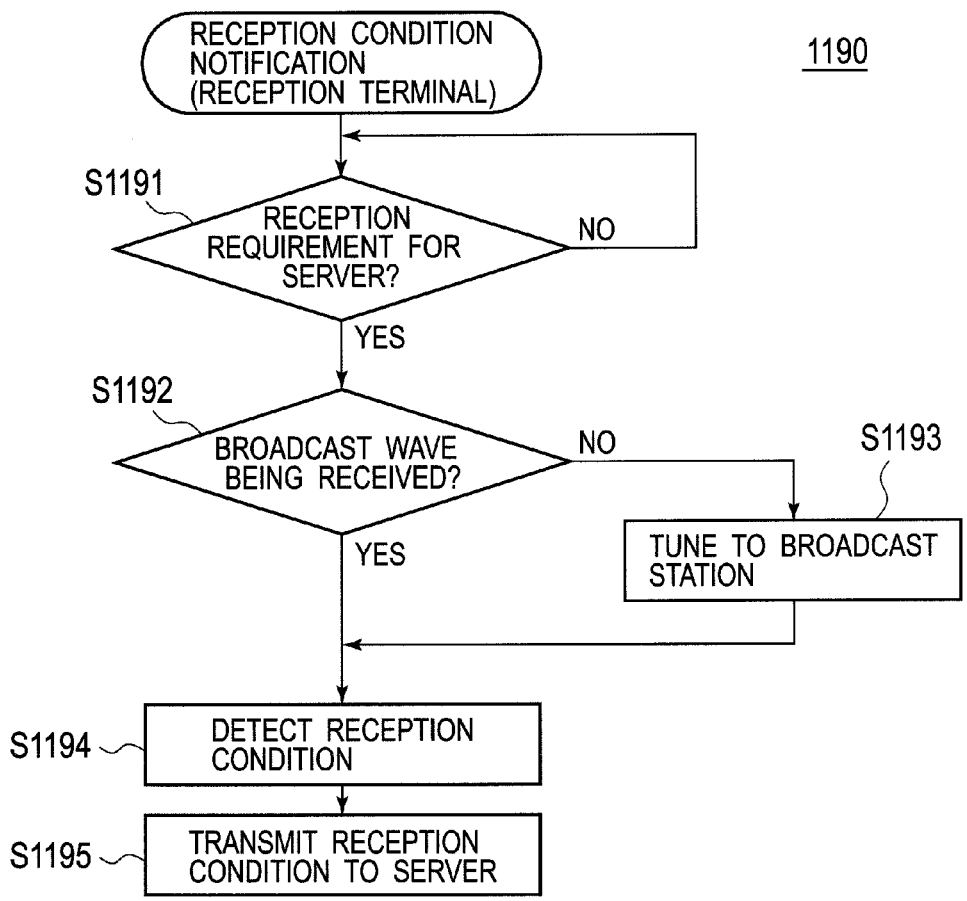
FIG. 24 is a flow chart of a reception condition notification method in the reception terminal.
Figure 25:
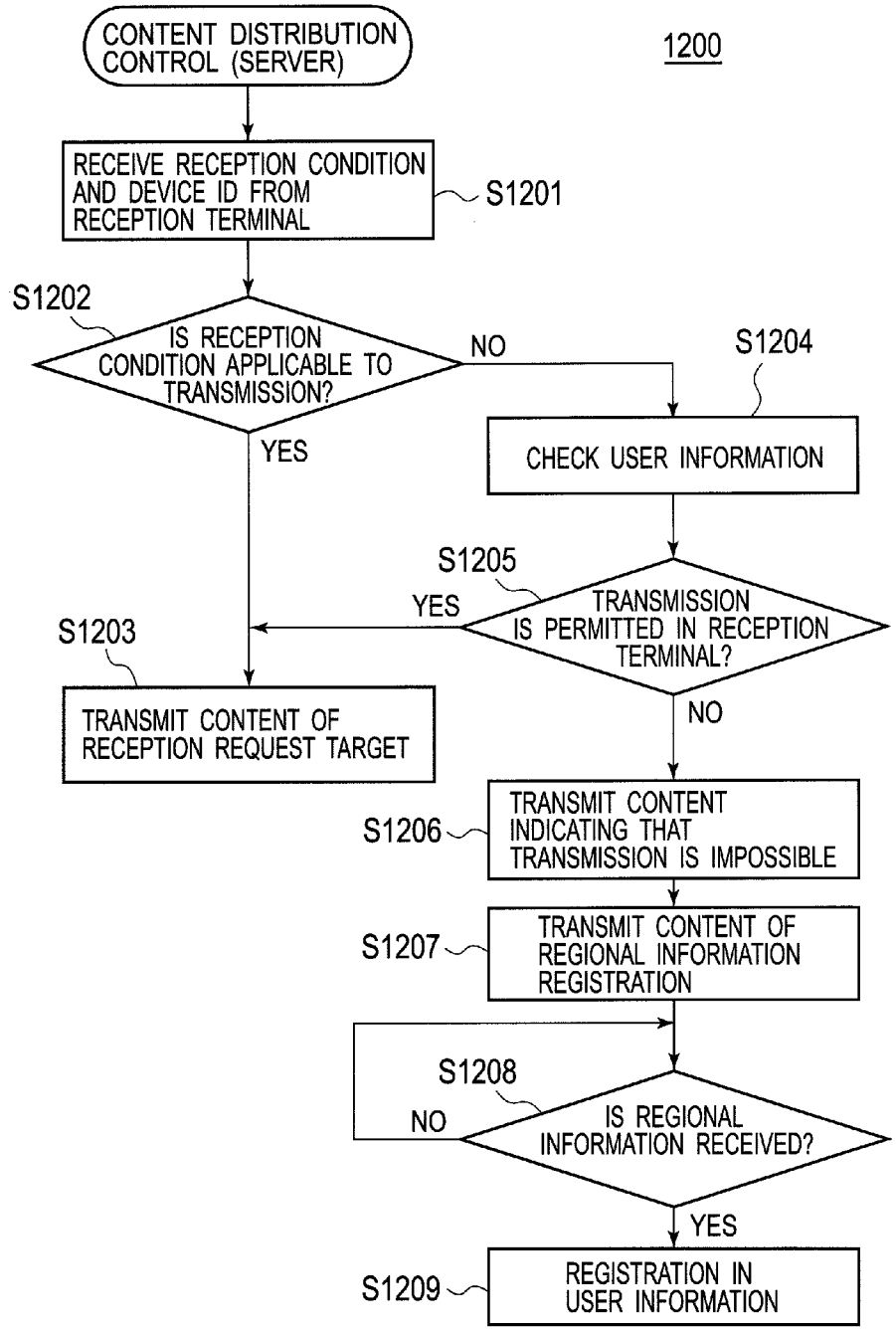
FIG. 25 is a flow chart of a content distribution control method.

FIGS. 23 to 25 relate to a fixed questionnaire distribution broadcast system 1160. In the fixed questionnaire distribution broadcast system 1160, as in the fixed questionnaire distribution broadcast system 10, the questionnaire for the user viewing the broadcast content is fixed regardless of broadcast content, broadcast station, broadcast time or the like.

FIG. 23 is a ladder chart on processing between the individual elements of the fixed questionnaire user answer broadcast system 1160. In FIG. 23, the same steps as in FIG. 5 are identified with the same step numbers as in FIG. 5, the description thereof will not be repeated and only the differences will be described.

In the ladder chart of FIG. 23, S1180 to S1184 are added to the ladder chart of FIG. 5.

In S1180, the reception terminal 1163 receives the broadcast content from the broadcast station 12 by the broadcast wave. The broadcast content received by the reception terminal 1163 through the broadcast wave is not used for the output of the content in the reception terminal 1163, and is received only for the detection of the reception condition in S1182, which will be described later.

In S1181, the server 1162 receives the broadcast program from the broadcast station 12 by IP distribution through the Internet 11. In S1182, the reception terminal 1163 detects the reception condition of the broadcast wave selected in S1182, and transmits the reception condition to the server 1162 through the Internet 11. In S1183, the server 1162 determines, from the reception condition received from the reception terminal 1163, whether or not the broadcast program and area-restricted content of the server 1162 may be transmitted to the reception terminal 1163. In S1184, the broadcast program/content is transmitted to the reception terminal 1163 that is determined by the server 1162 to be able to be distributed. A specific method of the determination will be described in S1202 of FIG. 25, which will be described later.

FIG. 24 is a flow chart of a reception condition notification method 1190 in the reception terminal 1163. In the reception condition notification method 1190, the processing in S1180 of FIG. 23 is performed.

S1191: Whether or not there is a request to the server 1162 for receiving the broadcast content from the broadcast station 12 via the server 1162 or the broadcast content generated uniquely by the server 1162 while the broadcast station 12 becomes a broadcaster is determined; as soon as the determination becomes true, the process proceeds to S1192.

S1192: Whether or not the broadcast wave is being received from the broadcast station 12 as a broadcaster of the broadcast content of the reception request target in S1191 is determined; if the determination is true, the process proceeds to S1194 whereas, if not the process proceeds to S1193.

S1193: The broadcast wave in S1192 is tuned.

S1194: The reception condition of the broadcast station 12 is detected. Specifically, the reception condition is determined by the reception terminal 1163 from the received field strength and the BER (bit-error rate) of the broadcast wave being tuned. If the received field strength is equal to or more than a predetermined threshold value or if the BER is less than a predetermined threshold value, the reception condition is determined to be satisfactory. In general, if the reception terminal 1163 is present within the broadcast target area, prescribed by the law, of the broadcast station 12 that is sending the broadcast wave being tuned, the reception condition is satisfactory whereas, if it is present outside the broadcast target area, the reception condition is poor. In particular, when the reception terminal 1163 is portable type or vehicle-mounted type, even if the reception terminal 1163 is present within the broadcast target area, the reception condition may be poor in a place such as an underground mall, a tunnel or an area covered by the shadow of a building.

S1195: The information on the detected reception condition is notified to the server 1162 through the Internet 11.

FIG. 25 is a flow chart of a content distribution control method 1200. In the content distribution control method 1200, the processing in S1183 and S1184 of FIG. 23 is performed.

S1201: The reception condition information and the reception terminal ID are received from the reception terminal 1163.

S1202: From the reception condition, whether or not the content of the broadcast program and the like (in addition to the broadcast program, the advertisement and the data broadcast content are included) can be transmitted (whether or not the transmission should be allowed or prohibited) is determined. Specifically, whether or not the reception terminal 1163 is recognized to be present within the broadcast target area of the broadcast station 12 as a broadcaster of the content is determined from the reception condition of the content of the broadcast program or the like by the broadcast wave in the reception terminal 1163. If the determination is true, the process proceeds to S1203 whereas, if not, the process proceeds to S1204. In general, if the reception condition in the reception terminal 1163 is satisfactory, the determination in S1202 is true whereas, if it is poor, the determination in S1202 is not true.

S1203: The content to which the reception terminal 1163 is outputting a reception request is distributed to the reception terminal 1163 through the Internet 11.

S1204: The reception terminal ID is checked against the user information in the user DB 138 (FIGS. 21A and 21B). Even if the reception condition is poor, there may be a case where the transmission of the content to the reception terminal 1163 of the reception terminal ID is allowed, and a place where the reception terminal 1163 of the reception terminal ID is present is checked from the user information registered by the user. When the reception terminal 1163 is stationary, specific examples of the user information for specifying the place where the reception terminal 1163 is present are: (a) the IP address of the reception terminal 1163; (b) the address, zip code and telephone number including the area code when the address, zip code and telephone number including the area code registered by the user are determined to be true; and (c) GPS (global positioning system) information on the present location of the reception terminal 1163. Even when the reception terminal 1163 is portable type or vehicle-mounted type, (a) and (b) are available.

S1205: Whether or not the reception terminal 1163 is present in the broadcast target area of the broadcast station 12 as a broadcaster of the content of the reception request target, that is, whether or not the reception terminal 1163 is the reception terminal whose content is allowed to be transmitted is determined based on the checking in S1204. If the determination is true, the process proceeds to S1203 whereas, if not, the process proceeds to S1206.

S1206: The information that the content cannot be transmitted is transmitted to the reception terminal 1163 as a reception request source.

S1207: Content indicating a method of registering regional information is transmitted to the reception terminal 1163 as the reception request source. The regional information registration is to make the user of the reception terminal 1163 register information (for example: a zip code, address or telephone number including an area code) on the place where the reception terminal 1163 is stationary.

S1208: Whether or not the regional information registered by the user of the reception terminal 1163 that transmits content for the regional information registration is received is determined; as soon as the determination becomes true, the process proceeds to S1209.

S1209: The regional information received in S1208 is registered in the user DB 138 as the user information in association with the user ID or the reception terminal ID (FIGS. 21A and 21B).

Reference is returned to FIG. 23. In S173 of FIG. 23, as in S173 of FIG. 14, the server 1162 may check the program schedule received from the broadcast station 12 using the time of the user answer from the reception terminal 1163, and thereby specify the program of the answer target. Furthermore, since the server 1162 grasps distribution times on programs that the server 1162 distributes to the reception terminal 1163, in S173 of FIG. 23, the server 1162 itself can produce the program schedule without receiving the program schedule from the broadcast station 12, check the program schedule produced by itself using the time of the user answer from the reception terminal 1163 and specify the program of the answer target. Moreover, in addition to broadcast wave content from the broadcast station 12, the server 1162 can distribute, to the reception terminal 1163, content that is uniquely distributed by the server 1162 and that is broadcast by the broadcast station 12; when the content is distributed as described above, the broadcast schedule is produced by itself, and the broadcast schedule produced by itself can be used for checking when the broadcast content of the answer target for the content generated by itself is specified.

[2-2 Variable Questionnaire for IP Type Broadcast System: a Fourth Embodiment of the Broadcast System 1160]

Figure 26:
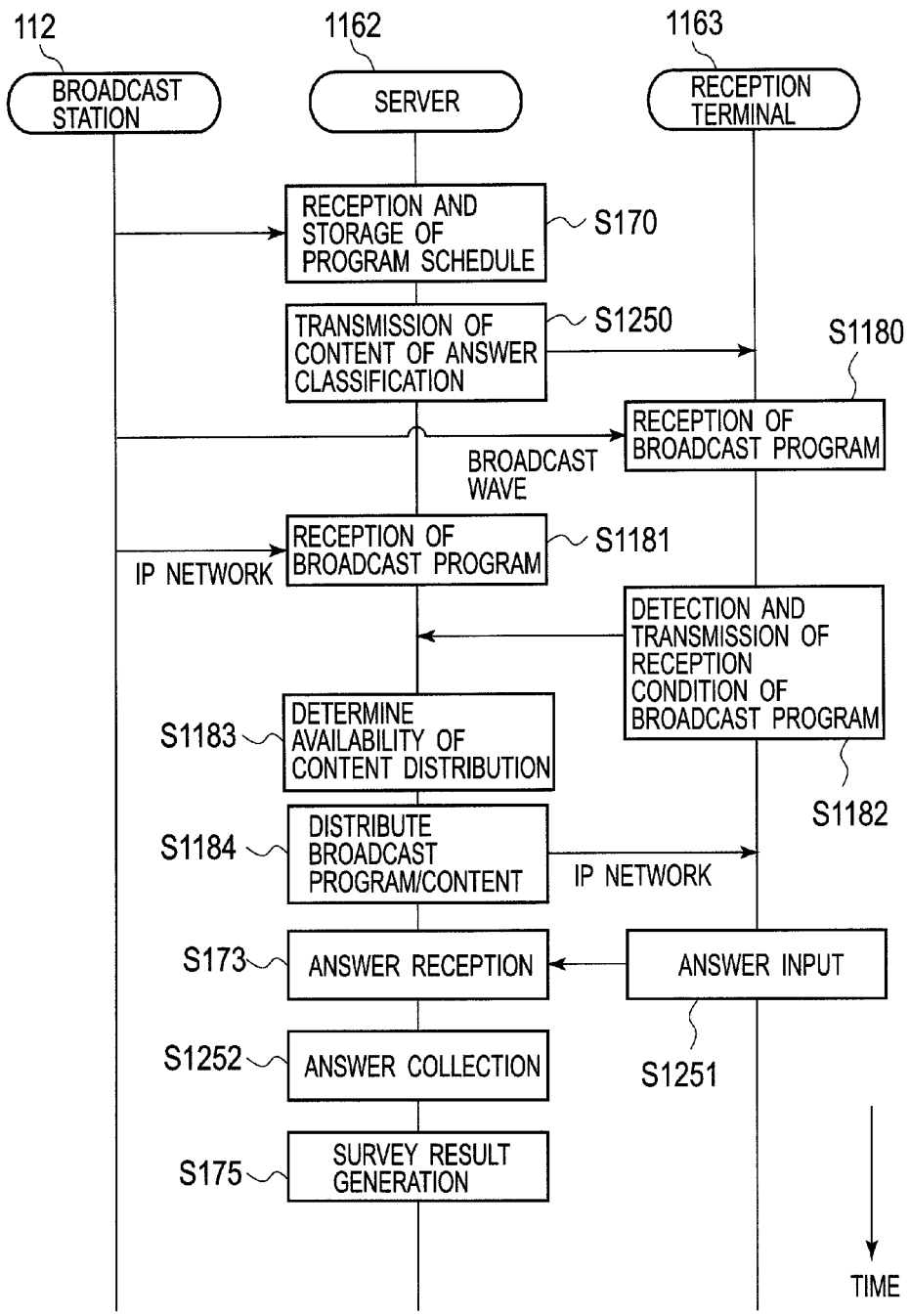
FIG. 26 is a ladder chart on processing between elements of a variable questionnaire user answer system in the broadcast system.

FIG. 26 relates to a variable questionnaire broadcast system 1160. In the variable questionnaire broadcast system 1160, as in the variable questionnaire broadcast system 10, the options for the user as the user answer to the broadcast content are changed by parameters such as the broadcast content, advertiser, answer time, broadcast station, area and the like.

FIG. 26 is a ladder chart on processing between the elements of a variable questionnaire user answer system in the broadcast system 1160. In the ladder chart of FIG. 26, the same processing as in the ladder chart of FIG. 23 is identified with the same processing number in the ladder chart of FIG. 23, and the description thereof will not be repeated. The processing in S1250 to S1252 of FIG. 26 are substantially the same as in S1120 to S1122 of FIG. 14.

S1250: Along the program schedule, the content of the questionnaire made at the times and in the broadcast programs (the broadcast programs are all programs that are broadcast by the broadcast station 12 and that are distributed by the server 1162 through the Internet 11; hence broadcast content different from the broadcast wave broadcast content is also included) is transmitted to the reception terminal 1163. Specifically, the current time information and information on answer classification corresponding to the broadcast program are read from the questionnaire DB 135 (FIGS. 21A and 21B), and content related to the answer classification is transmitted to the reception terminal 1163.

S1251: The reception terminal 1163 displays the content related to the answer classification received from the server 1162 in S1250, according to the user request. After the display, by an operation from the user, the input of a survey answer about the broadcast program is received. The reception terminal 1163 stores, along with the time information and the reception terminal information being received, the input of the answer in the answer information storage unit 152 (FIG. 22(A)), and the information stored in the answer information storage unit 152 is transmitted to the server 1162 immediately or at an appropriate time.

S1252: The server 1162 checks the questionnaire DB 135 (FIGS. 21A and 21B) against the answer information received from the reception terminal 1163 in S173, specifies the content of the questionnaire associated with the answer information, associates the content of the questionnaire with the answer information and stores it in the answer DB 134 (FIGS. 21A and 21B).

[Summary: User Answer Collection System 1280]

Figure 27:
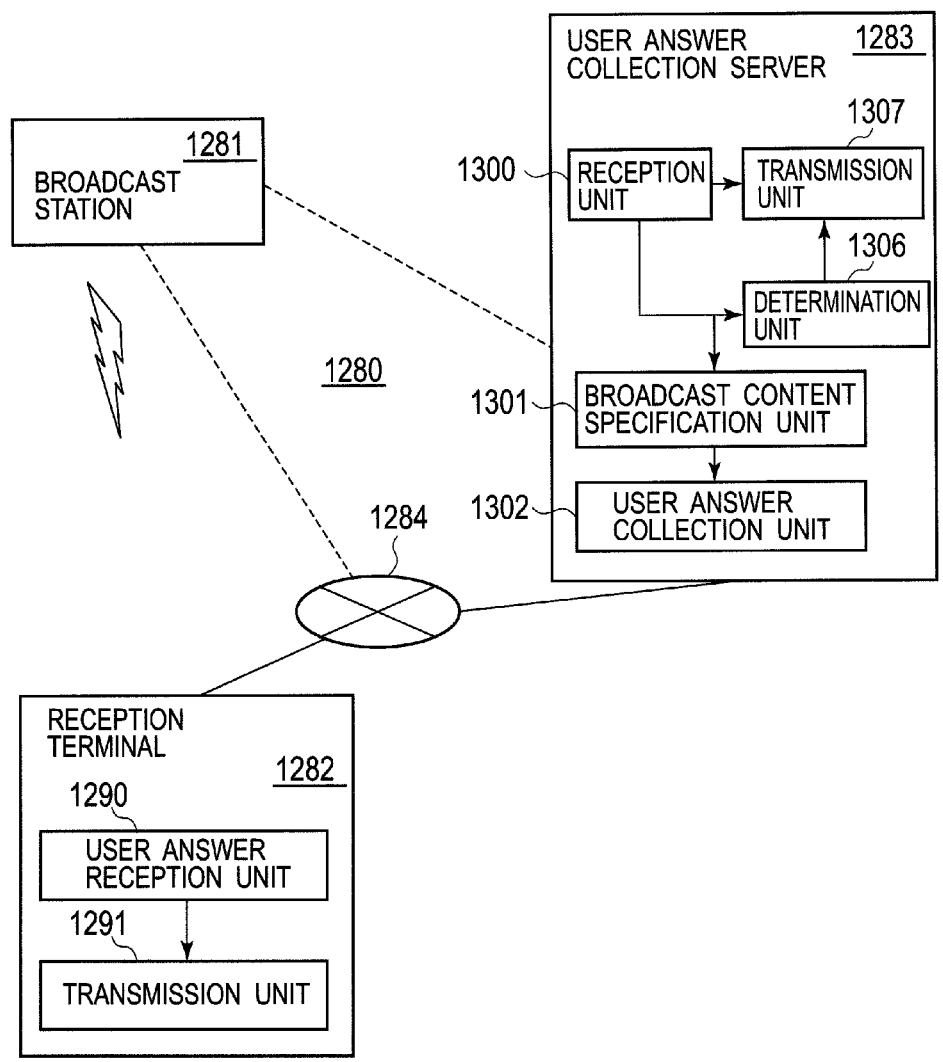
FIG. 27 is a diagram showing the configuration of the broadcast system.

FIG. 27 is a diagram showing the configuration of a user answer collection system 1280. Specific examples of the user answer collection system 1280 are the broadcast systems 10 and 1160. The user answer collection system 1280 includes a broadcast station 1281, a reception terminal 1282 that receives broadcast content with the broadcast station 1281 as a broadcaster and a user answer collection server 1283. The reception terminal 1282 and the user answer collection server 1283 transmit and receive data through a network 1284. The broadcast station 1281 and the user answer collection server 1283 transmit and receive data through a dedicated line or the network 1284.

The broadcast content with the broadcast station 1281 as a broadcaster is used with the intension of including, for example, (a) broadcast content that the broadcast station 1281 broadcasts using the broadcast wave, (b) broadcast content which has the same broadcast content of the broadcast wave by the broadcast station 1281 and which is delivered from the server such as the user answer collection server 1283 using an IP network, and (c) broadcast content which is different from the broadcast content of the broadcast wave by the broadcast station 1281 and which is delivered from the server such as the user answer collection server 1283 using the IP network under the name of the broadcast station 1281. The broadcast content is either the program of the main broadcast or the advertisement or the program of the data broadcast or the advertisement.

The reception terminal 1282 includes a user answer reception unit 1290 and a transmission unit 1291. The user answer reception unit 1290 receives the user answer about the broadcast content of the survey target from the user. The transmission unit 1291 transmits the answer information including the user answer about the broadcast content of the survey target, a broadcast source and a broadcast time to the user answer collection server 1283 through the network 1284.

The user answer collection server 1283 includes a reception unit 1300, a broadcast content specification unit 1301 and a user answer collection unit 1302. The reception unit 1300 receives the user answer information on the broadcast content through the network 1284. The broadcast content specification unit 1301 references the content broadcast time information of itself based on the broadcast source and the broadcast time of the broadcast content extracted from the received user answer information, and specifies the broadcast content of the survey target on the user answer information. The user answer collection unit 1302 uses the user answer extracted from the received answer information as a user answer about the specified broadcast content, and collects the user answers from a plurality of uses on the broadcast contents.

A specific example of the network 1284 is the Internet 11 (FIG. 1). The reception terminal 1282 is typically stationary type; it may be portable type or vehicle-mounted type. The broadcast content is typically the program of digital television broadcast or the advertisement; it may be the program of data broadcast, the program of radio broadcast or the advertisement. The reception terminal 1282 receives the broadcast content by the broadcast wave or through the IP network.

In the user answer collection system 1280, the user answer collection server 1283 checks, based on the information on the broadcast source and the broadcast time included in the answer information, the content broadcast time information on the broadcast content of the user answer target of the answer information against the answer information received from the reception terminal 1282, and thus, it is possible to appropriately gasp the answer information. It is therefore possible to omit the transmission of information for associating the user answer with the broadcast content of the survey target from the broadcast station 1281 to the reception terminal 1282 through data broadcast.

Since, in the user answer collection system 1280, the user answer collection server 1283 receives the user answers on the broadcast content, it is possible to utilize the user answers to grasp the degree of feedback to the broadcast content by counting the number of users who have made the user answer. Moreover, since the degree of feedback to the broadcast content is related to a viewing rating, the number of user answers to the broadcast contents can be used as a guideline for the viewing rating of the broadcast content.

The typical reception terminal 1282 transmits the transmission request for survey item information on the broadcast content of the survey target to the user answer collection server 1283 through the network 1284. The user answer reception unit 1290 receives user answers made by the user on the survey items of the survey item information that is transmitted for the transmission request from the user answer collection server 1283 through the network 1284.

Then, in the typical user answer collection server 1283, the reception unit 1300 receives the transmission request for the survey item information on the broadcast content of the survey target from the reception terminal 1282 through the network 1284. A transmission unit 1307 transmits, to the reception terminal 1282 of the transmission request source, the survey item information associated with the broadcast content of the survey target for the transmission request. The user answer collection unit 1302 specifies the broadcast content of the survey target and the survey items associated with the received user answer information, and collects the user answers on the broadcast content of the survey target based on the survey items.

Specific examples of this are [1-2 Variable questionnaire broadcast system 10] and [2-2 Variable questionnaire broadcast system 1160] described previously.

In the reception terminal 1282, the user answer made on the broadcast content is made by the user with the survey items variable, and thus it is possible to appropriately collect the user answers.

The survey items of the survey item information are associated with, for example, the broadcast content of the survey target itself, the genre (for example: drama, music and sport) of the broadcast content of the survey target, the broadcast time of the broadcast content of the survey target, the broadcast source of the broadcast content of the survey target and/or the broadcast area of the broadcast content of the survey target. Specifically, the case where the survey item information is associated with the broadcast content of the survey target itself refers to a case where the survey item is set for each piece of broadcast contents.

Typically, each of the survey items has a plurality of options, and one that the user of the reception terminal 1282 has selected from a plurality of options for one survey item is used as the user answer. The number of options selected is typically one; a plurality of options may be selected. Specific examples of the options are the "like", "dislike" and "acceptable" respectively allocated to the "heart mark", "smile mark" and "x mark" on the answer key unit 92 of the operation input unit 154 of FIG. 7.

Preferably, the survey item information includes information as to which one of the operation keys of the reception terminal 1282 each option is allocated to. Specific examples thereof are the "like" and "dislike" allocated to red and blue color keys in FIG. 17 and the "interesting" and "boring" allocated to numeral keys of "1" and "2." Examples of the survey items include (a) a favorability rating for the broadcast content itself, (b) a favorability rating for an article in an advertisement in the case of an advertisement, (c) a favorability rating for a sponsor in the case of an advertisement, (d) a favorability rating for an actor involved therein and (e) a desired broadcast time. In this way, it is possible to smoothly allocate the user operation keys according to the options of the survey items.

Typically, the reception terminal 1282 receives the broadcast content of the survey target either from the broadcast station 1281 by the broadcast wave or from the broadcast station 1281 or the user answer collection server 1283 through the network 1284 (typically, IP is utilized). The user answer collection server 1283 either receives the content broadcast time information from, for example, the broadcast station 1281 or generates it based on the broadcast schedule of the broadcast content through the network 1284 or the broadcast record.

Preferably, the user answer collection server 1283 includes a determination unit 1306 and a transmission unit 1307. In this case, the reception unit 1300 receives the transmission request of the broadcast content from the reception terminal 1282 through the network 1284. The determination unit 1306 determines, for the transmission request of the broadcast content, whether or not the reception terminal 1282 of the transmission request source is present within the broadcast target area of the broadcast station as a broadcaster of the broadcast content of the transmission request target. Only if the determination of the determination unit 1306 is true, the transmission unit 1307 transmits the broadcast content of the transmission request target to the reception terminal 1284 of the transmission request source.

[3 Broadcast Wave Type Broadcast System: Broadcast System 10]

FIGS. 1, 2(B) to 4(B) and 28 to 40 relate to a broadcast wave type broadcast system 10. FIG. 1 is a schematic diagram showing the configuration of the broadcast system 10. In the broadcast system 10, each of the reception terminals 214 receives, through the Internet 11, the broadcast content (including the program of the main broadcast, the program of the data broadcast and the advertisement (CM) of the main broadcast) by the broadcast wave, from the radio tower 17 related to the broadcast station 12.

The broadcast system 10 includes the Internet 11, the broadcast station 12, a server 213 and a plurality of reception terminals 214. Although, for ease of illustration, in FIG. 1, one broadcast station 12 and one server 213 are only shown, the broadcast system 10 can include one or more broadcast stations 12 and one or more servers 213. The broadcast station 12 is typically a terrestrial television broadcast station; the broadcast station 12 may be an analogue radio broadcast station such as an FM radio broadcast station. One server 213 may be provided for each broadcast target area (for example, each of the prefectures) prescribed by the law, or one server 113 may be provided in common for a plurality of broadcast target areas. The server 213 may be dedicated for a specific broadcast station 12, or the server 113 may be provided in common for a plurality of broadcast stations 12.

The broadcast station 12 includes a broadcast device 216. The broadcast device 216 sends out broadcast programs, data broadcast and furthermore EPG (Electronic program guide) information and the like within its storage device according to a broadcast schedule through the broadcast wave from the radio tower 17. The broadcast device 216 also provides the server 213 with a detailed time table of programs such as programs through the broadcast wave, data broadcast, EPG information and advertisements through a dedicated line or the Internet 11. The "time table", the "program schedule" and the "broadcast schedule" are used to be synonymous with each other; they are all defined as a subordinate concept of "content broadcast time information." The concept of the "content broadcast time information" includes "CM tags information", which will be described later.

The server 213 records, in a DB (database), registrations and answers on favorability rating surveys of programs/advertisements (the subordinate concept of broadcast content), and acquires the timetable described above from the broadcast station 12. The server 213 also generates, from the time table, CM tags information (for example: FIG. 30, which will be described later) that is related to time information for each of advertisers, the brands of advertisements and types of advertisements. This time table and the tag information are encrypted, and they are supplied to the reception terminal 214. The reason why the time table and the tag information are encrypted is that the information may include not only information which is generally published as a program table but also secret content broadcast time information which the sponsor or a survey company uniquely sets. The server 213 also performs collection based on answers from the users for each of programs/advertisements. Furthermore, the server 213 can provide the users with questionnaire information on the favorability rating survey (for example: the generation of the answer information in S271*b* of FIG. 36, which will be described later).

The reception terminal 214 is typically intended to be placed in a house; the reception terminal 214 may be portable type or vehicle-mounted type. The reception terminal 214 receives, through an antenna, a program transmitted by the broadcast station 12 via the broadcast wave. The reception terminal 214 receives the time table and the tag information from the server 213, and records the information thereof. The reception terminal 214 sends registration information and answer information from the users to the server 213 though the Internet 11.

[3-1 Fixed Questionnaire for Broadcast Wave Type Broadcast System (a Fifth Embodiment of the Broadcast System 10]

FIGS. 2(B) to 4(B) and 28 to 35 relate to a fixed questionnaire broadcast system 10. Specifically, in the fixed questionnaire broadcast system 10, questionnaires for the users viewing broadcast content are fixed regardless of broadcast content, broadcast station, broadcast time or the like. In this example, questionnaires for the users are questionnaires for asking a favorability rating on the broadcast content viewed by the users; as described later, each time, the user answers by selecting one of three options on the favorability rating, namely, the "like", the "dislike" and "acceptable" on the answer key unit 92 of an operation input unit 54 of FIG. 7.

FIG. 2(B) is a diagram showing the configuration of the broadcast device 216. The broadcast device 216 is intended to be used for digital broadcast. The broadcast device 216 includes a main broadcast content DB 220, a broadcast schedule DB 221, a data broadcast content DB 222, a control unit 223, a server communication unit 224, a content stream generation unit 225, an EPG information generation unit 226, a data broadcast production unit 227 and a MUX (multiplexer) 228. The content stream generation unit 225 reads data on the main broadcast content (the programs/advertisements of the main broadcast), according to an instruction from the control unit 223, from the main broadcast content DB 220, along the broadcast schedule of the broadcast schedule DB 221, and generates stream data on the main broadcast content and sends it to the MUX 228. With respect to main broadcast content of live broadcast, the control unit 223 sends, to the MUX 228, stream data input into an unillustrated input unit of the broadcast device 216, as it is.

The EPG information generation unit 226 references the broadcast schedule of the broadcast schedule DB 221, generates the EPG information and outputs it to the MUX 228. The data broadcast production unit 227 reads data on the corresponding data broadcast according to the broadcast schedule of the broadcast schedule DB 221 from the data broadcast content DB 222, generates, based on this data, content on data broadcast such as information related to, for example, weather forecast or a program and sends it to the MUX 228. The MUX 228 multiplexes the data stream of the main broadcast content, the EPG information and the data broadcast content, and sends it to the radio tower 17; the multiplexed contents are sent from the radio tower 17 through the broadcast wave.

The server communication unit 224 sends the schedule table of the broadcast station 12 to the server 213. The schedule table may be either data on the broadcast schedule DB 221 itself or a more detailed table. The schedule table can include not only the data of the broadcast station 12 itself but also the data of other broadcast stations. Although the schedule table is generally generated before the start of broadcast of broadcast contents and is transmitted to the server 213, even the schedule table including the broadcast content after the start of the broadcast can be generated after the start of the broadcast of the broadcast content and transmitted to the server 213 as long as the user answer has not been input in the reception terminal 214.

FIG. 3(B) is a diagram showing the configuration of the server 213. The server 213 includes a broadcast schedule DB 233, an answer DB 234, a questionnaire DB 235, a content generation unit 236, a survey result DB 237, a user DB 238, a reception unit 239, a transmission unit 240, a control unit 241 and an encryption unit 242. The control unit 241 controls the entire server 213. In the broadcast schedule DB 233, detailed broadcast times such as the broadcast time of each CM and segments in the programs are stored. These are referred to as broadcast schedule data. Based on the information on the broadcast time of the CM tags information that is associated with time information is generated for each of the advertisers, the brands of advertisements and the types of advertisements, and is recorded in the broadcast schedule DB 233. These are referred to as CM tags information. The content broadcast time information includes both the broadcast schedule data and the CM tags information. The broadcast schedule can include not only the details of broadcast times of advertisements halfway through a program and between programs but also the details of broadcast times of segments and advertisements within a program. In general, the broadcast schedule data of the broadcast content is transmitted from the broadcast device 216 to the reception terminal 214 before the broadcast of the broadcast content; the broadcast schedule data may be transmitted during or after the broadcast of the broadcast content. The CM tags information is generated in the server 213 (S271 of FIG. 28, which will be described later).

In the user DB 238 are recorded the attribute information of the users (for example, sex, age, address, occupation and the like) on which the favorability rating survey is performed, user IDs or the IDs of the reception terminals 214 of the users and the like with respect to the broadcast content of the broadcast system 10 (the broadcast content includes not only the content of the main broadcast but also the content of the data broadcast; the content of the main broadcast includes not only programs but also advertisements). The encryption unit 242 encrypts the broadcast schedule data of the broadcast schedule DB 233 and the CM tags information. The transmission unit 240 transmits the information to companies and the like to which the questionnaires to the users and the results of the answer DB 234 are notified. The transmission unit 240 also transmits the encrypted broadcast schedule data and CM tags information to the reception terminal 214 through the Internet 11. The reception unit 239 receives the broadcast schedule information from the broadcast station and the answers from the users.

The answer DB 234 stores answer information including answer content and an answer time on the answer from the user, for which questionnaire the answer is made and the like while associating the answer information with the attribution information of the user who makes the answer. The questionnaire DB 235 records information on the content of the questionnaires to the user, a time period during which the questionnaire is received and the like. The survey result DB 237 stores results obtained by performing collection based on the questionnaire DB 235 and the answer DB 234. The content generation unit 236 generates content related to the content of the questionnaires to the user and programs and the like. The transmission unit 240 sends, to the Internet 11, the questionnaire to the user and information to a company or the like to which the results of the answer DB 234 are notified. The reception unit 239 receives, through the Internet 11, the broadcast schedule information from the broadcast device 216 and the answers from the users.

FIG. 4(B) is a diagram showing the configuration of the reception terminal 214. The reception terminal 214 includes a terminal body 245, a display device 60 and a sound reproduction device 61. The terminal body 245 includes an antenna 246, a tuner 247, a demodulation unit 248, a ROM 249, a RAM 250, a communication unit 251, an answer information storage unit 252, a clock unit 253, an operation input unit 254, a control unit 255, a video output unit 256, a sound output unit 257 and a broadcast schedule DB 258. The tuner 247 receives the radio wave from the broadcast station 12 through the antenna 246. The demodulation unit 248 demodulates, based on information received from the tuner 247, the received signals, and decodes each of the signals. Computer Programs and fixed data are stored in the ROM 249; the control unit 255 reads the data as appropriate. The RAM 250 is used so that the control unit 255 temporarily stores data during computation processing. The communication unit 251 exchanges, through the Internet 11, the questionnaire information, the answer information and the like with the server 213.

As described in FIG. 7, the operation input unit 254 is of a remote controller type, and is used to perform various operations on the reception terminal 214 by the users and input user answers on viewed content. The operation input unit 254 may be of a touch panel type instead of the remote controller type or may be of a sound input type. The clock unit 253 measures the date and time when the user provides an answer. In general, the time when the user provides an answer agrees with the time when the broadcast content of the answer target is broadcast. The answer information storage unit 252 temporarily stores the answers from the users, the date and time, the questionnaire information from the server 213 and the like, and sends them to the communication unit 251 at appropriate times.

The video output unit 256 converts display information sent from the control unit 255 into a display signal, and displays it on the display device 60. The sound output unit converts sound data from the control unit 255 into a sound signal, and it is reproduced by the sound reproduction device 61. The display device 60 is generally a display or a television set. The sound reproduction device 61 is generally a speaker. The display device 60 and the sound reproduction device 61 can be provided within the terminal body 245.

The received and encrypted broadcast schedule data and CM tags information are stored in the broadcast schedule DB 258. The broadcast schedule data and CM tags information are received from the server 213. The reception terminal 214 generally receives the broadcast schedule data and the CM tags information on the programs and ADs before the broadcast of the program and the ADs; the reception terminal 214 may receive them during or after the broadcast. The control unit 255 controls the tuner 247, the demodulation unit 248, the video output unit 256, the sound output unit 257, the broadcast schedule DB 258 and the like. The control unit 255 performs various types of processing described above according to an instruction from the user input by the operation input unit 254. Furthermore, when the answer from the user is input by the operation input unit 254, the control unit 255 performs control so as to decode the encrypted broadcast schedule data and CM tags information in the broadcast schedule DB 258 as appropriate and to store, according to the classification such as the program and the advertisement based on the date and time information, the answer information from the user in the answer information storage unit 252.

The fifth embodiment of the present system will now be described with reference to the ladder chart of FIG. 28.

S270: The broadcast station 12 provides the server 213 with the broadcast schedule scheduled for broadcast or the schedule information on the content broadcast after the broadcast, and the server 213 stores it in the broadcast schedule DB 233.

S271: The server 213 generates, based on the broadcast schedule, the CM tags information that is associated with the time information for each of the advertisers, the brands of advertisements and the types of advertisements.

S272: The broadcast schedule data and the CM tags information are encrypted, and are transmitted to each of the reception terminals 214. The server 213 utilizes the IP address of each of the reception terminals 214 for this transmission. Since, in general, the IP address of the server 213 is fixed and the IP address of each of the reception terminals 214 is variable, each of the reception terminals 214 notifies, for example, when started up, the IP address of itself to the server 213.

R273: The reception terminal 214 receives the encrypted broadcast schedule data and CM tags information from the server 213, and stores them in the broadcast schedule DB 258.

R274: The reception terminal 214 receives the broadcast program and the CM from the broadcast station 12 by the broadcast wave.

R275: The reception terminal 214 receives the input of the survey answer about the broadcast program by the operation from the user. The RAM 250 stores the input of answer together with the time information and the broadcast station information being received.

R276: The reception terminal 214 checks, based on the broadcast schedule DB 258, the time information against the user answer, analyzes the answer and stores it in the answer information storage unit 252.

R277: The reception terminal 214 transmits the answer information to the server 213 through the Internet 11. The transmission of the answer information is performed at a predetermined timing. The answer information may be transmitted to the server 213 at the time when the answer information is generated; in order for the load to the network to be reduced, the answer information is preferably transmitted late at night or the like.

S278: The server 213 receives the answer information from a plurality of reception terminals 214. As in the case where the data is encrypted and transmitted in the data transmission from S272 to R273, the data is encrypted in the data transmission from R277 to S278, with the result that the confidentiality of the user answer may be held.

S279: The server 213 collects the received answer information. The collection is performed based on the answer information from the users. With the user DB 238, collection based on the attribute information on the users is also performed.

S280: The results of the collection are generated as the survey information. The generated survey information is supplied to the broadcast station 12, the advertiser or the like.

FIG. 29 is a flow chart of an answer information processing method 290 specifically showing R273 to R277 of FIG. 28. The answer information processing method 290 is performed at each of the reception terminals 214.

R291: Information (for example: the type of broadcast and the reception frequency) on the broadcast station 12 whose broadcast content is currently being received is detected by the control unit.

R292: Whether or not the answer operation by an input operation from the user is performed is determined. If the determination is true, the process proceeds to R293.

FIG. 7 is an example of the operation input unit 254 of the reception terminal 214, and is the same as described in the first embodiment.

Reference is returned to FIG. 29.

R293: The time when the operation in R292 is performed is detected.

R294: The information on the broadcast station 12, the answer content and the answer time are stored in the answer information storage unit 252. FIG. 8 is an example of the user answer information generated in the processing in R294, and is the same as described in the first embodiment. "FM" in the type of broadcast shown in FIG. 8 means analogue FM radio broadcast; in addition to the television broadcast, the broadcast system 10 can also collect user answers on the programs/advertisements of radio broadcast.

As the attributes, each piece of answer information has the type of broadcast (for example: terrestrial digital TV and FM) on the broadcast content that is based on the user answer, the name of the broadcast station, the frequency of the broadcast wave, the date and time of the input of the answer and the content of the input. The content of the input is input through the operation of the answer key unit 92 (FIG. 7) of the operation input unit 254 by the user, and is detected by the operation input unit 254 (FIG. 4(B)).

The type of broadcast, the frequency of the broadcast wave and the name of the broadcast station are detected by the tuner 247 (FIG. 4(B)). When the broadcast wave is an analogue broadcast wave, since the broadcast wave does not contain information on the name of the broadcast station, the reception terminal 214 references a DB (not shown) where the frequency and the name of the broadcast station are associated with each other, and thus it is possible to detect the name of the broadcast station. Since, on a national level, a plurality of broadcast stations is present for the same frequency, regional information is included in the DB, and a broadcast station in which the address registered by the user in the reception terminal 214 is a broadcast target area and in which the frequency agrees with the current reception frequency of the reception terminal 214 is searched for, and thus it is possible to find the name of the broadcast station.

Reference is returned to FIG. 29.

R295: In order to check for which program or AD the user input this time is evaluated, from the information on the broadcast station 12 and the answer time that are input, whether or not the information on the broadcast station 12, the program and the AD is present in the broadcast schedule DB 258 is determined. If the determination is true, the process proceeds to R296 whereas, if not, the process proceeds to R298.

R296: The evaluation is associated with the program or the CM and is stored. If, for one program or CM, a predetermined number of inputs or more are performed for a predetermined period of time, the inputs are determined to be performed for the largest number of evaluations or to be an error, and all the data is deleted. Specifically, since the user can make an operational mistake to press down the answer input key not one but two or three times for the same broadcast content, it is possible to cope with this problem. If a plurality of answers of the largest number of times is present for the same broadcast content, since it is not clear which one of those answers is regarded as the user answer this time, for such user answers, an arbitrary one of the answers of the largest number of times is not selected, and all the answers are regarded as an error, with the result that their data may be deleted.

FIG. 30 shows an example of the CM tags information based on the processing in R296. The CM tags information is generated in S271 of FIG. 28, is encrypted in the processing from S272 to R273 together with the broadcast schedule data and is sent from the server 213 to the reception terminal 214. The CM tags information is obtained by associating the broadcast of each CM with attributes such as the advertisement ID, the type of broadcast, the name of the broadcast station, the name of the advertisement (CM), the advertiser, the advertisement brand, the type of advertisement, the broadcast start time 1, the broadcast end time 1, the broadcast start time 2, the broadcast end time 2, the broadcast start time 3, the broadcast end time 3, . . . . Specifically, since, for the advertisement, the advertisement of the same content is repeatedly broadcast, they are identified by giving the advertisement ID to the advertisement of the same content and adding 1, 2, 3, . . . to the broadcast start time and the broadcast end time of each of the broadcasts repeated within a predetermined period of time (for example: one day or one week). The type of broadcast, the name of the broadcast station (the reception frequency), the broadcast start time 1, 2, 3, . . . and the broadcast end time 1, 2, 3, . . . in the CM tags information correspond to the type of broadcast, the name of the broadcast station (the reception frequency), the broadcast start time 1, 2, 3, . . . and the broadcast end time 1, 2, 3, . . . in the broadcast schedule; the broadcast schedule and the CM tags information are referenced based on the reception frequency of the broadcast content on which the input time of the user answer and the user answer are based, and thus it is possible to grasp the advertisement ID, the name of the CM, the advertiser, the advertisement brand and the type of advertisement. The CM tags information is utilized for analyzing the user answer in further details (for example; on an individual advertiser basis or on an individual advertisement brand basis).

FIG. 31 shows a specific example of the user answer information generated in the processing in R296. FIGS. 31(A) and 31(B) are examples of the user answer information on the television program and the radio CM, respectively. The user answer information is sent from the reception terminal 214 to the server 213 through the Internet 11 immediately or at an appropriate time, and is stored in the answer DB 234 of the server 213. According to FIG. 31, the user answer information on the program has, as attributes, the type of broadcast, the name of the broadcast station, the name of the program and the content of the input. The user answer information on the CM has, as attributes, the advertisement ID, the type of broadcast, the name of the CM and the content of the input. The broadcast schedule and the CM tags information are referenced based on the user answer information of FIG. 8, the program, the name of the program of the CM, the advertisement ID or the name of the CM on which the user answer information is based are grasped and the frequency and the data and time of the input in the user answer information of FIG. 8 are replaced with the name of the program or the CM in the user answer information of FIG. 31.

Reference is returned to FIG. 29.

R297: The answer information (FIG. 31) is sent to the server 213. The transmission of the answer information to the server 213 may be performed every predetermined time (for example: once every hour or once every day).

R298: Whether or not a predetermined time has elapsed since the input time when the user performed the answer operation is determined; if the determination is true, the process proceeds to R298 whereas, if not, the process returns to R295. The reason why the process returns to R295 is that there is a possibility that the broadcast schedule DB of the program or the like of the user answer target this time has not reached the reception terminal 214 from the server 213. Although the broadcast schedule DB is basically transmitted before the broadcast, when the broadcast schedule DB can only be transmitted after the broadcast due to the convenience of the broadcast station 12 such as when there is a possibility that the time of the CM is changed because of the live broadcast of a sport event or the like, the broadcast schedule DB may be transmitted after the broadcast. Hence, R297 is processing for performing adjustment when the broadcast schedule DB is transmitted after the broadcast.

R299: The corresponding data is determined not to be present, the data stored in the storage unit is removed and the processing is completed. Examples of the case where the corresponding data is not present include a case where the broadcast schedule itself is not transmitted due to the convenience of the broadcast station 12 regardless of whether or not the broadcast has been performed, a case where there is no information on the CM and a case where the user mistakenly performs an input while the broadcast of the program is being stopped.

Figure 32:
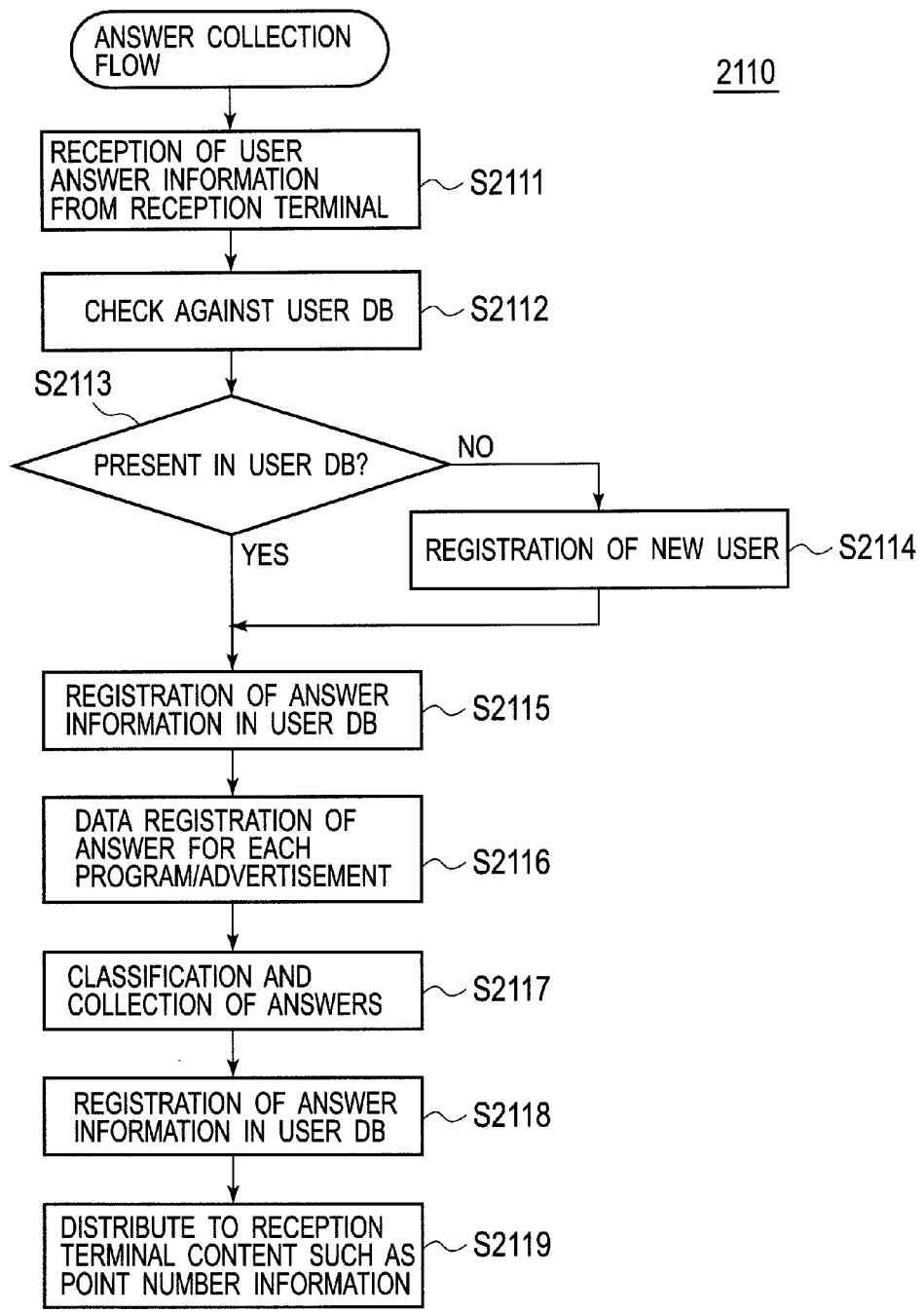
FIG. 32 is a flow chart of an answer collection processing method in the server.

FIG. 32 is a flow chart of an answer collection processing method 2110 in the server 213. The answer collection processing method 2110 is the processing performed in S279 of FIG. 28.

S2111: The user answer information is received from the reception terminal 214.

S2112: The user information of the user DB 238 (FIG. 3(B)) is checked based on the user ID or the reception terminal ID extracted from the answer information. Specific examples of the user information and the answer information will be described later with reference to FIGS. 10 and 33.

S2113: Whether or not the corresponding user information is present in the user DB 238 is determined from the results of the checking; if the corresponding user information is present, the process proceeds to S2115 whereas, if not present, the process proceeds to S2114.

S2114: The user information is newly registered in the user DB 238. In the user registration in the server 213, the user information received from the reception terminal 214 is registered. After S2114, the process proceeds to S2115. Alternatively, user registration screen content generated by the server 213 is transmitted from the server 213 to the reception terminal 214, the user registration screen is displayed on the reception terminal 214 to have the user register the user information and the user information returned from the reception terminal 214 to the server 213 can be registered in the reception terminal 214.

FIG. 10 is the same one as described in the first embodiment in the specific example of the user information in the user DB 238. In the tables in FIGS. 10, 34(A) and 34(B) and 35(A) and 35(B), "*" means an arbitrary digit.

Reference is returned to FIG. 32.

S2115: The answer information is recorded in the user DB 238. FIG. 33 shows a specific example of the user answer information recorded in the answer DB 234. The user answer information of FIG. 33 is the same as the user answer information of FIGS. 31(A) and 31(B) as the user answer information generated in the reception terminal 214 before the transmission of the server 213.

S2116: The user answer information is recorded in the answer DB 234 per program/advertisement. Since, in the first answer information registration in the answer DB 234 for each program/advertisement, the program/advertisement is not registered, the program/advertisement is registered, and then the answer information is registered. A specific example of the answer information registered in S2116 will be described later with reference to a figure.

S2117: On the answer information from the user, the attributes of the user such as the age group, sex and occupation of the user are determined by referencing the user DB 238 (FIG. 10), the answer information is classified for each of the user attributes and the answer information is recollected. A specific example of the results of the recollection of the answer information will be described later with reference to FIG. 35.

S2118: The results of the recollection are stored in the answer DB 234, and information that the answer information recorded in the user DB 238 in association with the user is recorded as valid information is registered in the user DB 238. The valid information is utilized for processing for giving points or the like to the user of the answer information recorded as the valid information.

S2119: Content such as the number of points in the valid information, conditions of an application for various prizes for utilization of the points and information on the election of the prizes is distributed to the reception terminal 214 of the user of the answer information this time.

FIG. 34 shows a specific example of the results of collection for each piece of broadcast content. The results of the collection shown in FIGS. 34(A) and 34(B) are those obtained when the broadcast content is individually the program and the CM. The results of the collection are generated in S2117 of the answer collection processing method 2110 (FIG. 32). The evaluations "like", "dislike" and "acceptable" shown in FIG. 34 correspond to the "heart mark", "x mark" and "smile mark" on the operation input unit 254 (FIG. 7), and the numbers of users that make answers "like", "dislike" and "acceptable" for the individual programs are collected. Although FIG. 34 shows the collection of the user answers to the programs and CMs of the main broadcast, the broadcast system 10 can collect the answers such as "like" of the users on the content of the data broadcast.

FIGS. 35(A) and 35(B) show a specific example of the results of collection in which the user information is added to the results of the collection of FIG. 34. FIGS. 35(A) and 35(B) are those obtained when the broadcast content is individually the program and the CM. In the results of the collection of FIG. 34, the user answers "like", "dislike" and "acceptable" are simply collected whereas, in the results of the collection of FIGS. 35(A) and 35(B), the user answers "like", "dislike" and "acceptable" are collected based on sexes. Since, as described with reference to FIG. 10, in the user information, not only the sexes of the users but also the age groups and the occupations are registered, the favorability rating survey can be performed for the attributes thereof or the combinations of a plurality of attributes.

[3-2 Variable Questionnaire Broadcast Wave Type Broadcast System: a Sixth Embodiment of the Broadcast System 10]

FIGS. 36 to 40 relate to a variable questionnaire broadcast system 10. Specifically, in the variable questionnaire broadcast system 10, the options of the user answers to the broadcast content are changed by parameters such as the broadcast content, the advertiser, the answer time, the broadcast station or the area.

FIG. 36 is a ladder chart on processing between the individual elements of the variable questionnaire broadcast system 10. The same processing as in the ladder chart of FIG. 28 is identified with the same symbol as in FIG. 28, the description thereof will not be repeated and only the differences therebetween will be described. In the ladder chart of FIG. 36, S271, S272, R273, R275 and R276 of the ladder chart of FIG. 28 are changed to S271b, S272b, R273b, R275b and R276b.

S271b: The server 213 produces the CM tags information (FIG. 30 described previously) associated with time information based on the broadcast schedule for each of the advertiser, the brand of the advertisement and the type of advertisement. Questionnaire information (FIGS. 38(A) and 38(B), which will be described later) is generated according to the broadcast schedule. With respect to the questionnaire information, what type of questionnaire the broadcast station 12 and the advertiser want to receive may be inquired previously, and selection from predetermined options may be made by them.

S272b: The broadcast schedule data, the CM tags information and the questionnaire information are encrypted and transmitted to each of the reception terminals 214. The questionnaire information becomes content of questionnaires made at each time by each of the broadcast stations 12 along the program schedule. Specifically, information on the questionnaire information of each of the broadcast stations 12 is read from the questionnaire DB 235 according to present time information, and is transmitted to the reception terminal 214.

R273b: The encrypted broadcast schedule data, the CM tags information and the answer classification (the answer classification corresponds to the questionnaire information) are received.

R275b: Based on the present time and the selected broadcast station, the reception terminal 214 displays, according to the user request, the content of the questionnaire received in R273b (for example: FIG. 18 described previously). After the display, the input of the survey answer about the broadcast program by the operation of the user is received. The reception terminal 214 stores the input of the answer together with the time information and the broadcast station information being received. FIGS. 38(A) and 38(B), which will be described later, are obtained by replacing, in FIG. 8 described previously, the values of the content of the input with key names input by the user within the allocation keys of FIG. 18, which will be described later.

R276b: The reception terminal 214 specifies, based on the broadcast schedule DB 258, the broadcast content of the answer target from the time information and the reception frequency, performs answer analysis for making the specified broadcast content, the questionnaire information and the user answer correspond to each other and stores the results of the analysis (FIGS. 39(A) and 39(B), which will be described later) in the answer information storage unit 252.

Figure 37:
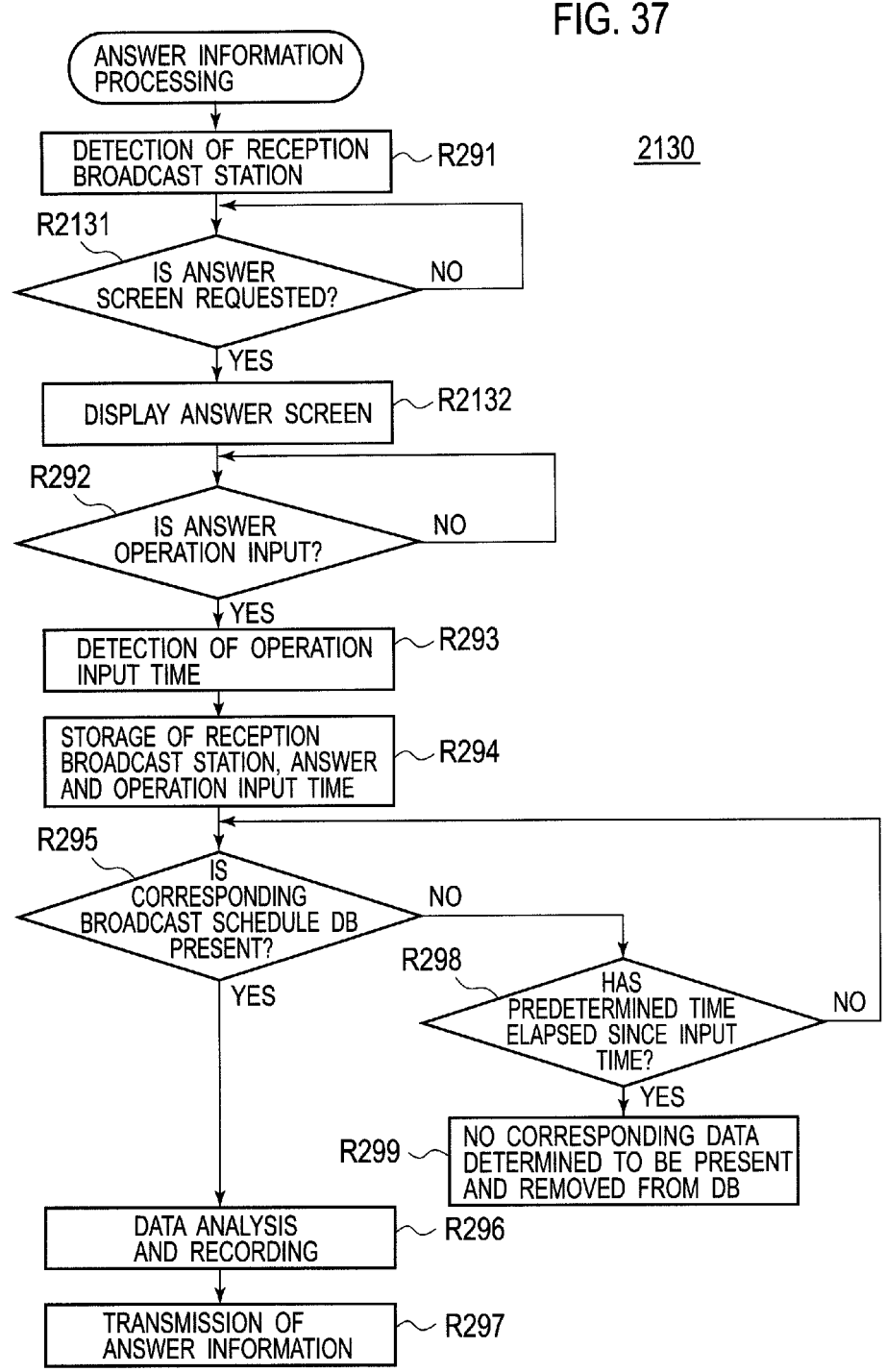
FIG. 37 is a flow chart of an answer information processing method in the reception terminal.

FIG. 37 is a flow chart of an answer information processing method 2130 in the reception terminal 214. The answer information processing method 2130 is the processing performed in S275b shown in FIG. 36. In the answer information processing method 2130, the same steps as in the answer information processing method 290 of FIG. 29 are identified with the same numbers as in the answer information processing method 290, the description thereof will not be repeated and only the differences therebetween will be described. In the answer information processing method 2130, R2131 and R2132 are added between R291 and R292 in the answer information processing method 290.

R2131: Whether or not the answer screen for the program is required by the user is determined. If the determination is true, the process proceeds to R2132.

R2132: Based on the transmission content of the answer classification (questionnaire information and survey items) received from the server 213 in R273b (FIG. 36), the answer screen (FIG. 18 described previously) corresponding to the present broadcast station/time is produced and displayed.

FIGS. 38(A) and 38(B) are an example of the information content in the questionnaire DB 235. The information content differs between the case where the broadcast content is the program (FIG. 38(A)) and the case where the broadcast content is the CM (FIG. 38(B)). In FIG. 38(A), for each piece of questionnaire information (corresponding to each line of FIG. 38(A)), together with the type of broadcast, the name of the broadcast station, the station program, the broadcast start time and the broadcast end time in the broadcast schedule information, the color keys and numerical keys of the general operation key unit 91 of the operation input unit 254 (FIG. 7) and the content of the answer options allocated to them are registered as the allocated keys and the key information; in FIG. 38(B), for each piece of questionnaire information, together with the type of broadcast and the name of the CM in the CM tags information (FIG. 30), the color keys and numerical keys of the general operation key unit 91 of the operation input unit 254 (FIG. 7) and the content of the answer options allocated to them are registered as the allocated keys and the key information.

FIG. 18 shows an example of the screen displayed, based on the questionnaire information of FIGS. 38(A) and 38(B), on the display device 60 of the reception terminal 214. This screen is displayed when the processing in S275b (FIG. 36) is performed. In the lower unit of the screen of the display device 60, information that is used to show the user to which numerical keys of the general operation key unit 91 of the operation input unit 254 (FIG. 7) what types of answer options are allocated is displayed. On the body of the screen of the display device 60, the broadcast content such as the program and the CM of the answer target may be displayed or the questionnaire screen for the broadcast content based on the user answer may be displayed only during the answer period of the user either temporarily or only for a short period of time. On the questionnaire screen, for example, the questionnaire "What do you think about the program? Please select from the following options" is displayed.

FIGS. 39(A) and 39(B) are an example of the user answer information stored in the answer information storage unit 252 (FIG. 4(B)) of the reception terminal 214 based on the user answer to the answer screen of FIG. 18 in the reception terminal 214. FIGS. 39(A) and 39(B) are the user answer information on the program and the CM, respectively. The reception terminal 214 specifies for which broadcast content (including the CM, in addition to the program) the user answer this time is made, as described with reference to FIG. 8 described previously, and also specifies the user answer as the input content from the questionnaire information (information for making the operation keys and the user answers correspond to each other). The user answer information including the broadcast content and the input content specified in this way is the user answer information of FIGS. 39(A) and 39(B).

Since, in the variable questionnaire user answer broadcast system 10, the server 213 can allocate the options for the answer to the questionnaire to the keys of the operation input unit 254, it is possible to freely set the options for the answer to the questionnaire on various programs.

Figure 40:
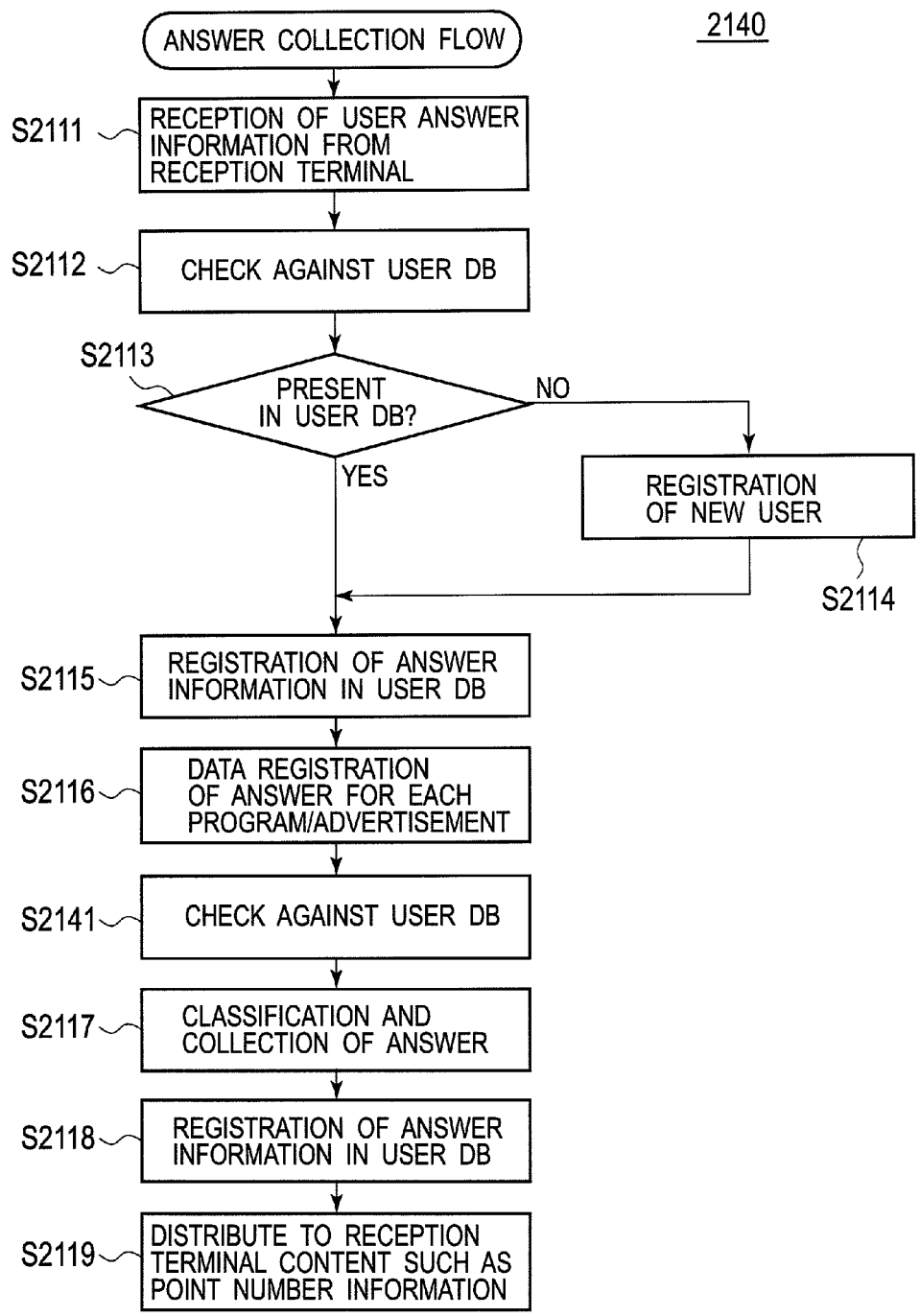
FIG. 40 is a flow chart of an answer collection processing method in the server corresponding to the answer information processing method of FIG. 37.

FIG. 40 is a flow chart of an answer collection processing method 2140. The answer collection processing method 2140 is the processing performed in S279 shown in FIG. 36. In the answer collection processing method 2140, the same steps as in the answer collection processing method 2100 of FIG. 32 are identified with the same numbers as in the answer collection processing method 2100, the description thereof will not be repeated and only the differences therebetween will be described. In the answer collection processing method 2140, S2141 is added between S2110 and S2116 in the answer collection processing method 2100.

S2141: The questionnaire DB 235 (FIG. 3(B)) is referenced, and to which questionnaire the content (answer information) of the input of the user corresponds is checked.

[4 IP Type Broadcast System: Broadcast System 1160]

FIGS. 20 to 22(B) relate to a variable questionnaire IP type broadcast system 1160. In the broadcast system 1160, each of the reception terminals 2163 can receive broadcast content from the broadcast station 12 either through the broadcast wave or through the Internet 11; in principle, the reception terminal 2163 receives it through the Internet 11. In the broadcast of the broadcast content through the Internet 11, IP (Internet protocol) is utilized. When the broadcast station selected by the user with the reception terminal 2163 does not perform the corresponding IP broadcast (which is defined as a broadcast system that broadcasts the broadcast content through a network, utilizing the IP), since the reception terminal 2163 has difficulty in receiving the broadcast content of the IP broadcast, the broadcast wave from the selected broadcast station are used to output the received broadcast content.

FIG. 20 is a schematic diagram of the broadcast system 1160. In the broadcast system 1160, the same elements as in the broadcast system 10 are identified with the same symbols as in the broadcast system 10, the description thereof will not be repeated and only the differences will be described.

The broadcast station 12 broadcasts the broadcast content through the radio tower 17 by the broadcast wave, and sends data on the broadcast content to a server 2162 through a dedicated line or the Internet 11. The broadcast station 12 can have the server 2162 designed specifically for itself. Only when each of the reception terminals 2163 is present within a broadcast target area prescribed by the law on the broadcast wave of the broadcast station 12, the reception terminal 2163 can receive the broadcast content from the server 2162 through the Internet 11 and output it. The permission and prevention of the output of the broadcast content from each of the reception terminals 2163 through the Internet 11 may be determined and controlled by the reception terminal 2163 itself on the broadcast content received from the server 2162 or may be controlled by determining whether or not the broadcast content is transmitted when the server 2162 transmits the broadcast content to the reception terminal 2163.

FIG. 21B is a detailed diagram showing the configuration of the broadcast device 2161 and the server 2162 of FIG. 20. In the broadcast device 2161 and the server 262, the same elements as in the broadcast device 216 (FIG. 2(B)) and the server 213 (FIG. 3(B)) of the broadcast system 10 are identified with the same elements as in the broadcast device 216 and the server 213, the description thereof will not be repeated and only the differences will be described.

In the broadcast device 2161, a broadcast material 2165 is added to the broadcast device 216. In the server 2162, a broadcast device communication unit 2169, a content DB 2170 and a transmission determination unit 2171 are added to the server 213. Although the broadcast material 2165 is basically the same as data corresponding to a broadcast signal from the MUX 228 to the radio tower 17, the broadcast material 2165 may be obtained by removing the data broadcast from the corresponding data or may be non-multiplexed data. In addition to the function of the broadcast device 216 of the broadcast system 10, the broadcast device 2161 has the function of transmitting the broadcast material 2165 from the server communication unit 224 to the server 2162 through a dedicated line or the Internet 11.

The server 2162 receives, in the broadcast device communication unit 2169, the broadcast content from the broadcast device 2161 through the dedicated line or the Internet 11, and records it in the content DB 2170. The content generation unit 236 produces the content of questionnaires. In the content DB 2170, not only the broadcast content received from the broadcast device 2161 but also content related to the broadcast and content generated by the content generation unit 236 are recorded. The broadcast content received from the broadcast device 2161 may be distributed, as it is, to the reception terminal 2163 without being stored in the content DB 2170.

The transmission determination unit 2171 determines, based on the user information, whether or not the content is transmitted to the reception terminal 2163. Specifically, whether or not the reception terminal 2163 is present in an area where the broadcast is being performed is determined; if the determination is true, the reception of the content is allowed. Whether or not it is the area where the broadcast is being performed is determined by the condition of the reception of the broadcast in the reception terminal 2163. If the condition of the reception is poor, the position of the reception terminal 2163 may be found by another way such as the IP address of the reception terminal 2163 or a GPS (global positioning system). Since the IP address corresponding to the area where the reception terminal 2163 is present is given by an ISP (internet service provider), it is possible to find, from the IP address, the area where the reception terminal 2163 is present. With respect to the condition of the reception, when a first request for the distribution of the broadcast content of each broadcast station from the reception terminal 2163 is made, the condition of the reception of the broadcast station in the reception terminal 2163 is recorded in the user DB 238, and thereafter, when the broadcast station distributes the broadcast content, the detection of the condition of the reception and the determination of whether or not the distribution is performed from the condition of the reception may be omitted.

FIG. 22(B) is a detailed diagram showing the configuration of the reception terminal 2163 of FIG. 20. In the reception terminal 2163, the same elements as in the reception terminal 214 (FIG. 4(B)) of the broadcast system 10 are identified with the same symbols as in the reception terminal 214, the description thereof will not be repeated and only the differences will be described. In the reception terminal 2163, a reception condition storage unit 2174 is added to the reception terminal 214. In the reception terminal 2163, the broadcast content of the broadcast wave is received by the tuner 247, and the reception condition (a reception electric field strength and a bit-error rate) is measured and stored in the reception condition storage unit 2174, and is sent from the communication unit 251 through the Internet 11 to the server 2162. The communication unit 251 also sends the answer information to the server 2162 through the Internet 11. Since, depending on the broadcast station 12, there is a case where only the broadcast wave broadcast is performed and the IP network broadcast is not performed, when the user of the reception terminal 2163 selects the broadcast station 12 that does not perform the IP network broadcast, the reception terminal 2163 outputs, from the display device 60 and the sound reproduction device 61, the broadcast content output from the tuner 247.

[4-1 Variable Questionnaire for IP Type Broadcast System: a Seventh Embodiment of the Broadcast System 1160]

Figure 41:
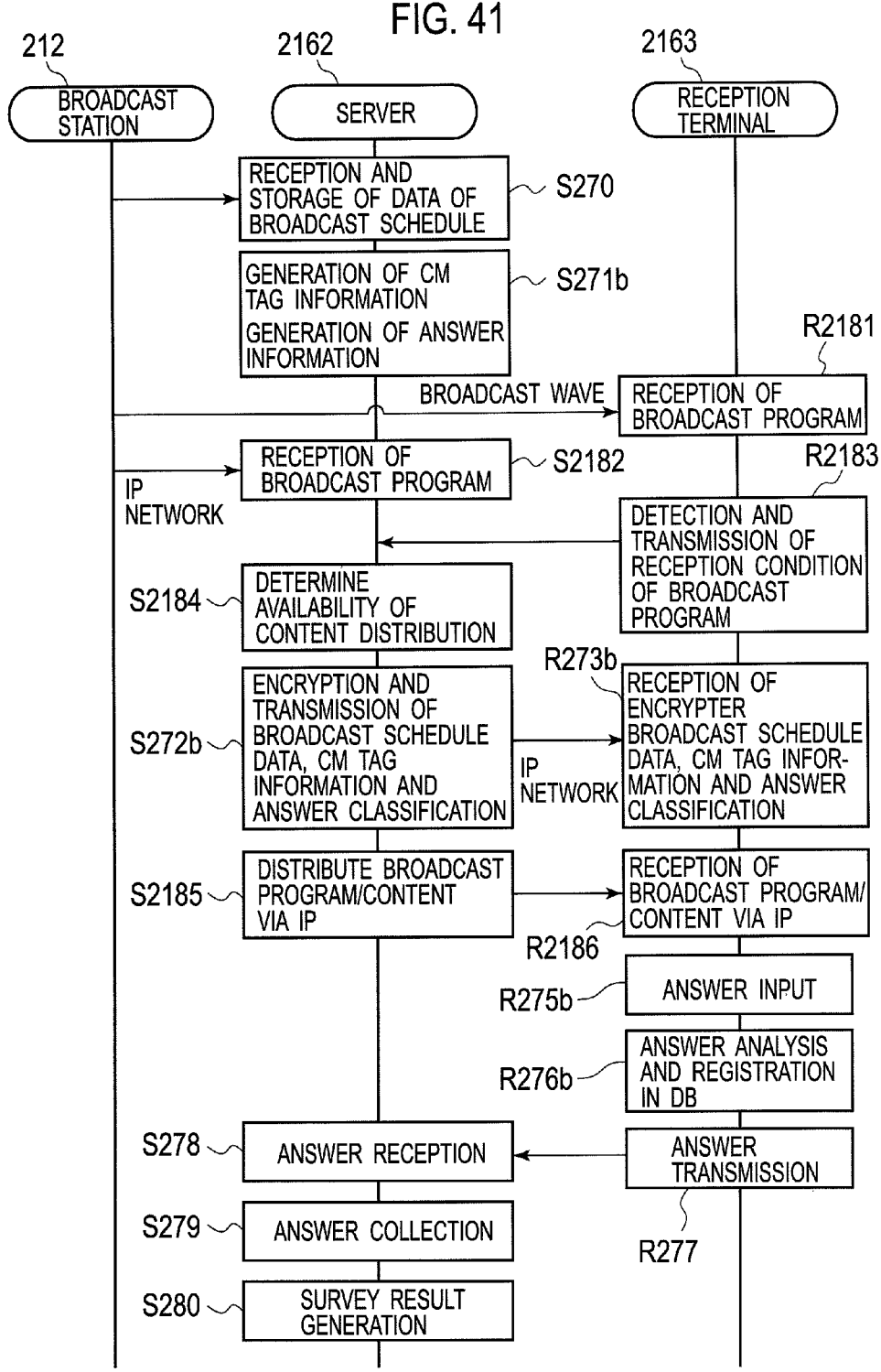
FIG. 41 is a ladder chart on processing between the individual elements of a variable questionnaire IP type broadcast system.

FIGS. 24, 25 and 41 relate to a variable questionnaire distribution broadcast system 1160. In the variable questionnaire distribution broadcast system 1160, as in the variable questionnaire distribution broadcast system 10, the options of the user answers to the broadcast content are changed by parameters such as the broadcast content, the advertiser, the answer time, the broadcast station or the area.

FIG. 41 is a ladder chart on processing between the individual elements of the broadcast system 1160. In FIG. 41, the same steps as in FIG. 36 are identified with the same step numbers as in FIG. 36, the description thereof will not be repeated and only the differences will be described. In the ladder chart of FIG. 41, R2181, S2182, R2183, S2184, S2185 and R2186 are added to the ladder chart of FIG. 36. R2181, S2182, R2183 and S2184 are arranged before S272$b$ and R273$b$; S2185 and R2186 are arranged after S272$b$ and R273$b$ and before S275$b$.

In S270, as in S270 of FIG. 36, the server 2162 receives the data of broadcast schedule user answer from the broadcast station 212. However, since the server 2162 grasps the distribution time of the program distributed by the server 2162 to the reception terminal 2163 with respect to the server 213 (FIG. 1), the server 2162 may produce the broadcast schedule without receiving it from the broadcast station 12 and distribute it to the reception terminal 2163. Furthermore, apart from the content by the broadcast wave from the broadcast station 12, the server 2162 can distribute, to the reception terminal 2163, the content that is uniquely distributed by the server 2162 and that is broadcast by the broadcast station 12; in the case of such content distribution, the broadcast schedule is produced by the server 2162 and is transmitted to the reception terminal 2163.

In R2181, the reception terminal 2163 receives the broadcast content from the broadcast station 12 by the broadcast wave. The broadcast content received by the reception terminal 2163 through the broadcast wave is not used for the output of the content by the reception terminal 2163, and is simply received for the detection of the reception condition in R2183, which will be described later.

In S2182, the server 2162 receives the broadcast program from the broadcast station 12 by IP distribution through the Internet 11. In S2183, the reception terminal 2163 detects the reception condition of the broadcast wave selected in R2181, and transmits the reception condition to the server 1162 through the Internet 11. In S2184, the server 2162 determines, from the reception condition transmitted from the reception terminal 2163, whether or not the broadcast program and content limited to an area in the server 2162 may be transmitted to the reception terminal 2163. In S2185, the broadcast program/content is transmitted to the reception terminal 2163 that is determined by the server 2162 to be able to be distributed. Apart from the broadcast program that is broadcast by the broadcast station 12 of the broadcast program and that is received by the server 2162, the content includes the content generated by the server 2162. A specific method of the determination in S2184 will be described in S2202 of FIG. 25, which will be described later. In R2186, the broadcast program/content distributed by the server 2162 in S2185 is received by the reception terminal 2163.

FIG. 24 is a flow chart of a reception condition notification method 190 in the reception terminal 2163; since the configuration thereof is the same as described in the third embodiment, its description will not be repeated. In the reception condition notification method 190, the processing in R2183 shown in FIG. 41 is performed.

FIG. 25 is a flow chart of a content distribution control method 200; since the configuration thereof is the same as described in the third embodiment, its description will not be repeated. In the content distribution control method 200, the processing in S2184 and S2185 shown in FIG. 41 is performed.

[4-2 Fixed Questionnaire for IP Type Broadcast System: An Eighth Embodiment of the Broadcast System 1160]

In the fixed questionnaire distribution broadcast system 1160, as in the fixed questionnaire distribution broadcast system 10, the questionnaire for the user viewing the broadcast content is fixed regardless of broadcast content, broadcast station, broadcast time or the like. As is obvious from comparison between the fixed questionnaire distribution broadcast system 10 of the third embodiment and the variable questionnaire broadcast system 10 of the fourth embodiment, in the fixed questionnaire distribution broadcast system 1160, the processing for producing variable questionnaire information from the variable questionnaire broadcast system 1160, the processing for having the user of the reception terminal 2163 answer according to the variable questionnaire information and the processing for analyzing the user answer according to the variable questionnaire information are omitted. Specifically, S271$b$, S272$b$, R273$b$, R275$b$ and R276$b$ of FIG. 41 are replaced by S271, S272, R273, R275 and R276, respectively.

[5 User Answer Confirmation Broadcast Reception Terminal]

Figure 42:
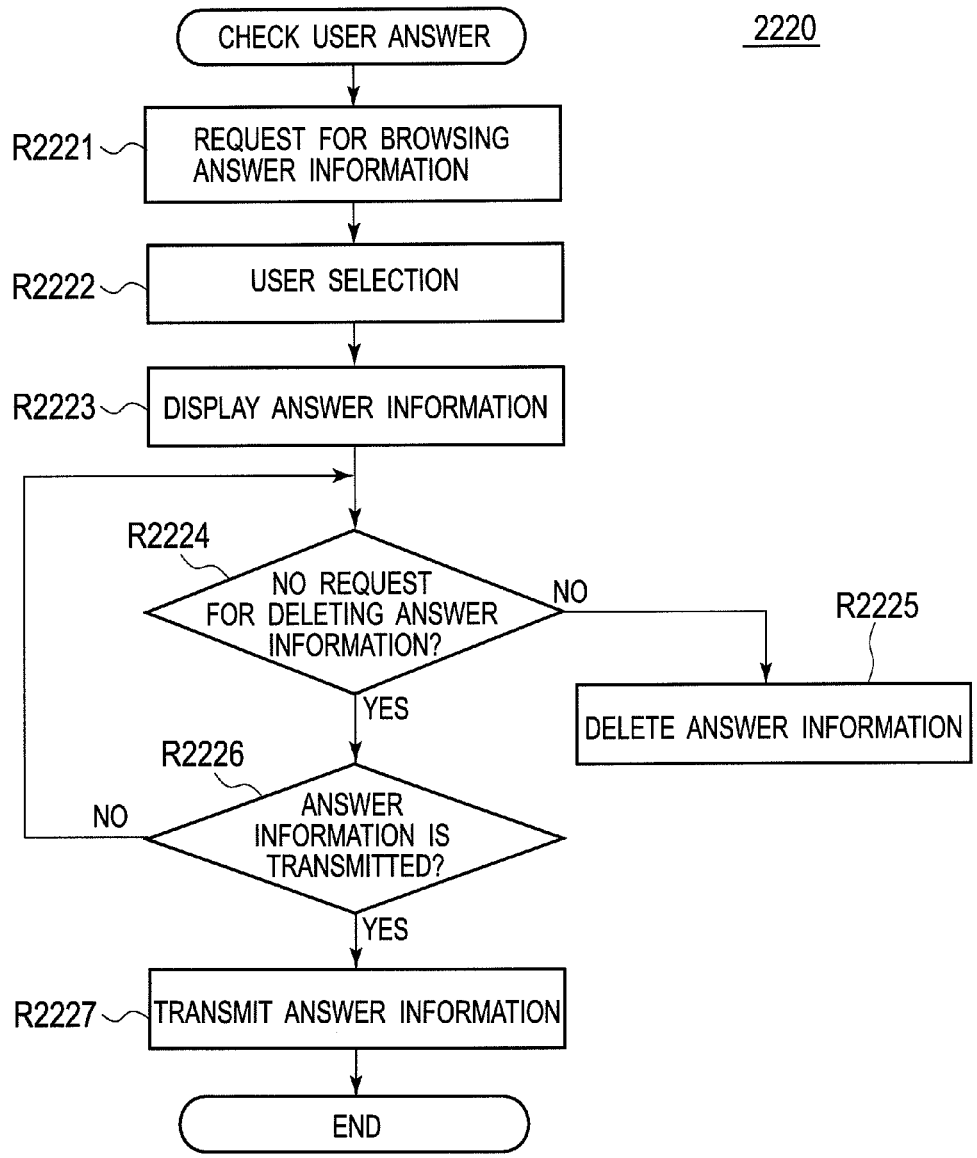
FIG. 42 is a flow chart of a user answer confirmation method in which the user of a broadcast reception terminal confirms the user answer before the transmission of the user answer.

FIG. 42 is a flow chart of a user answer confirmation method 2220 in which the user of the broadcast reception terminal confirms the user answer before the transmission of the user answer. The user answer confirmation method 2220 can be applied to both the reception terminal 214 of the broadcast system 10 and the reception terminal 2163 of the broadcast system 1160. The user answer can be automatically transmitted without the need for the user to inquire whether or not the user can transmit the user answer; in the user answer confirmation method 2220, the user answer is transmitted after reception of permission from the user.

R2221: A request for browsing the answer information as the user answer is received from the user.

R2222: A selection of which user the answer information is browsed from is received. When one user is only registered, such a user may be determined to be selected. Here, a family is assumed to have one broadcast reception terminal in common. Hence, there is a plurality of users for one broadcast reception terminal, and the user answer can be transmitted from the same broadcast reception terminal on an individual user basis to the user answer collection server. The case where a plurality of users are registered means that, for example, a plurality of users of the same family have broadcast reception terminals in common and are registered as the user in the user answer collection server. In order for the user answers of the individual users to be confidential between the members of the family, each member may be made to input a pass word of the member when the user is selected; in this case, only if the user identification can be achieved, the process proceeds to the next step R2223 whereas, if the user identification cannot be achieved, the user answer confirmation method 2220 is ended immediately.

R2223: The answer information of the present user is displayed.

R2224: Whether or not the answer information is deleted from the list of the answer information is inquired. If it is deleted, the process proceeds to R2225 whereas, if it not deleted, the process proceeds to R2226.

R2225: The answer information is deleted. If a plurality of pieces of answer information of the present user are stored, all pieces of answer information may be deleted or the user is made to select the piece of answer information to be deleted and thus it is possible to delete only the selected piece of answer information. If all pieces of answer information of the present user are deleted, the user answer confirmation method 2220 is ended whereas, if there is answer information that is not deleted and is left, the process can proceed to R2226 instead of ending the user answer confirmation method 2220.

R2226: Whether or not the answer information is transmitted is inquired of the user. If the user selects the "transmit", the process proceeds to R2227 whereas, if the user selects the "not transmit", the process returns to R2224. Instead of returning to R2224, the user answer confirmation method 2220 can also be temporarily ended. If the determination in R2226 becomes true, the processing in R2227 may be performed immediately; alternatively, the processing may be performed either in a predetermined time range or at a predetermined data and time or after a predetermined time has elapsed.

R2227: The answer information is transmitted to the server 213 or the server 2162.

[6 Utilization of the CM Tags Information]

In the reception terminal 214 of the broadcast system 10 or the reception terminal 2163 of the broadcast system 1160, the CM tags information (FIG. 30) is utilized, and further detailed user answer information is generated and transmitted to the server 213 or the server 2162, and thus it is possible to collect the user answers in more details and/or more efficiently in the server 213 or the server 2162. In other words, since the CM tags information includes information such as the advertiser, the brand of the advertisement and the type of advertisement for each of the CMs, such information is utilized by referencing it. The specific method of utilizing it includes, for example, (a) and (b) below. The advertisement ID of the CM tags information (FIG. 30) is utilized, and thus the advertisement ID responded by the user is associated with the user answer and is transmitted to the server 213 or the server 2162, with the result that the server 213 or the server 2162 can also collect the user answers on an individual advertisement ID basis.

(a): For the user answer information on the CM, the reception terminal 214 or the reception terminal 2163 transmits, to the server 213 or the server 2162, the information that includes the advertiser, the brand of the advertisement, the type of advertisement and the like in addition to the CM specified on the user answer. The server 213 or the server 2162 utilizes the user answer information to collect the user answers for each of the advertiser, the brand of the advertisement or the type of the advertisement or the combination of those.

(b): The reception terminal 214 or the reception terminal 2163 classifies the user answers on the CM for each of the advertiser, the brand of the advertisement or the advertisement or the combination of those. In this case, one user answer can belong to a plurality of classifications. For example, in the CM tags information of FIG. 30, the name of the CM "eco#" belongs both to the classification of the advertiser "Nippon automobile" and to the classification of the type of advertisement "automobile." In this way, the user answer information previously classified in the reception terminal 214 or the reception terminal 2163 is transmitted to the server 213 or the server 2162. The server 213 or the server 2162 collects the user answers on the CM that are previously classified, and obtains the results of the collection on an individual classification basis.

[7 Summary: User Answer Collection System 2250]

Figure 43:
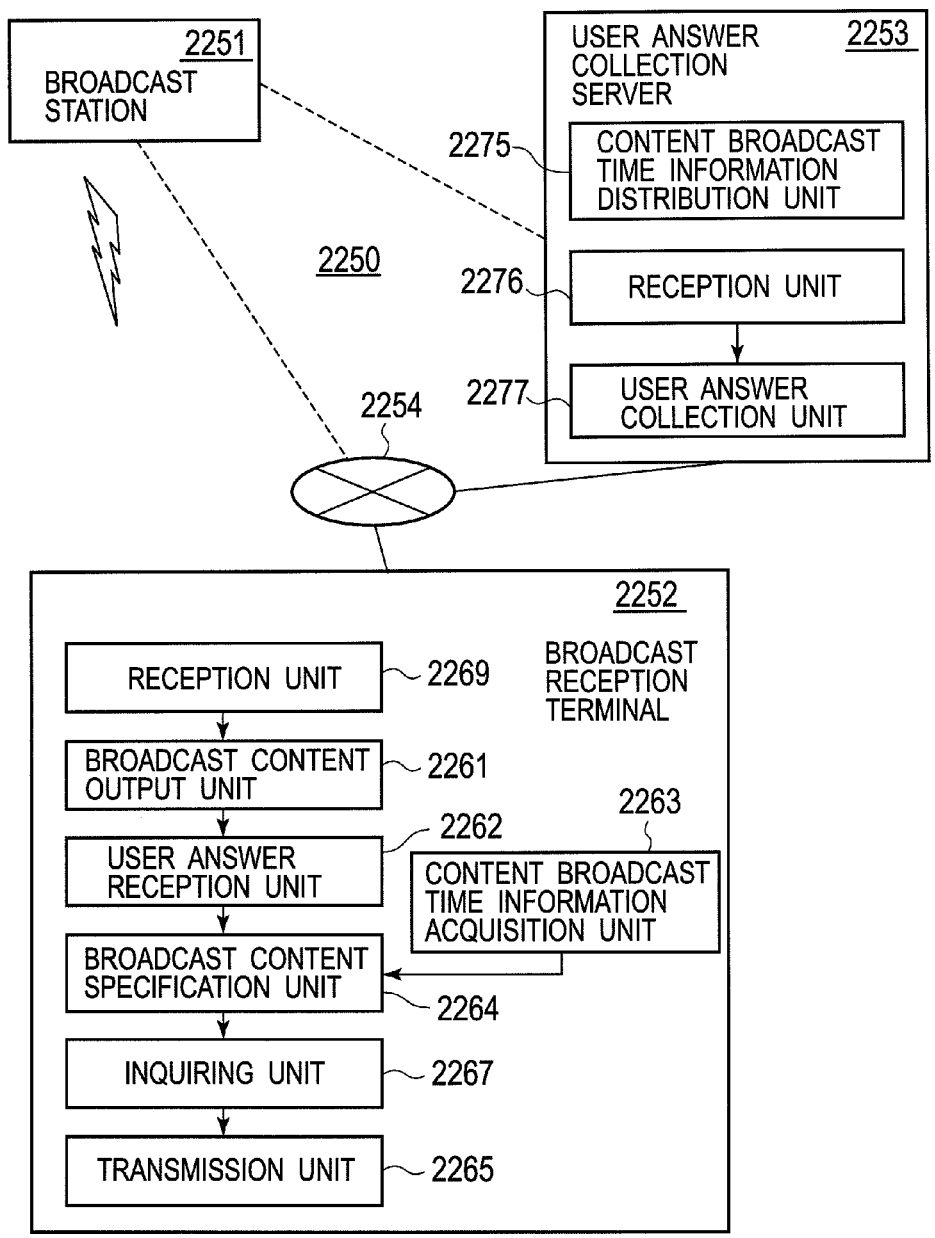
FIG. 43 is a diagram showing the configuration of a user answer collection system.

FIG. 43 is a diagram showing the configuration of a user answer collection system 2250. Specific examples of the user answer collection system 2250 are the broadcast systems 10 and 1160. The user answer collection system 2250 includes a broadcast station 2251, a broadcast reception terminal 2252 that receives broadcast content broadcast by the broadcast station 2251 and a user answer collection server 2253. The broadcast reception terminal 2252 and the user answer collection server 2253 receive data through a network 2254. The broadcast station 2251 and the user answer collection server 2253 receive data through a dedicated line or the network 2254.

The broadcast content broadcast by the broadcast station 2251 is, for example, (a) broadcast content that the broadcast station 2251 broadcasts with the broadcast wave, (b) broadcast content in which the server such as the user answer collection server 2253 is the same content as the broadcast content by the broadcast station 2251 with the broadcast wave and which is broadcast with the IP network 2254 and (c) broadcast content which is different from the broadcast content by the broadcast station 2251 with the broadcast wave and which the server such as the user answer collection server 2253 uses with the IP network with the intension of including the broadcast content broadcast. The broadcast content is either the program of the main broadcast or the advertisement or the program of the data broadcast or the advertisement.

The broadcast reception terminal 2252 includes a broadcast content output unit 2261, a user answer reception unit 2262, a content broadcast time information acquisition unit 2263, a broadcast content specification unit 2264 and a transmission unit 2265. The broadcast content output unit 2261 outputs the received broadcast content. The user answer reception unit 2262 receives user answers on the broadcast content. The content broadcast time information acquisition unit 2263 acquires content broadcast time information having program time information and advertisement time information on the broadcast content. The broadcast content specification unit 2264 references the content broadcast time information based on a broadcast source of the broadcast content and the broadcast time of the user answer on which the user answer is based, and specifies the broadcast content. The transmission unit 2265 transmits the user answer and the user answer information including the broadcast content specified on the user answer to the user answer collection server 2253 through the network 2254.

Specific examples of the broadcast content output unit 2261 are the display device 60 and the sound reproduction device 61 (FIGS. 4(B) and 22(B)). The broadcast content includes not only the broadcast content of television but also the broadcast content of radio; in the case of the broadcast content of radio, the user only listens to the broadcast content.

The content broadcast time information can include not only information on the broadcast start date and time and the broadcast end date and time of programs and ADs but also further detailed information, that is, information on the broadcast start date and time and the broadcast end date and time of predetermined parts (for example, a segment within the program) of the programs and the ADs. The user answer is, for example, an answer with respect to the user evaluation of the broadcast content viewed by the user on tastes, interests and usefulness.

Preferably, the broadcast reception terminal 2252 further includes an inquiry unit 2267. The inquiry unit 2267 displays the user answer information before the transmission of the user answer information to the user answer collection server 2253 by the transmission unit 2265, and inquires the user whether or not the transmission is possible. The transmission unit 2265 transmits only the user answer information that is allowed by the user to be transmitted. The function of the inquiry unit 2267 corresponds to, for example, the processing in R2221 to R2226 in the user answer confirmation method 2220 of FIG. 42.

Typically, the content broadcast time information acquired by the content broadcast time information acquisition unit 2263 is information that is received from the user answer collection server 2253 (for example: R273 of FIG. 28 and R273b of FIGS. 36 and 14).

Typically, the broadcast reception terminal 2252 further includes a reception unit 2269. The reception unit 2269 receives the survey item information from the user answer collection server 2253 through the network 2254 before the user inputs the answer. On the other hand, the user answer reception unit 2262 submits the received survey item information to the user, and then receives the user answer specific examples thereof are the reception terminals 214 and 2163 in [3-2 Variable questionnaire broadcast system 10] and [4-1 Variable questionnaire broadcast system 1160] described previously. In the display on the submission of the survey item information to the user, the full screen is not changed from the screen of the broadcast content to the answer input screen, and, as illustrated in FIG. 18, a small-sized answer input screen is displayed in a corner while the broadcast screen, that is, the broadcast content is being displayed, and thus the user can operate a proper answer key while viewing the broadcast content, which is convenient.

The survey item on the survey item information is associated with, for example, the broadcast content of the survey target itself, the genre (for example: drama, music and sport) of the broadcast content of the survey target (the program or the CM), the broadcast time of the broadcast content of the survey target, the party that broadcasts the broadcast content of the survey target and/or the broadcast area of the broadcast content of the survey target. Specifically, the case where the survey item information is associated with the broadcast content of the survey target itself refers to a case where the survey item is set for each piece of broadcast content.

Typically, each of the survey items has a plurality of options, and one that the user of the broadcast reception terminal 2252 selects from a plurality of options for one survey item is used as the user answer. The number of options selected is typically one; a plurality of options may be selected. Specific examples of the options are the "like", the "dislike" and the "acceptable" respectively allocated to the "heart mark", the "smile mark" and the "x mark" on the answer key unit 92 of the operation input unit 254 shown in FIG. 7.

Preferably, the survey item information includes information as to which one of the operation keys of the reception terminal 2252 each option is allocated to. Specific examples thereof are the "like" and the "dislike" allocated to red and blue color keys in FIGS. 38(A) and 38(B) and the "interesting" and the "boring" allocated to numeral keys of "1" and "2." Examples of the survey item include (a) a favorability rating for the broadcast content itself, (b) a favorability rating for an item in an advertisement in the case of an advertisement, (c) a favorability rating for a sponsor in the case of an advertisement, (d) a favorability rating for an actor involved therein and (e) a desired broadcast time. In this way, it is possible to smoothly allocate the user operation keys according to the options of the survey item.

Typically, the broadcast reception terminal 2252 includes the reception unit 2269. The reception unit 2269 receives the broadcast content from the broadcast wave from the broadcast tower or the user answer collection server 2253 through the network 2254 (typically utilizing an IP). When the reception unit 2269 receives the broadcast content from the user answer collection server 2253 through the IP network 2254, the transmission unit 2265 transmits, to the user answer collection server 2253, information indicating that the network 2254 is present within the broadcast target area of the broadcast source of the broadcast content, together with the transmission request of the transmission content.

The user answer collection server 2253 includes a content broadcast time information distribution unit 2275, a reception unit 2276 and a user answer collection unit 2277. The content broadcast time information distribution unit 2275 distributes content broadcast time information to the broadcast reception terminal 2252 through the network 2254. The reception unit 2276 receives the user answer information on the broadcast content through the network 2254. The user answer collection unit 2277 extracts, from the received user answer information, the user answer and the broadcast content on which the user answer is based, and collects user answers from a plurality of users on the broadcast content.

Figure 44:
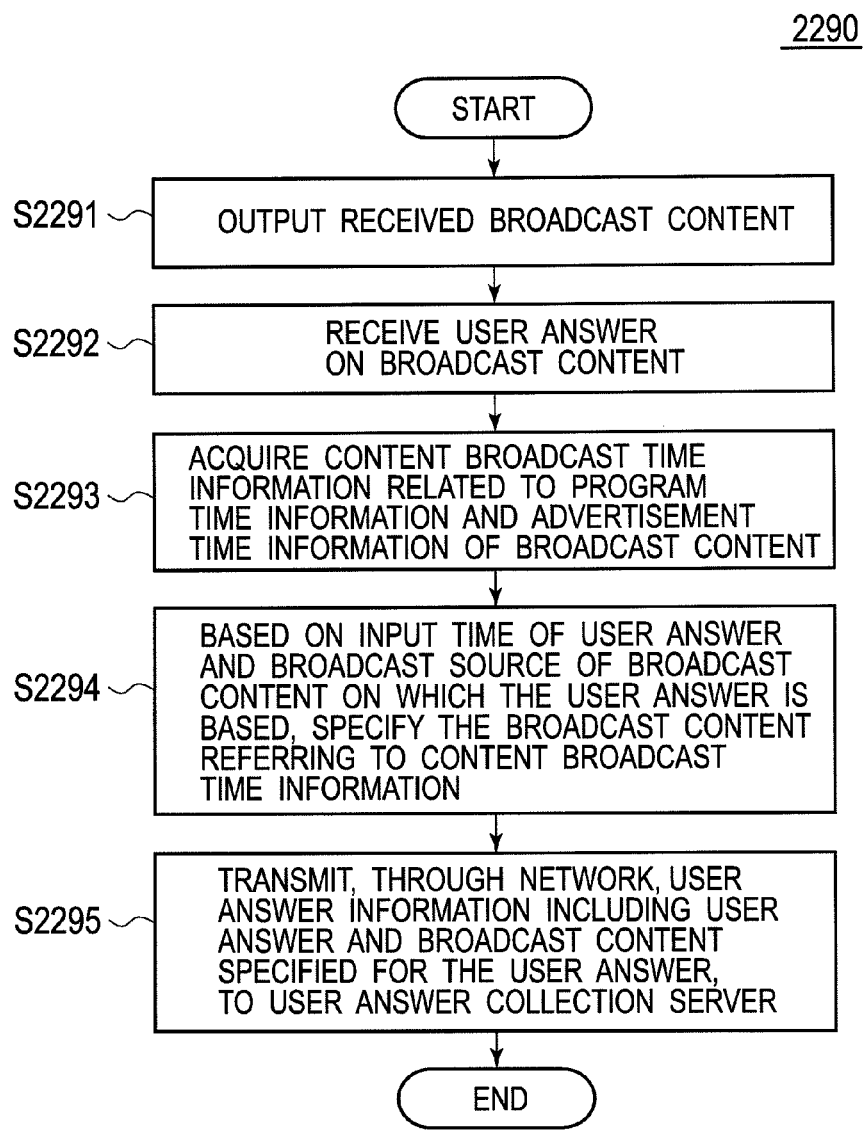
FIG. 44 is a flow chart of a broadcast reception terminal control method.

FIG. 44 is a flow chart of a broadcast reception terminal control method 2290. The broadcast reception terminal control method 2290 is applied to the broadcast reception terminal 2252. The processing in S2293 can be performed before S2291 or between S2291 and S2292.

In S2291, the received broadcast content is output. In S2292, the user answer about the broadcast content is received. In S2293, the content broadcast time information having the program time information and the advertisement time information on the broadcast content is acquired. In S2294, the content broadcast time information is referenced based on the broadcast source of the broadcast content on which the user answer is based and the input time of the user answer, and the broadcast content is specified. In S2295, the user answer information including the user answer and the broadcast content specified on the user answer is transmitted to the user answer collection server 2253 through the network 2254.

The processing from S2291 to S2295 respectively corresponds to the functions of the broadcast content output unit 2261 to the transmission unit 2265 in the broadcast reception terminal 2252 (FIG. 43). Hence, the specific aspects describing the functions of the broadcast content output unit 2261 to the transmission unit 2265 can also be applied to the specific aspects of the processing from S2291 to S2295. In the broadcast reception terminal control method 2290, a step for performing processing corresponding to the functions of the inquiry unit 2267 and the reception unit 2269 in the broadcast reception terminal 2252 can be added as appropriate. The step corresponding to the inquiry unit 2267 is inserted between S2294 and S2295. The step corresponding to the reception unit 2269 is performed before the performance of S2292. The specific aspects describing the functions of the inquiry unit 2267 and the reception unit 2269 can be applied to the specific aspects of the processing in the step corresponding to the inquiry unit 2267 and the reception unit 2269.

Needless to say, the present invention is not limited to the embodiments described above, and various modifications (including addition and deletion) are possible without departing from the spirit of the present invention.

The present specification discloses inventions in various ranges and levels. These inventions include not only the devices and the methods in various technical ranges and specific levels described in the present specification but also an invention that is obtained by extracting, from the devices and the methods, one or a plurality of elements having an independent function and effect in the range of expansion and generalization, an invention that is obtained by modifying one or a plurality of elements in the range of expansion and generalization and furthermore, an invention that is obtained by changing the combinations of one or a plurality of elements between the devices and between the methods.

INDUSTRIAL APPLICABILITY

As described above, according to the present invention, without asking corporation on data broadcast for performing a survey from a broadcast station, it is possible to accurately collection user answers from users on broadcast content.

The invention claimed is:

1. A user answer collection server comprising:
a reception unit configured to receive user answer information through a network, the user answer information including a user answer regarding advertisement information contained in broadcast contents, an answer time when the user inputs the user answer, and information on a broadcast station that broadcasts the broadcast contents;
a broadcast contents specification unit configured to reference, based on the information on the broadcast station and the answer time extracted from the user answer information received by the reception unit, contents broadcast time information of the advertisement information so as to specify the advertisement information of a survey target of the user answer information; and
a user answer collection unit configured to collect, based on the user answer extracted from the user answer information received by the reception unit and the advertisement information specified by the broadcast contents specification unit, user answers from a plurality of users for every advertisement information,
wherein the reception unit, the broadcast contents specification unit, and the user answer collection unit are hardware or a combination of hardware and software,
wherein a survey item of survey item information regarding the advertisement information contained in the survey target is associated with a favorability rating of the broadcast content itself, a favorability rating for an article in an advertisement in the case of an advertisement, a favorability rating for a sponsor in the case of an advertisement, a favorability rating for an actor involved therein and a desired broadcast time.

2. The user answer collection server according to claim 1, wherein each survey item has a plurality of options, and one of the plurality of options, which is selected by a user for one survey item, is used as the user answer.

3. The user answer collection server according to claim 1, wherein the survey item information includes information on which operation key of the reception terminal each of the options is allocated to.

4. The user answer collection server according to claim 1, further comprising:
a determination unit configured to determine whether or not a reception terminal configured to store the user answer information is present within a broadcast target area of a broadcast station that broadcasts advertisement information contained in broadcast contents; and
a transmission unit configured to transmit the broadcast contents to the reception terminal through the network as long as the determination unit determines that the reception terminal is present within the broadcast target area of the broadcast station.

5. A user answer collection system comprising:
a broadcast station;
a reception terminal receiving broadcast content with the broadcast station as a broadcaster; and
a user answer collection server as described in claim 1,
wherein the reception terminal includes a transmission unit that transmits, to the user answer collection server, through a network, answer information including the user answer about the broadcast content of the survey target, a broadcast source and a broadcast time; and
a user answer collection unit that uses the user answer extracted from the received user answer information as a user answer about the specified broadcast content and collects user answers from a plurality of users on each of the broadcast contents.

6. A broadcast reception terminal comprising:
a user answer collection server as described in claim 1 comprising a broadcast content output unit that outputs received broadcast content;
the user answer reception unit;
a content broadcast time information acquisition unit that acquires content broadcast time information related to program time information and advertisement time information on the broadcast content;
the broadcast content specification unit referencing the content broadcast time information based on a broadcast source of the broadcast content on which the user answer is based and an input time of the user answer so as to specify the broadcast content; and
a transmission unit that transmits, to a user answer collection server, through a network, user answer information including the user answer and the broadcast content specified for the user answer.

7. The broadcast reception terminal according to claim 6, further comprising:
an inquiry unit that displays the user answer information before the transmission of the user answer information to the user answer collection server by the transmission unit so as to inquire of a user about whether or not transmission is possible; and
the transmission unit that transmits only the user answer information allowed by the user to be transmitted.

8. The broadcast reception terminal according to claim 6, wherein the content broadcast time information acquired by the content broadcast time information acquisition unit is received from the user answer collection server.

9. The broadcast reception terminal according to claim 6, further comprising:
a reception unit that receives survey item information from the user answer collection server through the network before the user inputs the answer; and the user answer reception unit that submits the received survey item information to the user and thereafter receives the user answer.

10. The broadcast reception terminal according to claim 9, wherein a survey item of the survey item information is associated with the broadcast content of a survey target itself, a genre of the broadcast content of the survey target, a broadcast time of the broadcast content of the survey target, a broadcast source of the broadcast content of the survey target or a broadcast area of the broadcast content of the survey target.

11. The broadcast reception terminal according to claim 9, wherein each of the survey items has a plurality of options, and one that is selected by a user of the reception terminal from the plurality of options for one survey item is used as the user answer.

12. The broadcast reception terminal according to claim 10,
wherein the survey item information includes information on which operation key of the reception terminal each of the options is allocated to.

13. The broadcast reception terminal according to claim 6, further comprising:
a reception unit that receives the broadcast content through a broadcast wave from a broadcast tower or through an IP network from the user answer collection server; and
the transmission unit that transmits, when the broadcast content is received from the user answer collection server through the IP network, information indicating that the broadcast reception terminal itself is present within a broadcast target area of the broadcast source of the broadcast content, to the user answer collection server, together with a transmission request of the broadcast content.

14. A broadcast reception terminal control method comprising the steps of:
outputting received broadcast content using the user answer collection server of claim 1;
receiving a user answer about the broadcast content;
acquiring content broadcast time information related to program time information and advertisement time information on the broadcast content;
referencing the content broadcast time information based on a broadcast source of the broadcast content on which the user answer is based and an input time of the user answer so as to specify the broadcast content; and
transmitting, to a user answer collection server, through a network, user answer information including the user answer and the broadcast content specified for the user answer.

\* \* \* \* \*